US012780953B2

(12) United States Patent
Huang et al.

(10) Patent No.: US 12,780,953 B2
(45) Date of Patent: Nov. 3, 2026

(54) OXIDIZED POLYSACCHARIDE DERIVATIVES

(71) Applicant: NUTRITION & BIOSCIENCES USA 4, INC., Rochester, NY (US)

(72) Inventors: Zhengzheng Huang, Hockessin, DE (US); Arjen Hoekstra, Oegstgeest (NL); Sander Bas Kluit, Leiden (NL); Yefim Brun, Wilmington, DE (US); Laurie A. Howe, Bear, DE (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 441 days.

(21) Appl. No.: 18/546,457

(22) PCT Filed: Feb. 17, 2022

(86) PCT No.: PCT/US2022/016718
§ 371 (c)(1),
(2) Date: Aug. 15, 2023

(87) PCT Pub. No.: WO2022/178075
PCT Pub. Date: Aug. 25, 2022

(65) Prior Publication Data

US 2024/0199766 A1 Jun. 20, 2024

Related U.S. Application Data

(60) Provisional application No. 63/283,638, filed on Nov. 29, 2021, provisional application No. 63/151,237,
(Continued)

(51) Int. Cl.
*C11D 3/20* (2006.01)
*B08B 3/08* (2006.01)
(Continued)

(52) U.S. Cl.
CPC ............ *C08B 37/0009* (2013.01); *B08B 3/08* (2013.01); *C08B 15/04* (2013.01); *C08B 31/18* (2013.01);
(Continued)

(58) Field of Classification Search
CPC ........... C11D 3/22; C11D 3/222; C11D 3/223; C11D 3/225; C11D 3/386; C11D 3/38609; C11D 3/38618
(Continued)

(56) References Cited

U.S. PATENT DOCUMENTS 5,437,810 A * 8/1995 Ewbank .................. C11D 1/29
510/471
7,000,000 B1 2/2006 O'Brien
(Continued)

FOREIGN PATENT DOCUMENTS

GB 1330121 A 9/1973
WO WO-2004091557 A2 * 10/2004 ............... A61Q 5/12
(Continued)

OTHER PUBLICATIONS

International Preliminary Report On Patentability for PCT/US2022/016718, issued Aug. 31, 2023.
(Continued)

*Primary Examiner* — Gregory R Delcotto

(57) ABSTRACT

Disclosed herein are compositions that comprise at least one oxidized polysaccharide derivative. Such an oxidized polysaccharide derivative can be produced by contacting a polysaccharide derivative under aqueous conditions with at least one agent that is capable of oxidizing the polysaccharide derivative. The polysaccharide derivative for oxidation has a degree of substitution (DoS) up to about 3.0 with at least one organic group. Further disclosed are methods of
(Continued)

producing oxidized polysaccharide derivatives, as well as their use in various applications and products.

21 Claims, 1 Drawing Sheet

Related U.S. Application Data filed on Feb. 19, 2021, provisional application No. 63/151,223, filed on Feb. 19, 2021.

(51) Int. Cl.

| | |
|---|---|
| ***C08B 15/04*** | (2006.01) |
| ***C08B 31/18*** | (2006.01) |
| ***C08B 37/00*** | (2006.01) |
| ***C08B 37/02*** | (2006.01) |
| ***C08L 1/04*** | (2006.01) |
| ***C08L 3/10*** | (2006.01) |
| ***C08L 5/00*** | (2006.01) |
| ***C08L 5/02*** | (2006.01) |
| ***C11D 3/00*** | (2006.01) |
| ***C11D 3/22*** | (2006.01) |
| ***C11D 3/30*** | (2006.01) |
| ***C11D 3/386*** | (2006.01) |
| ***C11D 3/395*** | (2006.01) |

(52) U.S. Cl.

CPC ............ *C08B 37/0021* (2013.01); *C08L 1/04* (2013.01); *C08L 3/10* (2013.01); *C08L 5/00* (2013.01); *C08L 5/02* (2013.01); *C11D 3/0005* (2013.01); *C11D 3/0036* (2013.01); *C11D 3/22* (2013.01); *C11D 3/222* (2013.01); *C11D 3/223* (2013.01); *C11D 3/225* (2013.01); *C11D 3/30* (2013.01); *C11D 3/386* (2013.01); *C11D 3/38609* (2013.01); *C11D 3/38618* (2013.01); *C11D 3/3951* (2013.01); *C11D 2111/14* (2024.01)

(58) Field of Classification Search

USPC ....... 510/235, 237, 276, 320, 321, 473, 474, 510/475, 505, 506

See application file for complete search history.

(56) References Cited

U.S. PATENT DOCUMENTS

| | | | | |
|---|---|---|---|---|
| 7,589,051 | B2 | 9/2009 | Erazo-Majewicz et al. | |
| 8,871,474 | B2 | 10/2014 | Payne et al. | |
| 10,059,779 | B2 | 8/2018 | Nambiar et al. | |
| 11,098,334 | B2 * | 8/2021 | Guan | C08B 37/0021 |
| 2005/0227902 | A1 * | 10/2005 | Erazo-Majewicz | A61K 8/732 510/470 |
| 2013/0244288 | A1 | 9/2013 | O'Brien et al. | |
| 2014/0179913 | A1 | 6/2014 | Paullin et al. | |
| 2014/0187767 | A1 | 7/2014 | Kasat et al. | |
| 2015/0239995 | A1 | 8/2015 | Landschutze et al. | |
| 2015/0259439 | A1 | 9/2015 | Nambiar et al. | |
| 2016/0122445 | A1 | 5/2016 | Nambiar et al. | |
| 2016/0136199 | A1 | 5/2016 | Remaud-Simeon et al. | |
| 2016/0304629 | A1 | 10/2016 | Kasat et al. | |
| 2016/0311935 | A1 * | 10/2016 | Dennes | A61K 8/73 |
| 2017/0218093 | A1 | 8/2017 | Cheng et al. | |
| 2018/0155455 | A1 | 6/2018 | Paullin et al. | |
| 2018/0230241 | A1 | 8/2018 | Johnson et al. | |
| 2018/0237816 | A1 | 8/2018 | Paullin et al. | |
| 2018/0282385 | A1 | 10/2018 | Cheng et al. | |
| 2019/0078063 | A1 | 3/2019 | Li et al. | |
| 2019/0185893 | A1 * | 6/2019 | Guan | C12P 19/08 |
| 2019/0270973 | A1 | 9/2019 | Paullin et al. | |
| 2020/0002646 | A1 | 1/2020 | Huang et al. | |
| 2020/0165360 | A1 | 5/2020 | Behabtu et al. | |
| 2020/0308371 | A1 | 10/2020 | Briegel et al. | |
| 2021/0047440 | A1 * | 2/2021 | Edgar | C08B 11/02 |
| 2023/0287148 | A1 * | 9/2023 | Huang | C11D 3/226 |
| 2024/0150497 | A1 | 5/2024 | Hoekstra et al. | |

FOREIGN PATENT DOCUMENTS

| | | | | |
|---|---|---|---|---|
| WO | WO-2016160740 | A1 * | 10/2016 | C11D 3/223 |
| WO | 2019246228 | A1 | 12/2019 | |
| WO | 2021247810 | A1 | 12/2021 | |
| WO | 2021252569 | A1 | 12/2021 | |
| WO | 2021252575 | A1 | 12/2021 | |
| WO | WO-2022165107 | A1 * | 8/2022 | C11D 3/38618 |
| WO | WO-2023081341 | A1 * | 5/2023 | D06M 15/03 |

OTHER PUBLICATIONS

Teotia, "Carbohydrate Polymers", vol. 87, pp. 457-460, (2012).

Mansouri, "Chemical and biological behaviours of hydrogels based on oxidized carboxymethylcellulose coupled to chitosan", Polymer Bulletin, vol. 77, pp. 85-105, (2020).

Gomez-Bujedo, "Preparation of Cellouronic Acids and Partially Acetylated Cellouronic Acids by TEMPO/NaClO Oxidation of Water-Soluble Cellulose Acetate", Biomacromolecules, vol. 5, pp. 565-571, (2004).

* cited by examiner

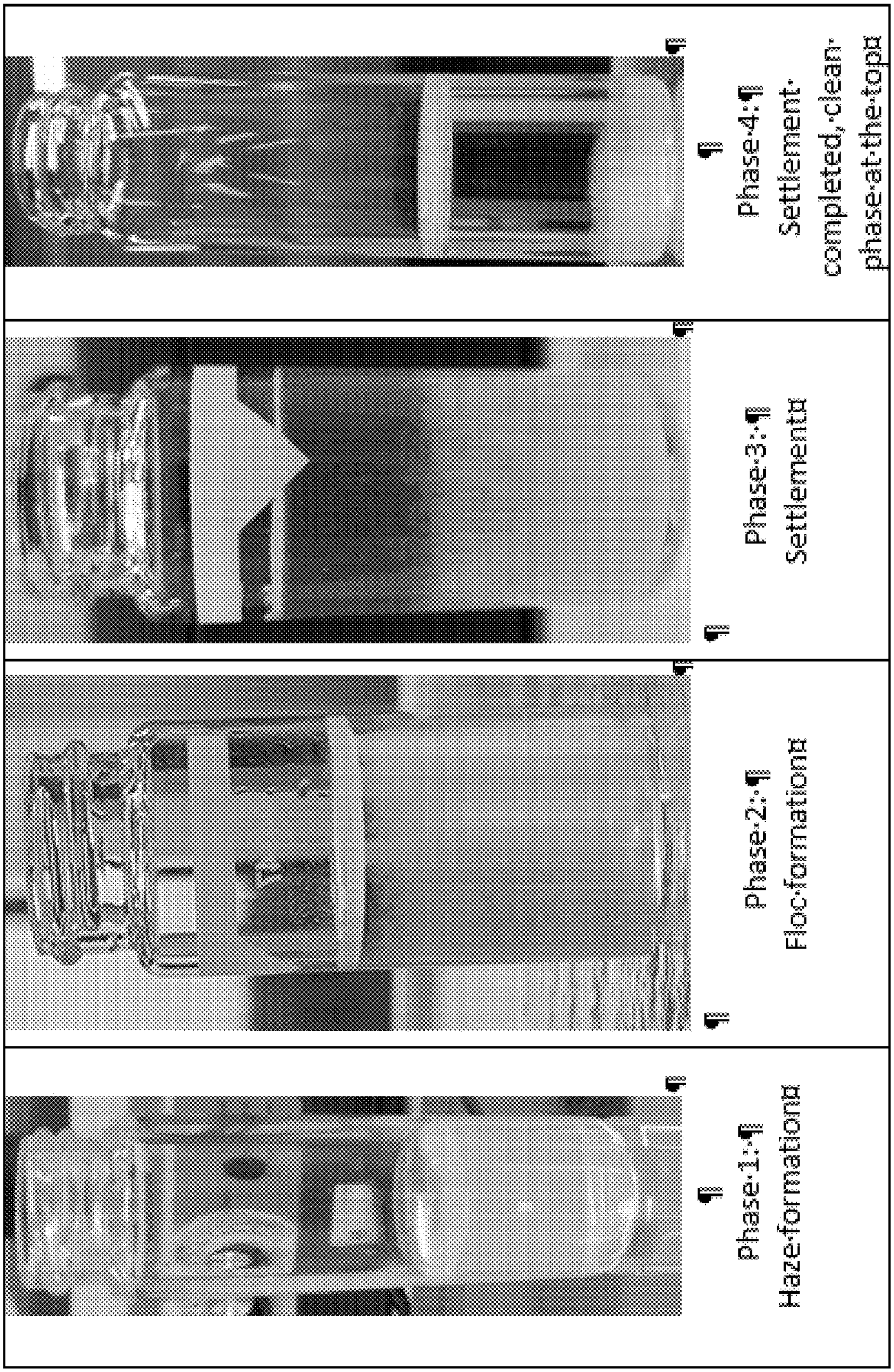
Phase 1: Haze formation
Phase 2: Floc formation
Phase 3: Settlement
Phase 4: Settlement completed, clean phase at the top

OXIDIZED POLYSACCHARIDE DERIVATIVES

This application is the National Stage application of International Application No. PCT/US2022/016718 (filed Feb. 17, 2022), which claims the benefit of U.S. Provisional Appl. Nos. 63/151,237 (filed Feb. 19, 2021), 63/151,223 (filed Feb. 19, 2021), and 63/283,638 (filed Nov. 29, 2021), all of which prior applications are incorporated herein by reference in their entirety.

FIELD

The present disclosure is in the field of polysaccharide derivatives. For example, the disclosure pertains to polysaccharide derivatives and polysaccharide derivatives that have been oxidized, and use of this material in various applications.

BACKGROUND

Multifunctional detergent compositions have been produced that provide cleaning, water-softening, and rinsing benefits. To illustrate, detergent formulations for automatic dishwashers and other appliances have been designed to function under hardwater conditions. Hardwater cations such as $Ca^{2+}$ and $Mg^{2+}$ can crystalize with carbonate and form insoluble salts that form deposits (also known as scaling) on surfaces such as dishware or appliance internal components (e.g., pipes, sprayers). Hardwater cations also play a role in soap scum formation. Bio-based ingredients such as sodium citrate, methylglycinediacetic acid trisodium salt (MGDA), and L-glutamic acid-N,N-diacetic acid (GLDA) can help prevent these unwanted deposits by sequestering hardwater cations and keeping them in solution. However, none of these ingredients are sufficient at preventing hardwater surface deposits after repetitive washing steps. Inhibition of hardwater deposit formation has more successfully been addressed by incorporating synthetic polymers (often petroleum-based) such as polyacrylates (e.g., sulfonated polyacrylates) or diphosphonates (e.g., ethane-1-hydroxy-1,1-diphosphonate [EHDP]) in detergent compositions. These ingredients are non-renewable and non-biodegradable; due to such environmental concerns, these and related ingredients are the subject of increasing governmental regulation.

Several detergent products have been developed that comprise one or more environmentally friendly components, but these products often fail to deliver acceptable cleaning performance to consumers (e.g., the aforementioned bio-based agents). Thus, there remains a need for cleaning composition ingredients that are renewable and/or biodegradable, and that provide cleaning performance that is equal to, or better than, the performance of products with synthetic components. Polysaccharide derivatives, oxidized versions thereof, and detergent compositions, for example, are disclosed herein that address this need.

SUMMARY

In one embodiment, the present disclosure concerns a composition comprising an oxidized polysaccharide derivative, wherein the oxidized polysaccharide derivative is produced by contacting a polysaccharide derivative under aqueous conditions with at least one agent that is capable of oxidizing the polysaccharide derivative, and wherein the polysaccharide derivative has a degree of substitution (DoS) up to about 3.0 with at least one organic group.

In another embodiment, the present disclosure concerns a method of producing an oxidized polysaccharide derivative of the present disclosure. Such a method comprises:

(a) contacting a polysaccharide derivative under aqueous conditions with at least one agent that is capable of oxidizing the polysaccharide derivative, wherein the polysaccharide derivative has a degree of substitution (DoS) up to about 3.0 with at least one organic group, thereby producing an oxidized polysaccharide derivative; and (b) optionally isolating the oxidized polysaccharide derivative.

In another embodiment, the present disclosure concerns a detergent composition comprising:

(i) a glucan derivative substituted with at least one organic group that comprises a carboxylic acid group or a sulfonate group, wherein the degree of substitution (DoS) of the glucan derivative with the organic group is about 0.1 to about 3.0, and wherein the glucan from which the glucan derivative was derived has a weight-average degree of polymerization (DPw) of at least about 50; and/or (ii) an oxidized polysaccharide derivative, wherein the oxidized polysaccharide derivative is produced by contacting a polysaccharide derivative under aqueous conditions with at least one agent that is capable of oxidizing the polysaccharide derivative; wherein a hard surface that is washed or treated in a washing/treating composition comprising the detergent composition has reduced filming, spotting, haze, or other deposition.

In another embodiment, the present disclosure concerns a method of washing or treating a hard surface. Such a method comprises:

(a) contacting the hard surface with a washing/treating composition that comprises a detergent composition of the present disclosure, and (b) removing all of, or a portion of, the washing/treating composition from the hard surface;

thereby washing or treating the hard surface, wherein the washed/treated hard surface has reduced filming, spotting, haze, and/or other deposition.

BRIEF DESCRIPTION OF THE DRAWINGS

FIG. 1: Phases of calcium carbonate flocculation as mediated by oxidized alpha-1,3-glucan. Refer to Example 11.

DETAILED DESCRIPTION

The disclosures of all cited patent and non-patent literature are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" (i.e., 1-5) is recited, the recited range should be construed as including ranges "1 to 4", "1 to 3", "1-2", "1-2 & 4-5", "1-3 & 5", and the like.

The numerical values of the various ranges in the present disclosure, unless expressly indicated otherwise, are stated as approximations as though the minimum and maximum values within the stated ranges were both proceeded by the word "about". In this manner, slight variations above and below the stated ranges can typically be used to achieve substantially the same results as values within the ranges. Also, the disclosure of these ranges is intended as a continuous range including each and every value between the minimum and maximum values.

It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

It is to be appreciated that certain features of the present disclosure, which are, for clarity, described above and below in the context of aspects/embodiments, may also be provided in combination in a single element. Conversely, various features of the disclosure that are, for brevity, described in the context of a single aspect/embodiment, can also be provided separately or in any sub-combination.

The term "polysaccharide" (or "glycan") means a polymeric carbohydrate molecule composed of long chains of monosaccharide units bound together by glycosidic linkages and on hydrolysis gives the polysaccharide's constituent monosaccharides and/or oligosaccharides. A polysaccharide herein can be linear or branched, and/or can be a homopolysaccharide (comprised of only one type of constituent monosaccharide) or heteropolysaccharide (comprised of two or more different constituent monosaccharides). Examples of polysaccharides herein include glucan (polyglucose), fructan (polyfructose), galactan (polygalactose), mannan (polymannose), arabinan (polyarabinose), xylan (polyxylose), and soy polysaccharide.

A "glucan" herein is a type of polysaccharide that is a polymer of glucose (polyglucose). A glucan can be comprised of, for example, about, or at least about, 90%, 91%, 92%, 93%, 94%, 95%, 96%, 97%, 98%, 99%, or 100% by weight glucose monomeric units. Examples of glucans herein are alpha-glucan and beta-glucan.

The terms "alpha-glucan", "alpha-glucan polymer" and the like are used interchangeably herein. An alpha-glucan is a polymer comprising glucose monomeric units linked together by alpha-glycosidic linkages. In typical aspects, the glycosidic linkages of an alpha-glucan herein are about, or at least about, 80%, 81%, 82%, 83%, 84%, 85%, 86%, 87%, 88%, 89%, 90%, 91%, 92%, 93%, 94%, 95%, 96%, 97%, 98%, 99%, or 100% alpha-glycosidic linkages. Examples of alpha-glucan polymers herein include alpha-1,3-glucan, alpha-1,4-glucan, and alpha-1,6-glucan.

The terms "beta-glucan", "beta-glucan polymer" and the like are used interchangeably herein. A beta-glucan is a polymer comprising glucose monomeric units linked together by beta-glycosidic linkages. In typical aspects, the glycosidic linkages of a beta-glucan herein are about, or at least about, 80%, 81%, 82%, 83%, 84%, 85%, 86%, 87%, 88%, 89%, 90%, 91%, 92%, 93%, 94%, 95%, 96%, 97%, 98%, 99%, or 100% beta-glycosidic linkages. Examples of beta-glucan polymers herein include beta-1,3-glucan, beta-1,4-glucan, and beta-1,6-glucan.

The term "saccharide" and other like terms herein refer to monosaccharides and/or disaccharides/oligosaccharides, unless otherwise noted. A "disaccharide" herein refers to a carbohydrate having two monosaccharides joined by a glycosidic linkage. An "oligosaccharide" herein can refer to a carbohydrate having 3 to 15 monosaccharides, for example, joined by glycosidic linkages. An oligosaccharide can also be referred to as an "oligomer". Monosaccharides (e.g., glucose and/or fructose) comprised within disaccharides/oligosaccharides can be referred to as "monomeric units", "monosaccharide units", or other like terms.

The terms "alpha-1,3-glucan", "poly alpha-1,3-glucan", "alpha-1,3-glucan polymer" and the like are used interchangeably herein. Alpha-1,3-glucan is an alpha-glucan comprising glucose monomeric units linked together by glycosidic linkages, wherein at least about 50% of the glycosidic linkages are alpha-1,3. Alpha-1,3-glucan in some aspects comprises about, or at least about, 90%, 95%, or 100% alpha-1,3 glycosidic linkages. Most or all of the other linkages, if present, in alpha-1,3-glucan herein typically are alpha-1,6, though some linkages may also be alpha-1,2 and/or alpha-1,4. Alpha-1,3-glucan herein is typically water-insoluble.

The terms "alpha-1,6-glucan", "poly alpha-1,6-glucan", "alpha-1,6-glucan polymer", "dextran", and the like herein refer to a water-soluble alpha-glucan comprising glucose monomeric units linked together by glycosidic linkages, wherein at least about 50% of the glycosidic linkages are alpha-1,6. Alpha-1,6-glucan in some aspects comprises about, or at least about, 90%, 95%, or 100% alpha-1,6 glycosidic linkages. Other linkages that can be present in alpha-1,6-glucan include alpha-1,2, alpha-1,3, and/or alpha-1,4 linkages. A "substantially linear" ("mostly linear", and like terms) dextran herein has 5% or less branches, while a "linear" dextran has no branches. Dextran branches can be short, being one (pendant) to three glucose monomers in length. Yet, in some aspects, dextran can be "dendritic", which is a branched structure emanating from a core in which there are chains (containing mostly or all alpha-1,6-linkages) that iteratively branch from each other (e.g., a chain can be a branch from another chain, which in turn is a branch from another chain, and so on). Yet, in still some aspects, dextran is not dendritic, but has a branch-on-branch structure that does not emanate from a core.

The terms "alpha-1,4-glucan", "poly alpha-1,4-glucan", "alpha-1,4-glucan polymer" and the like are used interchangeably herein. Alpha-1,4-glucan is an alpha-glucan comprising glucose monomeric units linked together by glycosidic linkages, wherein at least about 50% of the glycosidic linkages are alpha-1,4. Alpha-1,4-glucan in some aspects comprises about, or at least about, 90%, 95%, or 100% alpha-1,4 glycosidic linkages. Most or all of other linkages (if present) in alpha-1,4-glucan herein typically are alpha-1,6 (typically forming a branch), but can also be alpha-1,2 and/or alpha-1,3. Examples of alpha-1,4-glucan herein include amylose, amylopectin, and starch.

The terms "beta-1,4-glucan", "poly beta-1,4-glucan", "beta-1,4-glucan polymer", "cellulose", and the like are used interchangeably herein. Beta-1,4-glucan is a water-insoluble beta-glucan comprising glucose monomeric units linked together by glycosidic linkages, wherein about 100% of the glycosidic linkages are beta-1,4. Beta-1,4-glucan can be as disclosed, for example, in U.S. Pat. Appl. Publ. No. 2018/0334696 The terms "beta-1,3-glucan", "poly beta-1,3-glucan", "beta-1,3-glucan polymer" and the like are used interchangeably herein. Beta-1,3-glucan is a beta-glucan comprising glucose monomeric units linked together by glycosidic linkages, wherein at least about 50% of the glycosidic linkages are beta-1,3. Beta-1,3-glucan in some aspects comprises about, or at least about, 90%, 95%, or 100% beta-1,3 glycosidic linkages. Most or all of other linkages (if present) in beta-1,3-glucan herein typically are beta-1,6 (typically forming a branch). Beta-1,3-glucan can be as disclosed, for example, in U.S. Pat. Appl. Publ. No. 2014/0287919 and Stone, B. A. (2009, Chemistry of Beta-Glucans, In Antony Bacic et al., Eds., *Chemistry, Biochemistry, and Biology of* 1-3 *Beta Glucans and Related Polysaccharides*, Academic Press, Burlington, MA), which are incorporated herein by reference.

The terms "soy polysaccharide" and "soy fiber" are used interchangeably herein, and refer to high molecular weight, water-insoluble polysaccharide material that can be obtained from soybeans. Typically, soy polysaccharide is obtained from cell wall structural components of soybeans. Soy polysaccharide herein can be as disclosed, for example, in U.S. Pat. Appl. Publ. No. 2018/0079832, which is incorporated herein by reference.

An "alpha-1,2 branch" (and like terms) as referred to herein typically comprises a glucose that is alpha-1,2-linked to a dextran backbone; thus, an alpha-1,2 branch herein can also be referred to as an alpha-1,2,6 linkage. An alpha-1,2 branch herein typically has one glucose group (can optionally be referred to as a pendant glucose).

An "alpha-1,3 branch" (and like terms) as referred to herein typically comprises a glucose that is alpha-1,3-linked to a dextran backbone; thus, an alpha-1,3 branch herein can also be referred to as an alpha-1,3,6 linkage. An alpha-1,3 branch herein typically has one glucose group (can optionally be referred to as a pendant glucose).

An "alpha-1,4 branch" (and like terms) as referred to herein typically comprises a glucose that is alpha-1,4-linked to a dextran backbone; thus, an alpha-1,4 branch herein can also be referred to as an alpha-1,4,6 linkage. An alpha-1,4 branch herein typically has one glucose group (can optionally be referred to as a pendant glucose).

The term "copolymer" in some aspects refers to a polymer comprising at least two different types of alpha-glucan, such as dextran and alpha-1,3-glucan.

The terms "graft copolymer", "branched copolymer" and the like herein generally refer to a copolymer comprising a "backbone" (or "main chain") and one or more side chains branching from the backbone. The side chains are structurally distinct from the backbone.

Examples of graft copolymers herein are "dextran-alpha-1,3-glucan graft copolymers" (and like terms) that comprise a backbone comprising dextran, and one or more side chains of alpha-1,3-glucan. A backbone in some aspects can itself be a branched dextran as disclosed herein; the addition of alpha-1,3-glucan side chains to such a backbone (thereby forming a graft copolymer herein) can be, for example, via enzymatic extension from non-reducing ends presented by short branches (alpha-1,2, -1,3, or -1,4 branch, each typically comprised of a single glucose monomer; i.e., pendant glucose). Short branches (that can be enzymatically extended into an alpha-1,3-glucan side chain) can be present on an otherwise linear or mostly linear dextran, or can be present on a branching dextran. In some aspects, alpha-1,3-glucan can also be synthesized from non-reducing ends of dextran main chains, such as in embodiments in which the dextran backbone is linear or mostly linear, or embodiments in which the dextran backbone is branching (e.g., dendritic, or not dendritic [branches do not emanate from a core] but has branch-on-branch structure); such alpha-1,3-glucan is not, technically-speaking, a side chain to the dextran, but rather an extension from the dextran main chain(s).

The percent branching in a polysaccharide herein refers to that percentage of all the linkages in the polysaccharide that represent branch points. For example, the percent of alpha-1,3 branching in an alpha-glucan herein refers to that percentage of all the linkages in the glucan that represent alpha-1,3 branch points. Except as otherwise noted, linkage percentages disclosed herein are based on the total linkages of a polysaccharide, or the portion of a polysaccharide for which a disclosure specifically regards.

The terms "linkage", "glycosidic linkage", "glycosidic bond" and the like refer to the covalent bonds connecting the sugar monomers within a saccharide compound (oligosaccharides and/or polysaccharides). Examples of glycosidic linkages include 1,6-alpha-D-glycosidic linkages (herein also referred to as "alpha-1,6" linkages), 1,3-alpha-D-glycosidic linkages (herein also referred to as "alpha-1,3" linkages), 1,4-alpha-D-glycosidic linkages (herein also referred to as "alpha-1,4" linkages), and 1,2-alpha-D-glycosidic linkages (herein also referred to as "alpha-1,2" linkages).

The glycosidic linkage profile of a polysaccharide or derivative thereof can be determined using any method known in the art. For example, a linkage profile can be determined using methods using nuclear magnetic resonance (NMR) spectroscopy (e.g., $^{13}C$ NMR and/or $^{1}H$ NMR). These and other methods that can be used are disclosed in, for example, Food Carbohydrates: Chemistry, Physical Properties, and Applications (S. W. Cui, Ed., Chapter 3, S. W. Cui, Structural Analysis of Polysaccharides, Taylor & Francis Group LLC, Boca Raton, F L, 2005), which is incorporated herein by reference.

The "molecular weight" of a polysaccharide or polysaccharide derivative herein can be represented as weight-average molecular weight (Mw) or number-average molecular weight (Mn), the units of which are in Daltons (Da) or grams/mole. Alternatively, molecular weight can be represented as DPw (weight average degree of polymerization) or DPn (number average degree of polymerization). The molecular weight of smaller polysaccharide polymers such as oligosaccharides can optionally be provided as "DP" (degree of polymerization), which simply refers to the number of monomers comprised within the polysaccharide; "DP" can also characterize the molecular weight of a polymer on an individual molecule basis. Various means are known in the art for calculating these various molecular weight measurements such as with high-pressure liquid chromatography (HPLC), size exclusion chromatography (SEC), or gel permeation chromatography (GPC).

As used herein, Mw can be calculated as $Mw=\Sigma NiMi^2/\Sigma NiMi$; where Mi is the molecular weight of an individual chain i and Ni is the number of chains of that molecular weight. Besides SEC, the Mw of a polymer can be determined by other techniques such as static light scattering, mass spectrometry, MALDI-TOF (matrix-assisted laser desorption/ionization time-of-flight), small angle X-ray or neutron scattering, or ultracentrifugation. As used herein, Mn can be calculated as $Mn=\Sigma NiMi/\Sigma Ni$ where Mi is the molecular weight of a chain i and Ni is the number of chains of that molecular weight.

Besides SEC, the Mn of a polymer can be determined by various colligative property methods such as vapor pressure osmometry, end-group determination by spectroscopic methods such as proton NMR, proton FTIR, or UV-Vis. As used herein, DPn and DPw can be calculated from Mw and Mn, respectively, by dividing them by molar mass of the one monomer unit $M_1$. In the case of unsubstituted glucan polymer, $M_1=162$. In the case of a substituted (derivatized) glucan polymer, $M_1=162+M_f \times DoS$, where $M_f$ is molar mass of the substituting group, and DoS is degree of substitution (average number of substituted groups per one glucose unit of the glucan polymer).

A "polysaccharide derivative" (and like terms) herein (e.g., a glucan derivative such as an alpha- or beta-glucan derivative) typically refers to a polysaccharide that has been substituted with at least one type of organic group. The degree of substitution (DoS) of a polysaccharide derivative herein can be up to about 3.0 (e.g., about 0.001 to about 3.0). An organic group can be linked to a polysaccharide derivative herein via an ether, ester, carbamate/carbamoyl, or sulfonyl linkage, for example. A precursor of a polysaccharide derivative herein refers to the non-derivatized polysaccharide used to make the derivative (can also be referred to as the polysaccharide portion of the derivative). A polysaccharide derivative, unless otherwise disclosed, has not yet been subjected to an oxidation step herein, and thus can optionally be characterized as a precursor to an oxidized polysaccharide derivative of the present disclosure. An organic group herein typically is uncharged (nonionic) or anionic, generally, such charge can be as it exists when the organic group is in an aqueous composition herein, further taking into account the pH of the aqueous composition (in some aspects, the pH can be 4-10 or 5-9, or any pH as disclosed herein). If present as a substitution in a polysaccharide derivative herein, an organic group that comprises a carboxylic acid group can be a carboxylic acid group by itself (e.g., carbon 6 of glucose can be —COOH), or can be an organic group that is (i) ether-, ester-, carbamate, or sulfonyl-linked to a polysaccharide and (ii) comprises a carboxylic acid group (e.g., a carboxy alkyl group such as carboxymethyl).

The term "degree of substitution" (DoS, or DS) as used herein refers to the average number of hydroxyl groups that are substituted with organic groups (e.g., via an ether, ester, or other linkage herein) in each monomeric unit of a polysaccharide derivative. The DoS of a polysaccharide derivative herein can be stated with reference to the DoS of a specific substituent, or the overall DoS, which is the sum of the DoS values of different substituent types (e.g., if a mixed ether or mixed ester). Unless otherwise disclosed, when DoS is not stated with reference to a specific substituent type, the overall DoS is meant.

The term "molar substitution" (M.S.) as used herein refers to the moles of an organic group per monomeric unit of a polysaccharide derivative herein. It is noted that the molar substitution value for a polysaccharide derivative, for example, may have a very high upper limit, for example in the hundreds or even thousands. For example, if the organic group is a hydroxyl-containing alkyl group, via the addition of ethylene oxide to one of the hydroxyl groups of a polysaccharide, then the so-formed hydroxyl group from the ethylene oxide can then be further etherified to form a polyether.

Terms used herein regarding "ethers" (e.g., polysaccharide ether derivative) can be as disclosed, for example, in U.S. Patent Appl. Publ. Nos. 2014/179913, 2016/0304629, 2015/0239995, 2018/0230241, 2018/0237816, or 2020/0002646, U.S. Appl. No. 63/037,076, or Int. Patent Appl. Publ. No. WO2021/252569, which are each incorporated herein by reference. The terms "polysaccharide ether derivative", "polysaccharide ether compound", "polysaccharide ether", and the like are used interchangeably herein. A polysaccharide ether derivative herein is polysaccharide that has been etherified with one or more organic groups (e.g., uncharged, anionic) such that the derivative has a DoS with one or more organic groups of up to about 3.0. A polysaccharide ether derivative is termed an "ether" herein by virtue of comprising the substructure $—C_G—O—C—$, where "$—C_G—$" represents a carbon atom of a monomeric unit (e.g., glucose) of the polysaccharide ether derivative (where such carbon atom was bonded to a hydroxyl group [—OH] in the polysaccharide precursor of the ether), and where "—C—" is a carbon atom of an organic group.

Terms used herein regarding "esters" (e.g., polysaccharide ester derivative) can be as disclosed, for example, in U.S. Patent Appl. Publ. Nos. 2014/0187767, 2018/0155455, or 2020/0308371, U.S. Appl. No. 63/037,184, or Int. Patent Appl. Publ. No. WO2021252575, which are each incorporated herein by reference. The terms "polysaccharide ester derivative", "polysaccharide ester compound", "polysaccharide ester", and the like are used interchangeably herein. A polysaccharide ester derivative herein is polysaccharide that has been esterified with one or more organic groups (i.e., acyl groups) such that the derivative has a DoS with one or more organic groups of up to about 3.0. A polysaccharide ester derivative is termed an "ester" herein by virtue of comprising the substructure $—C_G—O—CO—C—$, where "$—C_G—$" represents a carbon atom of a monomeric unit (e.g., glucose) of the polysaccharide ester derivative (where such carbon atom was bonded to a hydroxyl group [—OH] in the polysaccharide precursor of the ester), and where "—CO—C—" is comprised in the acyl group.

The terms "polysaccharide carbamate derivative", "polysaccharide carbamate", "carbamoyl polysaccharide" and the like are used interchangeably herein. A polysaccharide carbamate derivative contains the linkage moiety —OCONH— or

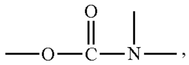

and thus comprises the substructure $—C_G—OCONH—C_R—$ or $—C_G—OCON—C_{R2}—$, where "$—C_G—$" represents a carbon of a monomer unit (e.g., glucose) of the polysaccharide carbamate derivative, and "$—C_R—$" is comprised in the organic group. In some aspects, the nitrogen atom of a carbamate/carbamoyl moiety is linked to a hydrogen atom and an organic group. In some aspects, however, the nitrogen atom of a carbamate/carbamoyl moiety is linked to two 5 organic groups (as indicated by "$—C_{R2}$-" above), which can be the same (e.g., two methyl groups, two ethyl groups) or different (e.g., a methyl group and an ethyl group).

The terms "polysaccharide sulfonyl derivative", "sulfonyl polysaccharide" and the like are used interchangeably herein. A polysaccharide sulfonyl derivative contains the linkage moiety $—OSO_2—$, and thus comprises the substructure $—C_G—O—SO_2—C_R—$, where "$—C_G—$" represents a carbon of a monomer unit (e.g., glucose) of the polysaccharide sulfonyl derivative, and "$—C_R—$" is comprised in the organic group. A sulfonyl linkage herein is not ionizable. Sulfonyl groups of a polysaccharide sulfonyl derivative herein can be as disclosed, for example, in U.S. Appl. No. 63/037,076 or Int. Patent Appl. Publ. No. WO2021/252569, which are each incorporated herein by reference.

A "sulfonate" group herein can be as disclosed, for example, in Int. Pat. Appl. Publ. No. WO2019/246228, which is incorporated herein by reference.

An "oxidized polysaccharide derivative" (and like terms) herein refers to a compound resulting from oxidation of a polysaccharide derivative (e.g., ether, ester, carbamate, sulfonyl) such as presently disclosed. Such oxidation can occur, for example, at one or more hydroxyl groups of monomeric units of a polysaccharide derivative, and/or at one or more hydroxyl groups of substituting organic groups of the polysaccharide derivative.

Oxidation can independently convert hydroxyl groups to an aldehyde, ketone, or carboxylic group. A polysaccharide derivative herein can be oxidized by contacting it with one or more oxidizing/oxidation agents under aqueous conditions, for example.

"Aqueous conditions" and like terms regarding an oxidation reaction herein refer to a solution or mixture in which the solvent is at least about 60 wt % water, for example. An oxidation reaction herein can be performed under aqueous conditions. Aqueous conditions can be acidic or basic, for example.

The terms "aqueous liquid", "aqueous fluid", "aqueous conditions", "aqueous reaction conditions", "aqueous setting", "aqueous system" and the like as used herein can refer to water or an aqueous solution. An "aqueous solution" herein can comprise one or more dissolved salts, where the maximal total salt concentration can be about 3.5 wt % in some aspects. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

An "aqueous composition" herein has a liquid component that comprises about, or at least about, 10, 20, 30, 40, 50, 60, 70, 80, 90, 95, 99, or 100 wt % water, for example. Examples of aqueous compositions include mixtures, solutions, dispersions (e.g., colloidal dispersions), suspensions and emulsions, for example.

An oxidized polysaccharide derivative herein that is "soluble", "aqueous-soluble", "water-soluble" (and like terms) herein dissolves (or appreciably dissolves) in water or other aqueous conditions, optionally where the aqueous conditions are further characterized to have a pH of 4-9 (e.g., pH 6-8) and/or temperature of about 1 to 130° C. (e.g., 20-25° C.). In contrast, an oxidized polysaccharide derivative that is "insoluble", "aqueous-insoluble", "water-insoluble" and the like do not dissolve under these conditions. In some aspects, less than 1.0 gram (e.g., no detectable amount) of an aqueous-insoluble oxidized polysaccharide derivative dissolves in 1000 milliliters of such aqueous conditions (e.g., water at 23° C.).

The terms "household care product", "home care product", and like terms typically refer to products, goods and services relating to the treatment, cleaning, caring, and/or conditioning of a home and its contents. The foregoing includes, for example, chemicals, compositions, products, or combinations thereof having application in such care.

A "fabric care composition", "laundry care composition", and like terms refer to any composition suitable for treating fabric, non-wovens, and/or any similar material in some manner. Examples of such a composition include laundry detergents and fabric softeners.

A "detergent composition" herein typically comprises at least a surfactant (detergent compound) and/or a builder. A "surfactant" herein refers to a substance that tends to reduce the surface tension of a liquid in which the substance is dissolved. A surfactant may act as a detergent, wetting agent, emulsifier, foaming agent, and/or dispersant, for example.

The terms "heavy duty detergent", "all-purpose detergent" and the like are used interchangeably herein to refer to a detergent useful for regular washing of white and colored textiles at any temperature. The terms "low duty detergent", "fine fabric detergent" and the like are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

The terms "builder", "builder agent" and the like herein refer to compositions that, for example, can complex with hard water cations such as calcium and magnesium cations. Such complex formation is believed to prevent the formation of water-insoluble salts and/or other complexes by the cation(s). In the context of a detergent composition for cleaning or maintenance applications, a builder added thereto typically can enhance or maintain the cleaning efficiency of a surfactant present in the detergent composition. The terms "builder capacity", "builder activity" and the like are used interchangeably herein and refer to the ability of an aqueous composition to exhibit features endowed by one or more builders present in the aqueous composition. Polysaccharide/glucan materials in some aspects herein can be used as a builder.

The terms "flocculant", "flocculation agent", "flocculation composition", "agglomeration agent", and the like herein refer to substances that can promote agglomeration/clumping/coalescence of insoluble particles suspended in water or other aqueous liquid, thereby rendering the particles more easy to remove by settling/sedimentation, filtration, pelleting, and/or other suitable means. Flocculation of particles typically can be performed in a process of removing/separating particles from an aqueous suspension. Polysaccharide/glucan materials in some aspects herein can be used as flocculants.

The term "personal care product" and like terms typically refer to products, goods and services relating to the treatment, cleaning, cleansing, caring or conditioning of a person. The foregoing include, for example, chemicals, compositions, products, or combinations thereof having application in such care.

The terms "ingestible product", "ingestible composition" and the like refer to any substance that, either alone or together with another substance, may be taken orally (i.e., by mouth), whether intended for consumption or not. Thus, an ingestible product includes food/beverage products. "Food/beverage products" refer to any edible product intended for consumption (e.g., for nutritional purposes) by humans or animals, including solids, semi-solids, or liquids. A "food" herein can optionally be referred to as a "foodstuff", "food product", or other like term, for example. "Non-edible products" ("non-edible compositions") refer to any composition that can be taken by the mouth for purposes other than food or beverage consumption. Examples of non-edible products herein include supplements, nutraceuticals, functional food products, pharmaceutical products, oral care products (e.g., dentifrices, mouthwashes), and cosmetic products such as sweetened lip balms. A "pharmaceutical product", "medicine", "medication", "drug" or like term herein refers to a composition used to treat disease or injury, and can be administered enterally or parenterally.

The term "industrial product" and like terms typically refer to products, goods and services used in industrial or institutional settings, but typically not by individual consumers.

The term "viscosity" as used herein refers to the measure of the extent to which a fluid (aqueous or non-aqueous) resists a force tending to cause it to flow. Various units of viscosity that can be used herein include centipoise (cP, cps) and Pascal-second (Pa·s), for example. A centipoise is one one-hundredth of a poise; one poise is equal to 0.100 $kg \cdot m^{-1} \cdot s^{-1}$. Viscosity can be reported as "intrinsic viscosity"

(IV, η, units of dL/g) in some aspects; this term refers to a measure of the contribution of a glucan polymer to the viscosity of a liquid (e.g. solution) comprising the glucan polymer. IV measurements herein can be obtained, for example, using any suitable method such as disclosed in U.S. Pat. Appl. Publ. Nos. 2017/0002335, 2017/0002336, or 2018/0340199, or Weaver et al. (*J. Appl. Polym, Sci.* 35:1631-1637) or Chun and Park (*Macromol. Chem. Phys.* 195:701-711), which are all incorporated herein by reference. IV can be measured, in part, by dissolving glucan polymer (optionally dissolved at about 100° C. for at least 2, 4, or 8 hours) in DMSO with about 0.9 to 2.5 wt % (e.g., 1, 2, 1-2 wt %) LiCl, for example. IV herein can optionally be used as a relative measure of molecular weight.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture, or solution.

The terms "weight/volume percent", "w/v %" and the like are used interchangeably herein. Weight/volume percent can be calculated as: ((mass [g] of material)/(total volume [mL] of the material plus the liquid in which the material is placed))×100%. The material can be insoluble in the liquid (i.e., be a solid phase in a liquid phase, such as with a dispersion), or soluble in the liquid (i.e., be a solute dissolved in the liquid).

The term "isolated" means a substance (or process) in a form or environment that does not occur in nature. A non-limiting example of an isolated substance includes any polysaccharide derivative or oxidized polysaccharide derivative disclosed herein. It is believed that the embodiments disclosed herein are synthetic/man-made (could not have been made or practiced except for human intervention/involvement), and/or have properties that are not naturally occurring.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

Some aspects of the present disclosure concern a composition that comprises an oxidized polysaccharide derivative. Typically, an oxidized polysaccharide derivative of the present disclosure is produced by contacting a polysaccharide derivative under aqueous conditions with at least one agent that is capable of oxidizing the polysaccharide derivative, wherein the polysaccharide derivative (before oxidation) has a degree of substitution (DoS) up to about 3.0 with at least one organic group. Oxidized polysaccharide derivatives as presently disclosed have several advantageous features, such as being able to prevent/reduce the formation of unwanted deposits resulting from the interaction of hard water cations (e.g., $Ca^{2+}$, $Mg^{2+}$) with anionic compounds (e.g., carbonate, stearate) in various aqueous applications.

A polysaccharide derivative in some aspects for producing an oxidized polysaccharide derivative herein can be a glucan derivative, fructan derivative, galactan derivative, mannan derivative, arabinan derivative, xylan derivative, or soy polysaccharide derivative. A glucan derivative herein can be an alpha-glucan derivative or a beta-glucan derivative, for example. The glycosidic linkages of an alpha-glucan derivative herein typically are about, or at least about, 80%, 81%, 82%, 83%, 84%, 85%, 86%, 87%, 88%, 89%, 90%, 91%, 92%, 93%, 94%, 95%, 96%, 97%, 98%, 99%, or 100% alpha-glycosidic linkages. Examples of suitable alpha-glucan derivatives include derivatives of alpha-1,3-glucan, alpha-1,6-glucan, and alpha-1,4-glucan.

A derivative of alpha-1,3-glucan can be used herein to provide an oxidized polysaccharide derivative (i.e., an oxidized alpha-1,3-glucan derivative), for example. Such alpha-1,3-glucan in some aspects can comprise about, or at least about, 50%, 60%, 70%, 80%, 85%, 90%, 91%, 92%, 93%, 94%, 95%, 96%, 97%, 98%, 99%, 99.5%, or 100% alpha-1,3 glycosidic linkages. In some aspects, accordingly, an alpha-1,3-glucan has about, or less than about, 50%, 40%, 30%, 20%, 15%, 10%, 9%, 8%, 7%, 6%, 5%, 4%, 3%, 2%, 1%, 0.5%, or 0% glycosidic linkages that are not alpha-1,3. Typically, the glycosidic linkages that are not alpha-1,3 are mostly or entirely alpha-1,6. It should be understood that the higher the percentage of alpha-1,3 linkages present in an alpha-1,3-glucan, the greater the probability that the glucan is linear, since there are lower occurrences of certain linkages that might be part of branch points. In some aspects, alpha-1,3-glucan has no branch points or less than about 5%, 4%, 3%, 2%, or 1% branch points as a percent of the glycosidic linkages in the alpha-1,3-glucan.

The DPw, DPn, or DP of the alpha-1,3-glucan portion of an alpha-1,3-glucan derivative in some aspects can be about, or at least about, 10, 25, 50, 75, 100, 150, 200, 300, 400, 500, 600, 700, 800, 900, 1000, 1100, 1200, 1300, 1400, 1500, 1600, 1700, 1800, 1900, 2000, 2500, 3000, 3500, or 4000. DPw, DPn, or DP can optionally be expressed as a range between any two of these values. Merely as examples, the DPw, DPn, or DP of alpha-1,3-glucan can be about 50-1600, 100-1600, 200-1600, 300-1600, 400-1600, 500-1600, 600-1600, 700-1600, 50-1250, 100-1250, 200-1250, 300-1250, 400-1250, 500-1250, 600-1250, 700-1250, 50-1000, 100-1000, 200-1000, 300-1000, 400-1000, 500-1000, 600-1000, 700-1000, 50-900, 100-900, 200-900, 300-900, 400-900, 500-900, 600-900, 700-900, 600-800, or 600-750. Any of these DPw, DPn, or DP values can also be used in reference to a polysaccharide derivative herein, where such reference is used with respect to the polysaccharide portion of the derivative. The alpha-1,3-glucan portion of an alpha-1,3-glucan derivative in some aspects can have a high molecular weight as reflected by high intrinsic viscosity (IV), e.g., IV can be about, or at least about 6, 7, 8, 9, 10, 11, 12, 13, 14, 15, 16, 17, 18, 19, 20, 21, 22, 6-8, 6-7, 6-22, 6-20, 6-17, 6-15, 6-12, 10-22, 10-20, 10-17, 10-15, 10-12, 12-22, 12-20, 12-17, or 12-15 dL/g. For comparison purposes, note that the IV of alpha-glucan with at least 90% (e.g., about 99% or 100%) alpha-1,3 linkages and a DPw of about 800 has an IV of about 2-2.5 dL/g. IV herein can be as measured with alpha-glucan polymer dissolved in DMSO with about 0.9 to 2.5 wt % (e.g., 1, 2, 1-2 wt %) LICl, for example.

The alpha-1,3-glucan portion of an alpha-1,3-glucan derivative herein can be as disclosed (e.g., molecular weight, linkage profile, production method), for example, in U.S. Pat. Nos. 7,000,000, 8,871,474, 10,301,604 and 10,260,053, and U.S. Patent Appl. Publ. Nos. 2019/0112456, 2019/0078062, 2019/0078063, 2018/0340199, 2018/0021238, 2018/0273731, 2017/0002335, 2015/0232819, 2015/0064748, 2020/0165360 and 2019/0185893, which are each incorporated herein by reference.

A derivative of alpha-1,6-glucan (dextran) can be used herein to provide an oxidized polysaccharide derivative (i.e., an oxidized alpha-1,6-glucan derivative), for example. Such alpha-1,6-glucan can comprise about 100% alpha-1,6-glycosidic linkages (i.e., be completely linear dextran), or about, or at least about, 50%, 60%, 70%, 80%, 85%, 90%, 91%, 92%, 93%, 94%, 95%, 96%, 97%, 98%, 99%, or 99.5% alpha-1,6-glycosidic linkages, for example. In some aspects, a substantially linear alpha-1,6-glucan can comprise 5%, 4%, 3%, 2%, 1%, 0.5% or less branches. If present, branches from alpha-1,6-glucan typically are short, being one (pendant), two, or three glucose monomers in length. In some aspects, alpha-1,6-glucan can comprise, about, at least about, or less than about, 50%, 40%, 30%, 20%, 15%, 10%, 9%, 8%, 7%, 6%, 5%, 4%, 3%, 2%, 1%, 0.5%, or 0% alpha-1,4, alpha-1,3 and/or alpha-1,2 glycosidic linkages. Typically, such linkages exist entirely, or almost entirely, as branch points from alpha-1,6-glucan.

The alpha-1,6-glucan portion of an alpha-1,6-glucan derivative herein can have alpha-1,2, alpha-1,3, and/or alpha-1,4 branches, for example. In some aspects, about, at least about, or less than about, 1%, 2%, 2.5%, 5%, 10%, 15%, 20%, 25%, 30%, 35%, 40%, 45%, 2-25%, 2-20%, 2-15%, 2-10%, 5-25%, 5-20%, 5-15%, 5-10%, 7-13%, 8-12%, 9-11%, 10-25%, 10-20%, 10-15%, 10-22%, 12-20%, 12-18%, 14-20%, 14-18%, 15-18%, or 15-17% of all the glycosidic linkages of a branched alpha-1,6-glucan are alpha-1,2, alpha-1,3, and/or alpha-1,4 glycosidic linkages. Such branches typically are mostly (>90% or >95%), or all (100%), a single glucose monomer in length. Alpha-1,6-glucan with alpha-1,3-branching can be prepared as disclosed in Vuillemin et al. (2016, *J. Biol Chem.* 291:7687-7702), U.S. application Ser. No. 16/923,164, Int. Patent Appl. Publ. No. WO2021/007264, or U.S. Patent Appl. Publ. No. 2016/0136199, which are each incorporated herein by reference. Alpha-1,6-glucan with alpha-1,2-branching can be prepared as disclosed in U.S. Patent Appl. Publ. No. 2018/0282385, which is incorporated herein by reference.

The alpha-1,6-glucan portion of an alpha-1,6-glucan derivative herein can have a molecular weight (Mw [weight-average molecular weight]) of about, at least about, or less than about, 1000, 5000, 10000, 20000, 30000, 40000, 50000, 60000, 70000, 80000, 90000, 100000, 125000, 150000, 175000, 200000, 225000, 250000, 500000, 750000, 1000000, 50000-250000, 50000-225000, 50000-200000, 100000-250000, 100000-225000, 100000-200000, 150000-250000, 150000-225000, 150000-200000, or 10000-20000 Daltons, for example. In some aspects, the Mw is about, at least about, or less than about, 1, 2, 3, 4, 5, 6, 7, 8, 9, 10, 20, 30, 40, 50, 60, 70, 80, 90, 100, 110, 120, 130, 140, 150, 160, 170, 180, 190, 200, 10-50, 10-70, 10-80, 10-100, 10-120, 10-130, 10-150, 10-200, 25-50, 25-70, 25-80, 25-100, 25-120, 25-130, 25-150, 25-200, 50-70, 50-80, 50-100, 50-120, 50-130, 50-150, 50-200, 70-80, 70-100, 70-120, 70-130, 70-150, 70-200, 80-100, 80-120, 80-130, 80-150, 80-200, 100-120, 100-130, 100-150, 100-200, 120-130, 120-150, 120-200, 130-150, or 130-200 million Daltons. Any of these Mw values can optionally be expressed as weight-average degree of polymerization (DPw), which is Mw divided by 162.14 (the calculated DPw can be rounded to the nearest whole number).

The alpha-1,6-glucan portion of an alpha-1,6-glucan derivative herein can be as disclosed (e.g., molecular weight, linkage/branching profile, production method), for example, in U.S. Patent Appl. Publ. Nos. 2016/0122445, 2017/0218093, 2018/0282385, 2020/0165360 and 2019/0185893, which are each incorporated herein by reference. In some aspects, an alpha-1,6-glucan can be one produced in a suitable reaction comprising glucosyltransferase (GTF) 0768 (SEQ ID NO:1 or 2 of US2016/0122445), GTF 8117, GTF 6831, or GTF 5604 (these latter three GTF enzymes are SEQ ID NOs: 30, 32 and 33, respectively, of US2018/0282385), or a GTF comprising an amino acid sequence that is at least 90%, 91%, 92%, 93%, 94%, 95%, 96%, 97%, 98%, or 99% identical to the amino acid sequence of GTF 0768, GTF 8117, GTF 6831, or GTF 5604.

A derivative of an alpha-glucan graft copolymer can be used herein to provide an oxidized polysaccharide derivative, for example. The alpha-glucan graft copolymer portion of a graft copolymer derivative herein can be as disclosed (e.g., molecular weight, linkage/branching profile, production method), for example, in U.S. Patent Appl. Publ. Nos. 2020/0165360 and 2019/0185893, U.S. Appl. No. 63/034,437, or Int. Patent Appl. Publ. No. WO2021247810, which are each incorporated herein by reference. In some aspects, an alpha-glucan graft copolymer comprises a backbone of alpha-1,6-glucan with one or more side chains of alpha-1,3-glucan. The alpha-1,6- and alpha-1,3-glucan components of such a graft copolymer can be as disclosed herein. For example, an alpha-1,6-glucan backbone (i) can be about 50-200 million Daltons in molecular weight and/or have been synthesized using GTF 0768 (e.g., as above), and/or (ii) has been modified to have alpha-1,2- and/or alpha-1,3 branches prior to being grafted with alpha-1,3-glucan side chains. For example, an alpha-glucan graft copolymer can comprise: (A) an alpha-1,6-glucan backbone (100% alpha-1,6-linked before alpha-1,2 and/or alpha-1,3 branching) that (i) has been branched with about 10-22% (e.g., about 12-20%, 12-18%, 14-20%, 14-18%, 15-18%, 15-17%, or 16%) alpha-1,2 and/or alpha-1,3 linkages (i.e., alpha-1,2,6 and/or alpha-1,3,6) (e.g., the backbone in total comprises about 82-86% or 84% alpha-1,6 linkages and about 14-18% or 16% alpha-1,2 and/or alpha-1,3 linkages) and (ii) has an Mw of about 15-25, 15-22.5, 17-25, 17-22.5, 18-22, or 20 kDa, and (B) one or more (e.g., two, three, four, five, or six) alpha-1,3-glucan side chains that have been extended from one or more of the alpha-1,2 and/or alpha-1,3 branches; such a graft copolymer typically is water-insoluble.

A derivative of alpha-1,4-glucan can be used herein to provide an oxidized polysaccharide derivative (i.e., an oxidized alpha-1,4-glucan derivative), for example. Such alpha-1,4-glucan in some aspects can comprise about, or at least about, 50%, 60%, 70%, 80%, 85%, 90%, 91%, 92%, 93%, 94%, 95%, 96%, 97%, 98%, 99%, 99.5%, or 100% alpha-1,4 glycosidic linkages. In some aspects, accordingly, an alpha-1,4-glucan has about, or less than about, 50%, 40%, 30%, 20%, 15%, 10%, 9%, 8%, 7%, 6%, 5%, 4%, 3%, 2%, 1%, 0.5%, or 0% glycosidic linkages that are not alpha-1,4. Examples of alpha-1,4-glucan herein include amylose, amylopectin, and starch. Alpha-1,4-glucan such as starch can be derived from vegetable (e.g., potato, tapioca, peas, palm) or grain (e.g., corn, wheat, rice, barley) sources, for example.

The DPw, DPn, or DP of the alpha-1,4-glucan portion of an alpha-1,4-glucan derivative in some aspects can be about, or at least about, 10, 25, 50, 75, 100, 150, 200, 300, 400, 500, 600, 700, 800, 900, 1000, 1100, 1200, 1300, 1400, 1500, 1600, 1700, 1800, 1900, 2000, 2500, 3000, 3500, or 4000. DPw, DPn, or DP can optionally be expressed as a range between any two of these values.

A polysaccharide derivative in some aspects for producing an oxidized polysaccharide derivative herein can be a beta-glucan derivative. The glycosidic linkages of a beta-glucan derivative herein typically are about, or at least about, 80%, 81%, 82%, 83%, 84%, 85%, 86%, 87%, 88%, 89%, 90%, 91%, 92%, 93%, 94%, 95%, 96%, 97%, 98%, 99%, or 100% beta-glycosidic linkages. Examples of suitable beta-glucan derivatives include derivatives of beta-1,3-glucan (e.g., laminarin, paramylon, curdlan) and beta-1,4-glucan (cellulose).

A derivative of beta-1,4-glucan can be used herein to provide an oxidized polysaccharide derivative (i.e., an oxidized beta-1,4-glucan derivative), for example. Such beta-1,4-glucan typically comprises about 100% beta-1,4 glycosidic linkages. The DPw, DPn, or DP of the beta-1,4-glucan portion of an beta-1,4-glucan derivative in some aspects can be about, or at least about, 10, 25, 50, 75, 100, 150, 200, 300, 400, 500, 600, 700, 800, 900, 1000, 1100, 1200, 1300, 1400, 1500, 1600, 1700, 1800, 1900, 2000, 2500, 3000, 3500, or 4000. DPw, DPn, or DP can optionally be expressed as a range between any two of these values (e.g., 1000-2000, 1300-1700, 1400-1600).

A polysaccharide derivative in some aspects for producing an oxidized polysaccharide derivative herein can be a soy polysaccharide derivative. The soy polysaccharide portion of a soy polysaccharide derivative in some aspects can be as disclosed in U.S. Pat. Appl. Publ. No. 2018/0079832, which is incorporated herein by reference. In some aspects, a soy polysaccharide derivative for oxidation herein can be an ether, such as disclosed in Int. Pat. Appl. Publ. No. WO2016/133734, which is incorporated herein by reference.

A polysaccharide derivative in some aspects for producing an oxidized polysaccharide derivative herein can have a degree of substitution (DoS) up to about 3.0 (e.g., 0.001 to 3.0) with at least one organic group/substituent as presently disclosed. The DoS can be about, at least about, or up to about, 0.001, 0.0025, 0.005, 0.01, 0.025, 0.05, 0.075, 0.1, 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 (DoS can optionally be expressed as a range between any two of these values), for example. Some examples of DoS ranges herein include 0.05-2.0, 0.05-1.6, 0.05-1.5, 0.05-1.25, 0.05-1.0, 0.05-0.9, 0.05-0.8, 0.05-0.7, 0.05-0.6, 0.05-0.5, 0.1-2.0, 0.1-1.6, 0.1-1.5, 0.1-1.25, 0.1-1.0, 0.1-0.9, 0.1-0.8, 0.1-0.7, 0.1-0.6, 0.1-0.5, 0.15-2.0, 0.15-1.6, 0.15-1.5, 0.15-1.25, 0.15-1.0, 0.15-0.9, 0.15-0.8, 0.15-0.7, 0.15-0.6, 0.15-0.5, 0.2-2.0, 0.2-1.6, 0.2-1.5, 0.2-1.25, 0.2-1.0, 0.2-0.9, 0.2-0.8, 0.2-0.7, 0.2-0.6, 0.2-0.5, 0.25-2.0, 0.25-1.6, 0.25-1.5, 0.25-1.25, 0.25-1.0, 0.25-0.9, 0.25-0.8, 0.25-0.7, 0.25-0.6, 0.25-0.5, 0.3-2.0, 0.3-1.6, 0.3-1.5, 0.3-1.25, 0.3-1.0, 0.3-0.9, 0.3-0.8, 0.3-0.7, 0.3-0.6, 0.3-0.5, 0.4-2.0, 0.4-1.6, 0.4-1.5, 0.4-1.25, 0.4-1.0, 0.4-0.9, 0.4-0.8, 0.4-0.7, 0.4-0.6 and 0.4-0.5. In some aspects, an oxidized polysaccharide derivative herein can be characterized to have any of the foregoing DoS values/ranges.

Regarding polysaccharide derivatives herein that are glucan derivatives, for example, since there are at most three hydroxyl groups in a glucose monomeric unit of a glucan, the overall DoS of a glucan derivative can be no higher than 3.0. It would be understood by those skilled in the art that, since a glucan derivative as presently disclosed has a DoS with at least one type of organic group (e.g., between about 0.001 to about 3.0), all the substituents of a glucan derivative cannot only be hydroxyl. Any polysaccharide derivative of the present disclosure (to be oxidized to produce an oxidized polysaccharide derivative) can be derived from a polysaccharide disclosed herein.

A polysaccharide derivative in some aspects for producing an oxidized polysaccharide derivative herein is substituted with at least one organic group via an ether linkage, ester linkage, carbamate linkage, or a sulfonyl linkage. Thus, a polysaccharide derivative herein can be a polysaccharide ether, ester, carbamate, or sulfonyl derivative, for example. All the various linked groups disclosed herein are examples of organic groups; an organic group can be considered to comprise at least one carbon atom and at least one hydrogen atom, for example. An organic group of a polysaccharide derivative herein typically is not cationic/positive charged.

A polysaccharide derivative for oxidation herein can be a polysaccharide ether in some aspects. An organic group that is in ether-linkage to a polysaccharide herein can be an alkyl group, for example. An alkyl group can be a linear, branched, or cyclic ("cycloalkyl" or "cycloaliphatic") in some aspects. In some aspects, an alkyl group is a $C_1$ to $C_{18}$ alkyl group, such as a $C_4$ to $C_{18}$ alkyl group, or a $C_1$ to $C_{10}$ alkyl group (in "C #", # refers to the number of carbon atoms in the alkyl group). An alkyl group can be, for example, a methyl, ethyl, propyl, butyl, pentyl, hexyl, heptyl, octyl, nonyl, decyl, undecyl, dodecyl, tridecanyl, tetradecanyl, pentadecanyl, hexadecanyl, heptadecanyl, or octadecanyl group; such alkyl groups typically are linear. One or more carbons of an alkyl group can be substituted with another alkyl group in some aspects, making the alkyl group branched. Suitable examples of branched chain isomers of linear alkyl groups include isopropyl, iso-butyl, tert-butyl, sec-butyl, isopentyl, neopentyl, isohexyl, neohexyl, 2-ethylhexyl, 2-propylheptyl, and isooctyl. In some aspects, an alkyl group is a cycloalkyl group such as a cyclopentyl, cyclohexyl, cycloheptyl, cyclooctyl, cyclononyl, or cyclodecyl group.

In some aspects, an organic group that is in ether-linkage to a polysaccharide herein can be a substituted alkyl group in which there is a substitution on one or more carbons of the alkyl group. The substitution(s) can be one or more hydroxyl, aldehyde, ketone, and/or carboxyl groups. For example, a substituted alkyl group may be a hydroxy alkyl group, dihydroxy alkyl group, or carboxy alkyl group. Examples of suitable hydroxy alkyl groups are hydroxymethyl ($—CH_2OH$), hydroxyethyl (e.g., $—CH_2CH_2OH$, $—CH(OH)CH_3$), hydroxypropyl (e.g., $—CH_2CH_2CH_2OH$, $—CH_2CH(OH)CH_3$, $—CH(OH)CH_2CH_3$), hydroxybutyl and hydroxypentyl groups. Other examples include dihydroxy alkyl groups (diols) such as dihydroxymethyl, dihydroxyethyl (e.g., $—CH(OH)CH_2OH$), dihydroxypropyl (e.g., $—CH_2CH(OH)CH_2OH$, $—CH(OH)CH(OH)CH_3$), dihydroxybutyl and dihydroxypentyl groups. Examples of suitable carboxy alkyl groups are carboxymethyl ($—CH_2COOH$), carboxyethyl (e.g., $—CH_2CH_2COOH$, $—CH(COOH)CH_3$), carboxypropyl (e.g., $—CH_2CH_2CH_2COOH$, $—CH_2CH(COOH)CH_3$, $—CH(COOH)CH_2CH_3$), carboxybutyl and carboxypentyl groups.

In some aspects, one or more carbons of an alkyl group that is in ether-linkage to a polysaccharide herein can have a substitution(s) with another alkyl group. Examples of such substituent alkyl groups are methyl, ethyl and propyl groups. To illustrate, an organic group can be $—CH(CH_3)CH_2CH_3$ or $—CH_2CH(CH_3)CH_3$, for example, which are both propyl groups having a methyl substitution.

As should be clear from the above examples of various substituted alkyl groups, a substitution (e.g., hydroxy or carboxy group) on an alkyl group in some aspects can be at the terminal carbon atom of the alkyl group, where the terminal carbon group is opposite the side of the alkyl group that is in ether linkage to a monomeric unit (e.g., glucose) of a polysaccharide ether compound. An example of this terminal substitution is the hydroxypropyl group $—CH_2CH_2CH_2OH$. Alternatively, a substitution can be on an internal carbon atom of an alkyl group. An example of an internal substitution is the hydroxypropyl group —$CH_2CH(OH)CH_3$. An alkyl group can have one or more substitutions, which may be the same (e.g., two hydroxyl groups [dihydroxy]) or different (e.g., a hydroxyl group and a carboxyl group).

Optionally, an etherified alkyl group herein can contain one or more heteroatoms such as oxygen, sulfur, and/or nitrogen within the hydrocarbon chain. Examples include alkyl groups containing an alkyl glycerol alkoxylate moiety (-alkylene-$OCH_2CH(OH)CH_2OH$), a moiety derived from ring-opening of 2-ethylhexl glycidyl ether, and a tetrahydropyranyl group (e.g., as derived from dihydropyran). Further examples include alkyl groups substituted at their termini with a cyano group (—C≡N); such a substituted alkyl group can optionally be referred to as a nitrile or cyanoalkyl group. Examples of a cyanoalkyl group herein include cyanomethyl, cyanoethyl, cyanopropyl and cyanobutyl groups.

In some aspects, an etherified organic group is a $C_2$ to $C_{18}$ (e.g., $C_4$ to $C_{18}$) alkenyl group, and the alkenyl group may be linear, branched, or cyclic. As used herein, the term "alkenyl group" refers to a hydrocarbon group containing at least one carbon-carbon double bond. Examples of alkenyl groups include ethenyl, propenyl, butenyl, pentenyl, hexenyl, cyclohexyl, and allyl groups. In some aspects, one or more carbons of an alkenyl group can have substitution(s) with an alkyl group, hydroxyalkyl group, or dihydroxy alkyl group such as disclosed herein. Examples of such a substituent alkyl group include methyl, ethyl, and propyl groups. Optionally, an alkenyl group herein can contain one or more heteroatoms such as oxygen, sulfur, and/or nitrogen within the hydrocarbon chain; for example, an alkenyl group can contain a moiety derived from ring-opening of an allyl glycidyl ether.

In some aspects, an etherified organic group is a $C_2$ to $C_{18}$ alkynyl group. As used herein, the term "alkynyl" refers to linear and branched hydrocarbon groups containing at least one carbon-carbon triple bond. An alkynyl group herein can be, for example, propynyl, butynyl, pentynyl, or hexynyl. An alkynyl group can optionally be substituted, such as with an alkyl, hydroxyalkyl, and/or dihydroxy alkyl group. Optionally, an alkynyl group can contain one or more heteroatoms such as oxygen, sulfur, and/or nitrogen within the hydrocarbon chain.

In some aspects, an etherified organic group is a polyether comprising repeat units of (—$CH_2CH_2O$—), (—$CH_2CH(CH_3)O$—), or a mixture thereof, wherein the total number of repeat units is in the range of 2 to 100. In some aspects, an organic group is a polyether group comprising $(—CH_2CH_2O—)_{3-100}$ or $(—CH_2CH_2O—)_{4-100}$. In some aspects, an organic group is a polyether group comprising $(—CH_2CH(CH_3)O—)_{3-100}$ or $(—CH_2CH(CH_3)O—)_{4-100}$. As used herein for a polyether group, the subscript designating a range of values designates the potential number of repeat units; for example, $(CH_2CH_2O)_{2-100}$ means a polyether group containing 2 to 100 repeat units. In some aspects, a polyether group herein can be capped such as with a methoxy, ethoxy, or propoxy group.

In some aspects, an etherified organic group comprises an aryl group. As used herein, the term "aryl" means an aromatic/carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups, such as a methyl, ethyl, or propyl group. In some aspects, an aryl group is a $C_6$ to $C_{20}$ aryl group. In some aspects, an aryl group is a methyl-substituted aryl group such as a tolyl (—$CH_4CH_3$) or xylyl [—$CH_3(CH_3)_2$] group. A tolyl group can be a p-tolyl group, for instance. In some aspects, an aryl group is a benzyl group (—$CH_2$-phenyl). A benzyl group herein can optionally be substituted (typically on its phenyl ring) with one or more of a halogen, cyano, ester, amide, ether, alkyl (e.g., $C_1$ to $C_6$), aryl (e.g., phenyl), alkenyl (e.g., $C_2$ to $C_6$), or alkynyl (e.g., $C_2$ to $C_6$) group.

A polysaccharide ether in some aspects for oxidation can contain one type of etherified organic group. Examples of such compounds contain a carboxy alkyl group (e.g., carboxymethyl) as the only etherified organic group. Further examples include polysaccharide ethers containing an alkyl group (e.g., methyl, ethyl, propyl) as the only etherified organic group. Further examples include polysaccharide ethers containing a dihydroxyalkyl (e.g., dihydroxypropyl) as the only etherified organic group.

A polysaccharide ether in some aspects for oxidation can contain two or more different types of etherified organic groups (i.e., mixed ether of the polysaccharide). Examples of such polysaccharide ethers contain (i) two different alkyl groups as etherified organic groups, (ii) an alkyl group and a hydroxy alkyl group as etherified organic groups (alkyl hydroxyalkyl polysaccharide), (iii) an alkyl group and a carboxy alkyl group as etherified organic groups (alkyl carboxyalkyl polysaccharide), (iv) a hydroxy alkyl group and a carboxy alkyl group as etherified organic groups (hydroxyalkyl carboxyalkyl polysaccharide), (v) two different hydroxy alkyl groups as etherified organic groups, (vi) two different carboxy alkyl groups as etherified organic groups, (vii) a carboxy alkyl group and an aryl (e.g., benzyl) group. Non-limiting examples of some of these types of mixed ethers include ethyl hydroxyethyl polysaccharide, hydroxyalkyl methyl (e.g., hydroxypropyl methyl) polysaccharide, carboxymethyl hydroxyethyl polysaccharide, carboxymethyl hydroxypropyl polysaccharide and carboxymethyl benzyl polysaccharide. A mixed polysaccharide ether can be, in some instances, as disclosed in U.S. Patent Appl. Publ. No. 2020/0002646, which is incorporated herein by reference.

A polysaccharide derivative for oxidation herein can be a polysaccharide ester in some aspects. A polysaccharide ester derivative can comprise, for example, at least one acyl group —CO—R', wherein R' comprises a chain of 1 to 26 carbon atoms. R' can be linear, branched, or cyclic, for example. Examples of acyl groups herein that are linear include ethanoyl, propanoyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl, eicosanoyl, uneicosanoyl, docosanoyl, tricosanoyl, tetracosanoyl, pentacosanoyl, and hexacosanoyl. Common names for some of the above-listed acyl groups are acetyl (ethanoyl group), propionyl (propanoyl group), butyryl (butanoyl group), valeryl (pentanoyl group), caproyl (hexanoyl group); enanthyl (heptanoyl group), caprylyl (octanoyl group), pelargonyl (nonanoyl group), capryl (decanoyl group), lauroyl (dodecanoyl group), myristyl (tetradecanoyl group), palmityl (hexadecanoyl group), stearyl (octadecanoyl group), arachidyl (eicosanoyl group), behenyl (docosanoyl group), lignoceryl (tetracosanoyl group), and cerotyl (hexacosanoyl group).

In some aspects, an acyl group of a polysaccharide ester comprises an aryl group. An aryl acyl group can comprise a benzoyl group (—CO—$C_6H_5$), for example, which can also be referred to as a benzoate group. An aryl acyl group in some aspects can comprise a benzoyl group substituted with at least one halogen ("X"; e.g., Cl, F), alkyl, halogenated alkyl, ether, cyano, or aldehyde group, or combinations thereof, such as represented by the following Structures III(a) through III(r):

III (a)

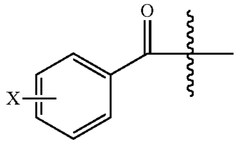

III (b)

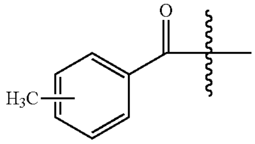

III (c)

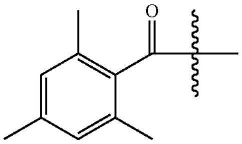

III (d)

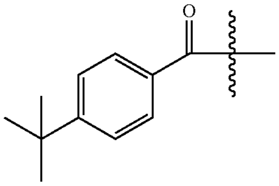

III (e)

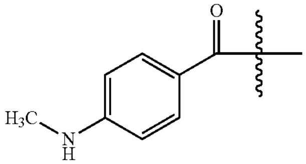

III (f)

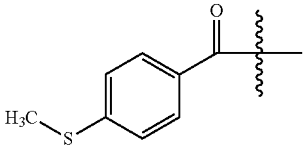

III (g)

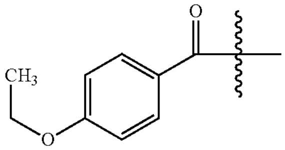

III (h)

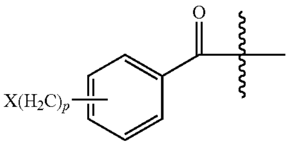

III (i)

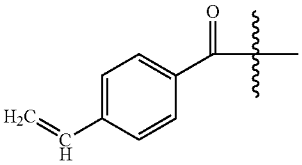

-continued

III (j)

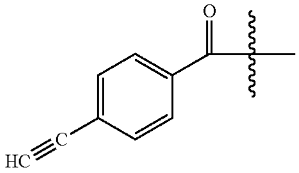

III (k)

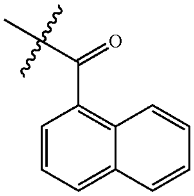

III (l)

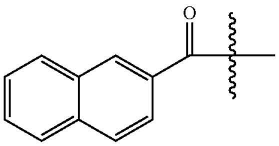

III (m)

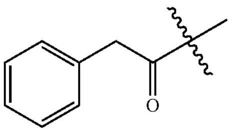

III (n)

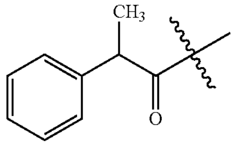

III (o)

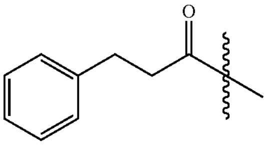

III (p)

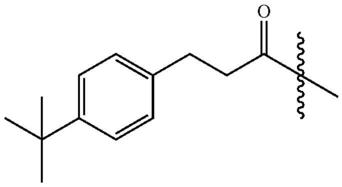

III (q)

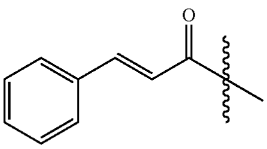

III (r)

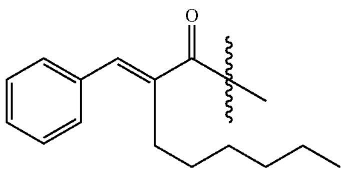

A polysaccharide ester derivative in some aspects can contain one type of esterified acyl group. An example of such a derivative contains an acetyl group as the only esterified acyl group. Yet, in some aspects, a polysaccharide ester derivative can contain two or more different types of esterified acyl groups (i.e., mixed ester of the polysaccharide). Examples of such mixed esters include those with at least (i) acetyl and propionyl groups, (ii) acetyl and butyryl groups, and (iii) propionyl and butyryl groups.

Acyl groups of an polysaccharide ester derivative herein can be as disclosed, for example, in U.S. Patent Appl. Publ. Nos. 2014/0187767, 2018/0155455, or 2020/0308371, U.S. Appl. No. 63/037,184, which are each incorporated herein by reference.

A polysaccharide derivative for oxidation herein can be a polysaccharide carbamate in some aspects. A polysaccharide carbamate derivative can comprise, for example, a carbamate group derived from an aliphatic, cycloaliphatic, or aromatic monoisocyanate. In some aspects, a substituent of a polysaccharide carbamate derivative can be a carbamate-linked phenyl, benzyl, diphenyl methyl, or diphenyl ethyl group; these groups can optionally be derived, respectively, using an aromatic monoisocyanate such as phenyl, benzyl, diphenyl methyl, or diphenyl ethyl isocyanate. In some aspects, a substituent of a polysaccharide carbamate derivative can be a carbamate-linked ethyl, propyl, butyl, tert-butyl, pentyl, hexyl, heptyl, octyl, nonyl, decyl, undecyl, or octadecyl group; these groups can optionally be derived, respectively, using an aliphatic monoisocyanate such as ethyl, propyl, butyl, tert-butyl, pentyl, hexyl, heptyl, octyl, nonyl, decyl, undecyl, or octadecyl isocyanate. In some aspects, a substituent of a polysaccharide carbamate derivative can be a carbamate-linked cyclohexyl, cycloheptyl, or cyclododecyl group; these groups can optionally be derived, respectively, using a cycloaliphatic monoisocyanate such as cyclohexyl, cycloheptyl, or cyclododecyl isocyanate.

Carbamate groups of a polysaccharide carbamate derivative herein can be as disclosed, for example, in Int. Pat. Appl. Publ. No. WO2020/131711, U.S. Appl. No. 63/037,076, which are each incorporated herein by reference.

A polysaccharide derivative for oxidation herein can be a polysaccharide sulfonyl derivative in some aspects. Sulfonyl groups of a polysaccharide sulfonyl derivative herein can be as disclosed, for example, in U.S. Appl. No. 63/037,076, which are each incorporated herein by reference.

An oxidized polysaccharide derivative of the present disclosure can be produced by contacting a polysaccharide derivative herein (e.g., ether, ester, carbamate, sulfonyl) under aqueous conditions with at least one agent that is capable of oxidizing the polysaccharide derivative. Examples of an agent herein (oxidation agent) for oxidizing a polysaccharide derivative include N-oxoammonium salts, periodate compounds, peroxide compounds, $NO_2$, $N_2O_4$, and/or ozone. Also for example, an oxidized polysaccharide derivative as disclosed herein can be prepared via application of an oxidation process as disclosed in Canadian Patent Publ. Nos. 2028284 or 2038640, or U.S. Pat. Nos. 4,985, 553, 2,894,945, 5,747,658, or 7595392, or U.S. Pat. Appl. Publ. Nos. 2015/0259439, 2018/0022834, or 2018/0079832, all of which are incorporated herein by reference.

An oxidation agent in some aspects for oxidizing a polysaccharide derivative herein can include one or more N-oxoammonium salts, such as those disclosed in U.S. Pat. Appl. Publ. Nos. 2015/0259439, 2018/0022834, or 2018/0079832 (ibid.). An N-oxoammonium salt herein has the following structure:

(Structure I)

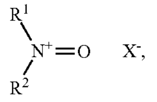

where $R^1$ and $R^2$ each represent the same or different organic groups (e.g., a linear or branched carbon chain), and $X^-$ is a counterion. Alternatively, $R^1$ and $R^2$ can each be part of the same group bound to the $N^+$, in which case $N^+$ is part of a ring structure (i.e., a cyclic N-oxoammonium salt). A cyclic N-oxoammonium salt useful herein has the following structure:

(Structure II)

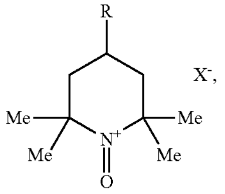

where each Me represents a methyl group, $X^-$ is a counterion, and R is a hydrogen (H), acetamido group, hydroxyl (—OH), amino (—$NH_2$), carboxyl (—COOH), methoxy (—$OCH_3$), cyano (—CN), oxo (=O), phosphonooxy [—O—$PO(OH)_2$], acetoxy (—O—CO—$CH_3$), benzoyloxy, acetamino, maleimido, or isothiocyanato group. It would be understood that where R in Structure II is an H, the cyclic N-oxoammonium salt is TEMPO salt. Examples of Structure II in which R is a moiety other than an H represent TEMPO salt that is substituted at carbon position 4 (where the $N^+$ in Structure II is position 1 in the ring). For example, where R is an acetamido group (—NH—CO—$CH_3$), the cyclic N-oxoammonium salt of Structure II is 4-acetamido-TEMPO salt. Thus, for example, an N-oxoammonium salt herein can be TEMPO salt having a substitution at carbon position 4. TEMPO salt, 4-acetamido-TEMPO salt, and/or any other cyclic N-oxoammonium salt herein (e.g., Structure II), can be used to oxidize a polysaccharide derivative as disclosed.

An N-oxoammonium salt herein (e.g., TEMPO salt, 4-acetamido-TEMPO salt) can be provided in some aspects by oxidizing an N-oxoammonium in aqueous conditions in which it is intended to have the N-oxoammonium salt contact (and oxidize) a polysaccharide ether. Examples of an N-oxoammonium herein have the following structure:

(Structure IV)

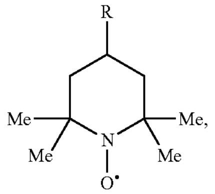

where each Me represents a methyl group and R is a hydrogen (H) (i.e., Structure IV is TEMPO), acetamido group (—NH—CO—$CH_3$) (i.e., Structure IV is 4-acetamido-TEMPO), hydroxyl (—OH), amino (—$NH_2$), carboxyl (—COOH), methoxy (—$OCH_3$), cyano (—CN), oxo (=O), phosphonooxy [—O—PO(OH)$_2$], acetoxy (—O—CO—$CH_3$), benzoyloxy, acetamino, maleimido, or isothiocyanato group. Each of these agents can be converted to its corresponding oxoammonium salt, as represented by Structure II, by contacting it with one or more oxidation agents (oxidants) under aqueous conditions. Thus, structure IV can also be considered as a precursor of an N-oxoammonium salt herein. TEMPO and its derivatives, such as above (e.g., 4-acetamido-TEMPO), are examples of cyclic nitroxyl compounds. Thus, a cyclic nitroxyl compound can be used to provide an N-oxoammonium salt herein, for example.

An N-oxoammonium agent can be oxidized under aqueous conditions herein to its corresponding N-oxoammonium salt by contacting the agent with one or more other oxidation agents (oxidants). This contacting can be performed, for example, in the same aqueous conditions in which a polysaccharide derivative is intended to be contacted with an N-oxoammonium salt. In some aspects, a reaction herein for oxidizing a polysaccharide derivative can initially be prepared to comprise, under aqueous conditions, at least a polysaccharide derivative, an N-oxoammonium agent, and one or more oxidants. The oxidant(s) can convert the N-oxoammonium agent to its corresponding N-oxoammonium salt, which in turn can oxidize the polysaccharide derivative.

Examples of oxidants that may be used to convert an N-oxoammonium agent herein to its corresponding N-oxoammonium salt such as TEMPO salt include one or more of a halite (e.g., a chlorite, such as sodium chlorite [$NaClO_2$]) or a hypohalite (e.g., a hypochlorite, such as sodium hypochlorite [NaClO]). Additional examples of oxidants that can be used to convert an N-oxoammonium agent to its corresponding N-oxoammonium salt include one or more of a halide salt such as KCl, KBr, NaCl, NaBr, or NaI; a hypohalite such as NaOBr; metals such as Fe(III), Mn(II), Mn(III), or Cu(II); $KMnO_4$; $Mn(OAc)_3$; $Mn_2O_3$; $MnO_2$; $Mn(NO_3)_2$; $MgCl_2$; $Mg(OAc)_2$; $Cu(NO_3)_2$; iodobenzene diacetate [$PhI(OAc)_2$]; $Ca(ClO)_2$; t-BuOCl; CuCl—$O_2$; $NaBrO_2$; $Cl_2$; $Br_2$; $NO_2$; $N_2O_4$; and trichloroisocyanuric acid.

For example, a hypochlorite such as NaClO and a halide salt such as NaBr can be used together in combination with an N-oxoammonium agent such as TEMPO in an oxidation reaction as presently disclosed.

An oxidation agent in some aspects for oxidizing a polysaccharide derivative herein can include one or more periodate compounds. A periodate compound can be a metal periodate (e.g., sodium periodate or potassium periodate), for example. A periodate compound can be a metaperiodate (e.g., $NaIO_4$) or an orthoperiodate in some aspects. Conditions herein for oxidizing a polysaccharide derivative with a periodate compound can, for example, follow those conditions as disclosed in U.S. Pat. Nos. 3,086,969, 6,800,753, 5,747,658, or 6635755, or U.S. Pat. Appl. Publ. Nos. 2015/0259439, 2018/0022834, or 2018/0079832, which are each incorporated herein by reference. Typically, an oxidation reaction employing periodate comprises providing a polysaccharide derivative in an aqueous periodate solution. The concentration of a periodate in a reaction can be about 1, 2, 3, 4, 5, 6, 7, 8, 9, or 10 wt %, for example. The temperature of a reaction herein comprising a periodate can be between about 18° C. to about 40° C. (e.g., room temperature), for example. In some aspects, a reaction comprising a periodate can proceed for about 1-72 hours (e.g., ~5 hours or ~48 hours).

In some aspects, an oxidized polysaccharide derivative can be produced by first contacting a polysaccharide derivative with a periodate compound, followed by contacting the periodate-oxidized polysaccharide derivative with an N-oxoammonium salt. Such a sequential oxidation treatment can follow any of the processes disclosed in U.S. Pat. Appl. Publ. Nos. 2015/0259439, 2018/0022834, or 2018/0079832 (ibid.), for example.

An oxidation agent in some aspects for oxidizing a polysaccharide derivative herein can include one or more peroxide compounds. A peroxide compound can be hydrogen peroxide, for example. In some aspects, a peroxide compound can be an inorganic peroxide compound or an organic peroxide compound. Suitable peroxide compounds herein further include perborate-monohydrate, perborate-tetrahydrate, percarbonates, alkali persulphates, persilicates, and percitrates, in which sodium or calcium is the preferred cation, as well as hydrogen peroxide adducts of urea or amine oxides, for example. In some aspects, an oxidized polysaccharide derivative is produced by first contacting a polysaccharide derivative with a peroxide compound, followed by contacting the peroxide-oxidized polysaccharide derivative with an N-oxoammonium salt. The amount of peroxide in an oxidation reaction can be about 1, 2, 3, 4, 5, 6, 7, 8, 9, or 10 wt %, for example. A reaction employing a peroxide compound herein can have a neutral pH (e.g., pH 6-8) in some aspects. The temperature of a reaction comprising a peroxide can be between about 110° C. to about 140° C. (e.g., ~121° C.), for example. It would be understood that achieving such elevated reaction temperatures can involve application of pressure, such as can be provided with an autoclave or other high pressure device. In some aspects, an oxidation reaction comprising a peroxide can proceed for about 30 minutes to about 120 minutes (e.g., ~60 minutes).

Aqueous conditions are used in reactions herein for oxidizing a polysaccharide derivative. Aqueous conditions suitable for an oxidation reaction herein include a solution or mixture in which the solvent is about, or at least about, 60, 65, 70, 75, 80, 85, 90, 95, 96, 97, 98, 99, or 100 wt % water, for example. Aqueous conditions can comprise a buffer, for example, such as an acidic, neutral, or alkaline buffer, at a suitable concentration and selected based on the pH range provided by the buffer. Examples of buffers include citric acid, acetic acid, $KH_2PO_4$, CHES and borate.

Aqueous conditions herein can be acidic, having a pH of about, or less than about, 5.5, 5.0, 4.5, 4.0, 3.5, 3.0, 2.5, or 2.0, for example. Acidic conditions can be prepared by a variety of means, such as by adding acetic acid and/or an acetate salt to a solution or mixture. For example, a sodium acetate buffer (acetate buffer) (pH 4-5) (e.g., 0.2-0.3 M solution) can provide acidic conditions.

Aqueous conditions herein can be basic, having a pH of about, or more than about, 8.5, 9.0, 9.5, 10.0, 10.5, 11.0, 11.5, or 12, for example. Basic conditions can be prepared by a variety of means, such as by adding an alkaline hydroxide (e.g., sodium hydroxide) to a solution or mixture.

A polysaccharide derivative herein can be included in an oxidation reaction at about, or at least about, 0.1, 0.25, 0.5, 0.75, 1, 2, 3, 4, 5, 6, 7, 8, 9, 10, 11, 12, 13, 14, 15, 17.5, 20, 22.5, 25, 27.5, 30, 32.5, 35, 8-17.5, 8-15, 10-17.5, or 10-15 wt % of the reaction, for example. A polysaccharide derivative can be added (e.g., mixed or dissolved) into aqueous conditions before or after addition of oxidation agent(s) to the aqueous conditions. A polysaccharide derivative can be provided in some aspects of preparing an oxidation reaction in a dry form (e.g., powder, flakes), wet form (e.g., aqueous solution, wet cake), or any other suitable form for preparing an oxidation reaction. In some aspects, a polysaccharide derivative can be introduced to an oxidation reaction by using some of (e.g. >90 wt %), or all of, the derivatization reaction in which the polysaccharide derivative was produced (e.g., etherification, esterification, carbamation, of sulfonylation reaction); i.e., such a polysaccharide derivative is not purified or otherwise isolated before being subject to an oxidation reaction.

An N-oxoammonium agent, such as TEMPO or 4-acetamido-TEMPO, can be included in an oxidation reaction herein at about, or at least about, 0.05, 0.075, 0.1, 0.25, 0.5, 0.75, 1, or 2 wt % of the reaction, for example. In some aspects, an N-oxoammonium agent can be added to an oxidation reaction in which polysaccharide derivative has already been mixed or dissolved. Such addition can be made before, after, or at the same time of, the addition of an oxidant for oxidizing the N-oxoammonium agent to an N-oxoammonium salt. An oxidant herein (e.g., sodium bromide and/or sodium hypochlorite) can be included in an oxidation reaction herein at about, or at least about, 0.1, 0.25, 0.5, 0.75, 1, 2, 3, 4, 5, 10, 15, 20, 25, 30, 35, 40, 45, 50, 2-12, 4-12, 2-10, or 4-10 wt % of the reaction, for example.

The time period for which a polysaccharide derivative herein is contacted with at least one oxidation agent herein under aqueous conditions can be about, or at least about, 0.5, 1, 4, 8, 12, 16, 20, 24, 28, 32, 36, 40, 44, 48, 72, or 96 hours (or any integer value between 1 to 96 hours), for example. A reaction can be maintained for about 0.5-5 hours (e.g., ~1 hour) or 24-96 hours (e.g., ~48 hours) in some aspects. The period of time for contacting a polysaccharide derivative with at least one oxidation agent under aqueous conditions can be measured, for example, from the point of time after each reaction component has been dissolved and/or mixed in the aqueous conditions.

The temperature of aqueous conditions of an oxidation reaction herein can be about 18° C. to about 40° C. (or any integer value between 18 to 40° C.) in some aspects (e.g., when employing a periodate and/or N-oxoammonium salt). Aqueous conditions in some aspects can be maintained at a temperature of about 20-25° C. The temperature of aqueous conditions can be maintained from the time in which each reaction component has been dissolved and/or mixed under the aqueous conditions, until the reaction is completed.

Upon completion of an oxidation reaction in which acidic or basic aqueous conditions are used, the pH of the reaction can optionally be neutralized. Neutralization of an acidic reaction can be performed using one or more bases (e.g., an alkali hydroxide such as sodium hydroxide). Neutralization of a basic reaction can be performed using one or more acids (e.g., an inorganic acid such as hydrochloric acid). The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0).

The present disclosure also concerns a method of producing an oxidized polysaccharide derivative. Such a method typically comprises:

(a) contacting a polysaccharide derivative under aqueous conditions with at least one agent that is capable of oxidizing the polysaccharide derivative, wherein the polysaccharide derivative has a degree of substitution (DoS) up to about 3.0 with at least one organic group, thereby producing an oxidized polysaccharide derivative; and (b) optionally isolating the oxidized polysaccharide derivative. Any of the features described above regarding oxidizing a polysaccharide derivative can be applied accordingly in this oxidation method.

An oxidized polysaccharide derivative produced in an oxidation reaction herein can optionally be isolated. In some aspects, such a product can first be precipitated from the aqueous conditions of the reaction. Precipitation can be performed by adding an excess amount (e.g., at least 2-3 times the volume of the reaction volume) of an alcohol (e.g., 100% or 95% concentration) such as methanol, ethanol, or isopropanol to the reaction. A precipitated product can then be isolated using a filtration funnel, centrifuge, press filter, or any other method or equipment that allows for removal of liquids from solids. The isolated product can be dried, such as by vacuum drying, air drying, or freeze drying.

In some aspects, an oxidized polysaccharide derivative product can instead be isolated by including a step in which the completed reaction, or a water-diluted form thereof, is filtered by ultrafiltration (e.g., with a 5 or 10 molecular weight cut-off filter). Optionally, a complete reaction or diluted form thereof can first be regularly filtered (i.e., not ultrafiltration), and then the filtrate can be subjected to ultrafiltration. The concentrated liquid obtained by ultrafiltration can then be dried down to its constituent solids such as by freeze-drying, or the solids can be precipitated from the liquid and then dried (e.g., freeze-drying).

An oxidized polysaccharide derivative product herein can optionally be washed, following precipitation or drying, one or more times with a liquid that does not readily dissolve the compound. For example, an oxidized product can be washed with alcohol, acetone, aromatics, or any combination of these, depending on the solubility of the oxidized product therein (where lack of solubility is desirable for washing). In general, a solvent comprising an organic solvent (e.g. 95-100%) such as alcohol is preferred for washing an oxidized polysaccharide derivative product. Washing can be done one or more times with an aqueous solution containing an alcohol (e.g., methanol or ethanol), for example.

Any of the above oxidation reactions can be repeated using an oxidized polysaccharide derivative product herein as the starting material for further modification. Such further modification can be with the same oxidation agent used in the first reaction, or with a different oxidation agent. A polysaccharide derivative for oxidation, in some aspects is aqueous-insoluble, whereas it is aqueous-soluble in some aspects.

A polysaccharide derivative or oxidized polysaccharide derivative disclosed herein can be present in a composition/system, such as an aqueous composition/system or dry composition/system, at about, at least about, or less than about, 0.01, 0.05, 0.1, 0.2, 0.25, 0.3, 0.4, 0.5, 0.6, 0.7, 0.75, 0.8, 0.9, 1.0, 1.2, 1.25, 1.4, 1.5, 1.6, 1.75, 1.8, 2.0, 2.25, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 0.01-0.1, 0.01-0.08, 0.01-0.06, 0.01-0.05, 0.03-0.1, 0.03-0.08, 0.03-0.06, 0.03-0.05, 4-12, 4-10, 4-8, 5-12, 5-10, 5-8, 6-12, 6-10, or 6-8 wt % or w/v %, for example, or a range between any two of these values. The liquid component of an aqueous composition herein can be an aqueous fluid such as water or aqueous solution, for instance. The solvent of an aqueous solution typically is water, or can comprise about, or at least about, 10, 20, 30, 40, 50, 60, 70, 80, 90, 95, 98, or 99 wt % water, for example. Reference herein to an aqueous composition or dry composition can also be with respect to an aqueous system or dry system, respectively.

An aqueous composition comprising a polysaccharide derivative or oxidized polysaccharide derivative herein can have a viscosity of about, or at least about, 1, 5, 10, 100, 200, 300, 400, 500, 600, 700, 1000, 2000, 3000, 4000, 5000, 6000, 7000, 8000, 9000, 10000, or 15000 centipoise (cps), for example. Viscosity can be as measured with an aqueous composition at any temperature between about 3° C. to about 80° C., for example (e.g., 4-30° C., 15-30° C., 15-25° C.). Viscosity typically is as measured at atmospheric pressure (about 760 torr) or a pressure that is ±10% thereof. Viscosity can be measured using a viscometer or rheometer, for example, and can optionally be as measured at a shear rate (rotational shear rate) of about 0.1, 0.5, 1.0, 5, 10, 50, 100, 500, 1000, 0.1-500, 0.1-100, 1.0-500, 1.0-1000, or 1.0-100 $s^{-1}$ (1/s), for example.

An aqueous composition in some aspects comprising a polysaccharide derivative or oxidized polysaccharide derivative can have one or more salts/buffers (e.g., $Na^+$, $Cl^-$, NaCl, phosphate, tris, citrate) (e.g., 5, 0.1, 0.5, 1.0, 2.0, or 3.0 wt %) and/or a pH of about 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 4.0-10.0, 4.0-9.0, 4.0-8.0, 5.0-10.0, 5.0-9.0, 5.0-8.0, 6.0-10.0, 6.0-9.0, 6.0-8.0, 9.0-13.5, 10.0-13.5, 10.5-13.5, 11.0-13.5, 9.0-13.0, 10.0-13.0, 10.5-13.0, or 11.0-13.0, for example. A polysaccharide derivative or oxidized polysaccharide derivative herein, can be anionic or uncharged (nonionic), for example. Typically, an oxidized polysaccharide derivative is anionic. The charge of a polysaccharide derivative or oxidized polysaccharide derivative herein can be as it exists when the polysaccharide derivative or oxidized polysaccharide derivative is in an aqueous composition herein, for example, further taking into account the pH of the aqueous composition (in some aspects, the pH can be 4-10 or 5-9, or any pH as disclosed above).

The temperature of a composition herein comprising a polysaccharide derivative or oxidized polysaccharide derivative (e.g., aqueous composition) can be about, or up to about, or less than about, 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160,0-160, 0-150, 0-140, 0-130, 0-120, 0-110, 0-100, 0-90, 0-80, 0-70, 0-60, 10-160, 10-150, 10-140, 10-130, 10-120, 10-110, 10-100, 10-90, 10-80, 10-70, 10-60, 50-80, 50-75, 50-70, 50-65, 55-80, 55-75, 55-70, 55-65, 60-80, 60-75, 60-70, 60-65, 5-50, 15-25, 20-25, 20-30, or 20-40° C., for example.

A composition herein comprising a polysaccharide derivative or oxidized polysaccharide derivative can, in some aspects, be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition typically has about, or no more than about, 12, 10, 8, 6, 5, 4, 3, 2, 1.5, 1.0, 0.5, 0.25, 0.10, 0.05, or 0.01 wt % water comprised therein. In some aspects (e.g., those directed to laundry or dish washing detergents), a dry composition herein can be provided in a sachet or pouch.

A composition herein comprising a polysaccharide derivative or oxidized polysaccharide derivative can, in some aspects, be a detergent composition. Examples of such compositions are disclosed herein as detergents for dishwashing and detergents for fabric care.

A composition herein comprising a polysaccharide derivative or oxidized polysaccharide derivative can, in some aspects, comprise one or more salts such as a sodium salt (e.g., NaCl, $Na_2SO_4$). Other examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in a composition, for example. A salt can be present in an aqueous composition herein at a wt % of about, or at least about, 0.01, 0.025, 0.05, 0.075, 0.1, 0.25, 0.5, 0.75, 1.0, 1.25, 1.5, 1.75, 2.0, 2.5, 3.0, 3.5, 0.01-3.5, 0.5-3.5, 0.5-2.5, or 0.5-1.5 wt % (such wt % values typically refer to the total concentration of one or more salts), for example.

A composition herein comprising a polysaccharide derivative or oxidized polysaccharide derivative can optionally contain one or more enzymes (active enzymes). Examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, and amylases. If an enzyme(s) is included, it can be comprised in a composition herein at about 0.0001-0.1 wt % (e.g., 0.01-0.03 wt %) active enzyme (e.g., calculated as pure enzyme protein), for example. In fabric care or automatic dishwashing applications, an enzyme (e.g., any of the above such as cellulase, protease, amylase, and/or lipase) can be present in an aqueous composition in which a fabric or dish is treated (e.g., wash liquor, grey water) at a concentration that is minimally about 0.01-0.1 ppm total enzyme protein, or about 0.1-10 ppb total enzyme protein (e.g., less than 1 ppm), to maximally about 100, 200, 500, 1000, 2000, 3000, 4000, or 5000 ppm total enzyme protein, for example.

A polysaccharide derivative or oxidized polysaccharide derivative in some aspects is biodegradable. Such biodegradability can be, for example, as determined by the Carbon Dioxide Evolution Test Method (OECD Guideline 301B, incorporated herein by reference), to be about, at least about, or at most about, 5%, 10%, 15%, 20%, 25%, 30%, 35%, 40%, 45%, 50%, 55%, 60%, 65%, 70%, 75%, 80%, 85%, 90%, 5-60%, 5-80%, 5-90%, 40-70%, 50-70%, 60-70%, 40-75%, 50-75%, 60-75%, 70-75%, 40-80%, 50-80%, 60-80%, 70-80%, 40-85%, 50-85%, 60-85%, 70-85%, 40-90%, 50-90%, 60-90%, or 70-90%, or any value between 5% and 90%, after 15, 30, 45, 60, 75, or 90 days of testing. Biodegradability in some aspects can be with respect to an incumbent material (e.g., an incumbent dispersing agent) such as a polyacrylate. It is contemplated that the biodegradability of a polysaccharide derivative or oxidized polysaccharide derivative herein can be about, at least about, or at most about, 10%, 25%, 50%, 75%, 100%, 150%, 200%, 250%, 500%, 750%, or 1000% higher than the biodegradability of an incumbent material; such biodegradability can be as determined above, for example.

A composition can comprise one, two, three, four or more different polysaccharide derivatives and/or oxidized polysaccharide derivatives herein. For example, a composition can comprise at least one type of oxidized polysaccharide derivative and at least one type of polysaccharide derivative; in some aspects, the latter can be a precursor compound of the former (e.g., carboxymethyl polysaccharide is used with oxidized carboxymethyl polysaccharide).

In some aspects, an aqueous composition herein comprising a polysaccharide derivative (e.g., a glucan substituted with at least one organic group that comprises a carboxylic acid group or a sulfonate group) or oxidized polysaccharide derivative further comprises at least one cation, and the polysaccharide derivative or oxidized polysaccharide derivative is bound to the cation. Such binding is typically via ionic bonding. Examples of a cation include one or more hard water cations such as $Ca^{2+}$ and/or $Mg^{2+}$. The binding of a polysaccharide derivative or oxidized polysaccharide derivative herein to a cation in an aqueous composition/system can act to soften the water (act as a builder) of the aqueous composition/system.

An aqueous composition/system in which a polysaccharide derivative or oxidized polysaccharide derivative herein can bind to at least one cation can be wash liquor/grey water being used to wash dishware herein (e.g., in an automatic dishwashing machine) or fabric-containing articles herein (e.g., clothes, such as in a laundry machine), or any other aqueous composition/system to which a detergent has been added for washing and/or providing maintenance, for example; such an aqueous composition/system typically can benefit from the ability of the polysaccharide derivative or oxidized polysaccharide derivative to prevent/reduce negative effects (e.g., scale deposition and/or scum formation) caused by the presence of one or more cations. In some aspects, an aqueous composition/system in which a polysaccharide derivative or oxidized polysaccharide derivative can bind to at least one cation can be any system disclosed herein in which water or an aqueous solution is circulated, transited, and/or stored (a detergent does not necessarily need to be present); such a system typically can also benefit for the same reasons as disclosed above. Typically, a polysaccharide derivative or oxidized polysaccharide derivative herein can act as a builder/softener by sequestering/chelating and/or precipitating cations. An aqueous-soluble polysaccharide derivative or oxidized polysaccharide derivative herein can, in some aspects, bind cations and remain aqueous-soluble. The binding (or other interaction, whatever the case may be) between a polysaccharide derivative or oxidized polysaccharide derivative herein with a cation can prevent/reduce formation (e.g., by about, or at least about 10%, 20%, 30%, 40%, 50%, 60%, 70%, or 80%, as compared to not using the polysaccharide derivative or oxidized polysaccharide derivative) of undesired insoluble salts (e.g., carbonates such as $CaCO_3$ or $MgCO_3$, hydroxides such as $Mg(OH)_2$ or $Ca(OH)_2$, sulfates such a $CaSO_4$) and/or other insoluble compounds (e.g., calcium and/or magnesium salts of fatty acids such as stearate), and/or their deposits (e.g., scale, scum such as soap scum) that can form in aqueous systems having hard water cations. In some aspects, scale can comprise $CaCO_3$, $MgCO_3$, $CaSO_4$, $Fe_2O_3$, FeS, and/or $FeS_2$.

In addition to those mentioned above, some examples of aqueous systems herein that can be treated with a polysaccharide derivative or oxidized polysaccharide derivative herein include those of an industrial setting. Examples of industrial settings herein include those of an energy (e.g., fossil fuel such as petroleum or natural gas), water (e.g., water treatment and/or purification, industrial water, wastewater treatment), agriculture (e.g., grain, fruits/vegetables, fishing, aquaculture, dairy, animal farming, timber, plants), chemical (e.g., pharmaceutical, chemical processing), food processing/manufacturing, mining, or transportation (e.g., fresh water and/or maritime shipping, train or truck container) industry. Further examples of aqueous systems herein that can be treated with a polysaccharide derivative or oxidized polysaccharide derivative herein include those for water treatment, water storage, and/or other water-bearing system (e.g., piping/conduits, heat exchangers, condensers, filters/filtration systems, storage tanks, water cooling towers, water cooling systems/apparati, pasteurizers, boilers, sprayers, nozzles, ship hull, ballast water). Further examples of aqueous systems herein that can be treated with a polysaccharide derivative or oxidized polysaccharide derivative herein include those of a medical/dental/healthcare setting (e.g., hospital, clinic, examination room, nursing home), food service setting (e.g., restaurant, commissary kitchen, cafeteria), retail setting (e.g., grocery, soft drink machine/dispenser), hospitality/travel setting (e.g., hotel/motel), sports/recreational setting (e.g., aquatics/tubs, spa), or office/home setting (e.g., bathroom, tub/shower, kitchen, appliances [e.g., laundry machine, automatic dishwashing machine, fridge, freezer], sprinkler system, home/building water piping, water storage tank, water heater). Further examples of aqueous systems herein that can be treated with a polysaccharide derivative or oxidized polysaccharide derivative herein include those as disclosed in any of U.S. Patent Appl. Publ. Nos. 2013/0029884, 2005/0238729, 2010/0298275, 2016/0152495, 2013/0052250, 2015/009891, 2016/0152495, 2017/0044468, 2012/0207699, or 2020/0308592, or U.S. Pat. Nos. 4,552,591, 4,925,582, 6,478,972, 6,514,458, 6,395,189, 7,927,496, or 8784659, which are all incorporated herein by reference. In some aspects, an aqueous system that can be treated herein comprises (i) salt water such as seawater, or (ii) an aqueous solution having about 2.0, 2.25, 2.5, 2.75, 3.0, 3.25, 3.5, 3.75, 4.0, 2.5-4.0, 2.75-4.0, 3.0-4.0, 2.5-3.5, 2.75-3.5, 3.0-3.5, 3.0-4.0, or 3.0-3.5 wt % of one or a combination of salts (e.g., including at least NaCl).

In some aspects, an oxidized polysaccharide (e.g., oxidized alpha-1,3-glucan) can be used instead of an oxidized polysaccharide derivative (i.e., the oxidized polysaccharide was not a derivative prior to being oxidized). An oxidized polysaccharide can be based on any polysaccharide as disclosed herein, for example. In some aspects, an oxidized polysaccharide (e.g., oxidized alpha-1,3-glucan) can form a complex with a hard water salt herein (e.g., a carbonate such as $CaCO_3$); such a complex can comprise a hard water salt that is enveloped/covered (e.g., 100%, or at least 80%, 85%, 90%, 95%, 98%, 99% enveloped/covered) by the oxidized polysaccharide. Such a complex typically is water-insoluble; because of this feature, such a complex can be readily removed from an aqueous composition. Thus, further disclosed herein is a method comprising treating an aqueous composition having at least one hard water salt (e.g., a carbonate such as $CaCO_3$ or $MgCO_3$, a hydroxide such as $Ca(OH)_2$ or $Mg(OH)_2$, a sulfate such a $CaSO_4$) with at least one oxidized polysaccharide herein, where the treatment results in the formation of a water-insoluble complex comprising the hard water salt and the oxidized polysaccharide. This method can optionally further comprise removing all or most of the water-insoluble complexes (that formed during the treatment step) from the aqueous composition. To the extent that this method removes a water-insoluble hard water salt, such a method can optionally be considered as a flocculation method. A water-insoluble complex herein comprising at least one oxidized polysaccharide and at least one hard water salt can be used as an ingredient in various products, such as a paper product. Thus, a product such as paper is disclosed herein comprising a complex that comprises an oxidized polysaccharide and a hard water salt. In some aspects, a glucan derivative or an oxidized polysaccharide derivative as presently disclosed can be used instead of an oxidized polysaccharide for methods and compositions related to the removal of a hard water salt from an aqueous composition.

A composition comprising a polysaccharide derivative or oxidized polysaccharide derivative herein, such as an aqueous composition or a non-aqueous composition (above), can be in the form of a household care product, personal care product, industrial product, ingestible product (e.g., food product), or pharmaceutical product, for example, such as described in any of U.S. Patent Appl. Publ. Nos. 2018/0022834, 2018/0237816, 2018/0230241, 20180079832, 2016/0311935, 2016/0304629, 2015/0232785, 2015/0368594, 2015/0368595, 2016/0122445, 2019/0202942, or 2019/0309096, or International Patent Appl. Publ. No. WO2016/133734, which are all incorporated herein by reference. In some aspects, a composition comprising a polysaccharide derivative or oxidized polysaccharide derivative can comprise at least one component/ingredient of a household care product, personal care product, industrial product, pharmaceutical product, or ingestible product (e.g., food product) as disclosed in any of the foregoing publications and/or as presently disclosed.

A polysaccharide derivative or oxidized polysaccharide derivative disclosed herein is believed to be useful for providing one or more of the following physical properties to a personal care product, pharmaceutical product, household product, industrial product, or ingestible product (e.g., food product): thickening, freeze/thaw stability, lubricity, moisture retention and release, texture, consistency, shape retention, emulsification, binding, suspension, dispersion, gelation, reduced mineral hardness, for example. Examples of a concentration or amount of a polysaccharide derivative or oxidized polysaccharide derivative in a product can be any of the weight percentages provided herein, for example.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient, if desired. An active ingredient is generally recognized as an ingredient that causes an intended pharmacological effect.

In some aspects, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example.

Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil. A skin care product can be an ointment, lotion, or sanitizer (e.g., hand sanitizer) in some aspects.

A personal care product herein can also be in the form of makeup, lipstick, mascara, rouge, foundation, blush, eyeliner, lip liner, lip gloss, other cosmetics, sunscreen, sun block, nail polish, nail conditioner, bath gel, shower gel, body wash, face wash, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, aftershaving product, cleanser, skin gel, rinse, dentifrice composition, toothpaste, or mouthwash, for example. An example of a personal care product (e.g., a cleanser, soap, scrub, cosmetic) comprises a carrier or exfoliation agent (e.g., jojoba beads [jojoba ester beads]) (e.g., about 1-10, 3-7, 4-6, or 5 wt %); such an agent may optionally be dispersed within the product.

A personal care product in some aspects can be a hair care product. Examples of hair care products herein include shampoo, hair conditioner (leave-in or rinse-out), cream rinse, hair dye, hair coloring product, hair shine product, hair serum, hair anti-frizz product, hair split-end repair product, mousse, hair spray, and styling gel. A hair care product can be in the form of a liquid, paste, gel, solid, or powder in some embodiments. A hair care product as presently disclosed typically comprises one or more of the following ingredients, which are generally used to formulate hair care products: anionic surfactants such as polyoxyethylenelauryl ether sodium sulfate; cationic surfactants such as stearyltrimethylammonium chloride and/or distearyltrimethylammonium chloride; nonionic surfactants such as glyceryl monostearate, sorbitan monopalmitate and/or polyoxyethylenecetyl ether; wetting agents such as propylene glycol, 1,3-butylene glycol, glycerin, sorbitol, pyroglutamic acid salts, amino acids and/or trimethylglycine; hydrocarbons such as liquid paraffins, petrolatum, solid paraffins, squalane and/or olefin oligomers; higher alcohols such as stearyl alcohol and/or cetyl alcohol; superfatting agents; antidandruff agents; disinfectants; anti-inflammatory agents; crude drugs; water-soluble polymers such as methyl cellulose, hydroxycellulose and/or partially deacetylated chitin; antiseptics such as paraben; ultra-violet light absorbers; pearling agents; pH adjustors; perfumes; and pigments.

A pharmaceutical product herein can be in the form of an emulsion, liquid, elixir, gel, suspension, solution, cream, or ointment, for example. Also, a pharmaceutical product herein can be in the form of any of the personal care products disclosed herein, such as an antibacterial or antifungal composition. A pharmaceutical product can further comprise one or more pharmaceutically acceptable carriers, diluents, and/or pharmaceutically acceptable salts. A polysaccharide derivative or oxidized polysaccharide derivative herein can also be used in capsules, encapsulants, tablets, tablet coatings, and as an excipients for medicaments and drugs.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; latex; gels such as water-based gels; surfactant solutions; paints such as water-based paints; protective coatings; adhesives; sealants and caulks; inks such as water-based ink; metal-working fluids; films or coatings; or emulsion-based metal cleaning fluids used in electroplating, phosphatizing, galvanizing and/or general metal cleaning operations, for example. In some aspects, a polysaccharide derivative or oxidized polysaccharide derivative herein is comprised in a fluid as a viscosity modifier and/or friction reducer; such uses include downhole operations/fluids (e.g., in hydraulic fracturing and enhanced oil recovery).

In some aspects, a composition comprising a polysaccharide derivative or oxidized polysaccharide derivative herein can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, “stain-stick”, or pre-treatments; substrate-laden products such as dry and wetted wipes, pads, or sponges; sprays and mists; water-soluble unit dose articles. As further examples, a composition herein can be in the form of a liquid, a gel, a powder, a hydrocolloid, an aqueous solution, a granule, a tablet, a capsule, a bead or pastille, a single compartment sachet, a multi-compartment sachet, a single compartment pouch, or a multi-compartment pouch.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition (e.g., of a fabric care product or any other product herein) typically comprises one or more surfactants, wherein the surfactant is selected from nonionic surfactants, anionic surfactants, cationic surfactants, ampholytic surfactants, zwitterionic surfactants, semi-polar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the detergent composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference). However, in some aspects, a detergent composition does not comprise a surfactant, or has less than 5, 4, 3, 2, 1, 0.5, 0.25, 0.1, 0.05, or 0.025 wt % of a surfactant (such a “detergent composition” can optionally be referred to as a “composition”, “washing composition”, or “treating composition”, for example; any disclosure herein of a detergent composition does not necessarily need to comprise a surfactant in some aspects).

A detergent composition herein can optionally comprise one or more detergent builders or builder systems, in addition to the polysaccharide derivatives and/or oxidized polysaccharide derivatives disclosed herein that can function as builders. In some aspects, oxidized alpha-1,3-glucan can be included as a co-builder; oxidized alpha-1,3-glucan compounds for use herein are disclosed in U.S. Patent Appl. Publ. No. 2015/0259439. In some aspects incorporating at least one builder, the cleaning compositions comprise at least about 1%, from about 3% to about 60%, or even from about 5% to about 40%, builder by weight of the composition. Examples of builders include alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Additional examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst).

In some embodiments, builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present disclosure, including those known in the art (See, e.g., EP2100949).

In some embodiments, suitable builders can include phosphate builders and non-phosphate builders. In some embodiments, a builder is a phosphate builder. In some embodiments, a builder is a non-phosphate builder. A builder can be used in a level of from 0.1% to 80%, or from 5% to 60%, or from 10% to 50%, by weight of the composition. In some embodiments, the product comprises a mixture of phosphate and non-phosphate builders. Suitable phosphate builders include mono-phosphates, di-phosphates, tri-polyphosphates or oligomeric-polyphosphates, including the alkali metal salts of these compounds, including the sodium salts.

In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include ammonium and/or alkali metal salts, i.e., lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to copper, iron and/or manganese chelating agents and mixtures thereof. In embodiments in which at least one chelating agent is used, the composition comprises from about 0.1% to about 15%, or even from about 3.0% to about 10%, chelating agent by weight of the composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethyl ethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, a composition herein may comprise from about 0.0001% to about 10%, from about 0.01% to about 5%, or even from about 0.1% to about 3%, by weight of the composition.

A detergent composition herein can comprise silicates. In some of these embodiments, sodium silicates (e.g., sodium disilicate, sodium metasilicate, and/or crystalline phyllosilicates) find use. In some embodiments, silicates are present at a level of from about 1% to about 20% by weight of the composition. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

A detergent composition herein may additionally comprise one or more enzymes as disclosed above, for example. In some aspects, a detergent composition can comprise one or more enzymes, each at a level from about 0.00001% to about 10% by weight of the composition and the balance of cleaning adjunct materials by weight of composition. In some other aspects, a detergent composition can also comprise each enzyme at a level of about 0.0001% to about 10%, about 0.001% to about 5%, about 0.001% to about 2%, or about 0.005% to about 0.5%, by weight of the composition. Enzymes comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition in some aspects may comprise one or more other types of polymer in addition to a polysaccharide derivative or oxidized polysaccharide derivative as disclosed herein. Examples of other types of polymers useful herein include carboxymethyl cellulose (CMC), dextran, poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

Examples of suitable anti-redeposition and/or clay soil removal agents for a fabric care product herein include polyethoxy zwitterionic surfactants, water-soluble copolymers of acrylic or methacrylic acid with acrylic or methacrylic acid-ethylene oxide condensates (e.g., U.S. Pat. No. 3,719,647), cellulose derivatives such as carboxymethylcellulose and hydroxypropylcellulose (e.g., U.S. Pat. Nos. 3,597,416 and 3,523,088), and mixtures comprising nonionic alkyl polyethoxy surfactant, polyethoxy alkyl quaternary cationic surfactant and fatty amide surfactant (e.g., U.S. Pat. No. 4,228,044). Non-limiting examples of other suitable anti-redeposition and clay soil removal agents are disclosed in U.S. Pat. Nos. 4,597,898 and 4,891,160, and International Patent Appl. Publ. No. WO95/32272, all of which are incorporated herein by reference.

Particular forms of detergent compositions that can be adapted for purposes disclosed herein are disclosed in, for example, US20090209445A1, US20100081598A1, U.S. Pat. No. 7,001,878B2, EP1504994B1, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO200600791 A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 mono-carboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition agent(s) herein (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids (examples for which include polysaccharides, cellulosic polymers, poly diallyl dimethyl ammonium halides (DADMAC), and co-polymers of DAD MAC with vinyl pyrrolidone, acrylamides, imidazoles, imidazolinium halides, and mixtures thereof, in random or block configuration, cationic guar gum, cationic starch, cationic polyacrylamides, and mixtures thereof.

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N-disuccinic acid (EDDS), methyl glycine diacetic acid (MGDA), diethylene triamine penta acetic acid (DTPA), propylene diamine tetraacetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). A structurant can also be referred to as a structural agent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminenetetra(methylenephosphonic acid).

A detergent herein such as that for fabric care (e.g., laundry) can be comprised in a unit dose (e.g., sachet or pouch), for example. A unit dose form can comprise a water-soluble outer film that completely envelopes a liquid or solid detergent composition. A unit dose can comprise a single compartment, or at least two, three, or more (multiple) compartments. Multiple compartments can be arranged in a superposed orientation or a side-by-side orientation. A unit dose herein is typically a closed structure of any form/shape suitable for holding and protecting its contents without allowing contents release prior to contact with water.

Compositions disclosed herein comprising a polysaccharide derivative or oxidized polysaccharide derivative can be in the form of a dishwashing detergent composition, for example. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in some aspects of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1 wt % to 5 wt % (e.g., benzatriazoles, metal salts and complexes, and/or silicates); (viii) a glass corrosion inhibitor in the range of about 0.1 wt % to 5 wt % (e.g., a salt and/or complex of magnesium, zinc, or bismuth); and/or (ix) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts). In some aspects, a dishwashing detergent ingredient or entire composition (but adapted accordingly to comprise a polysaccharide derivative or oxidized polysaccharide derivative herein) can be as disclosed in U.S. Pat. Nos. 8,575,083; 9,796,951, or U.S. Pat. Appl. Publ. No. 2017/0044468, which are each incorporated herein by reference.

A detergent herein such as that for dish care can be comprised in a unit dose (e.g., sachet or pouch) (e.g., water-soluble unit dose article), for example, and can be as described above for a fabric care detergent, but rather comprise a suitable dish detergent composition.

It is believed that numerous commercially available detergent formulations can be adapted to include a polysaccharide derivative or oxidized polysaccharide derivative as disclosed herein. Examples of commercially available detergent formulations include PUREX® ULTRAPACKS (Henkel), FINISH® QUANTUM (Reckitt Benckiser), CLO- ROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

Some aspects herein concern a detergent composition comprising:

(i) a glucan derivative substituted with at least one organic group that comprises a carboxylic acid group (carboxylic group) or a sulfonate group, wherein the degree of substitution (DoS) of the glucan derivative with the organic group is about 0.1 to about 3.0, wherein the glucan from which the glucan derivative was derived has a weight-average degree of polymerization (DPw) of at least about 50, and optionally wherein at least 50% of the glycosidic linkages of the glucan derivative are alpha-1,3, alpha-1,4, or alpha-1,6 linkages; and/or (ii) an oxidized polysaccharide derivative, wherein the oxidized polysaccharide derivative is produced by contacting a polysaccharide derivative under aqueous conditions with at least one agent that is capable of oxidizing the polysaccharide derivative (such a derivative can be any oxidized polysaccharide derivative as presently disclosed, for example); wherein a hard surface that is washed or treated in a washing/treating composition comprising the detergent composition has reduced filming, spotting, haze, or other deposition. Such a detergent composition can optionally be characterized as an anti-deposition or anti-buildup detergent composition.

A glucan derivative in some aspects of an anti-deposition detergent composition can be any glucan derivative as disclosed herein (e.g., as it exists before or after being oxidized), just so long as it has a DoS with an organic group comprising a carboxylic acid group or sulfonate group of about 0.1 to about 3.0 and the alpha-glucan from which the alpha-glucan derivative was derived has a DPw of at least about 50. The DoS can be any DoS or range thereof disclosed herein that falls within the range of 0.1 to 3.0. For example, the DoS can be about 0.3-1.0 or 0.3-1.5. The DPw can be any DPw or range thereof disclosed herein that is at least 50. For example, the DPw can be at least 100. In some aspects, at least 50% of the glycosidic linkages of the alpha-glucan derivative are alpha-1,3 linkages.

A glucan derivative of an anti-deposition detergent composition herein can be substituted with at least one organic group that comprises a carboxylic acid group, for example. Such an organic group can optionally be in ether, ester, carbamate, or sulfonyl linkage to the glucan derivative, for example. In some aspects, an organic group can be a carboxylic acid group by itself (e.g., based on carbon 6 of a glucose monomer of a glucan derivative), or can be an organic group that is itself substituted with a carboxylic group. Examples of this latter type of organic group include a carboxy alkyl group such carboxymethyl, carboxyethyl, carboxypropyl, and carboxybutyl. In some aspects, a glucan derivative is an alpha-glucan derivative (e.g., ether derivative) (e.g., can comprise at least 50% alpha-1,3 linkages as disclosed herein) (e.g., based on alpha-glucan with DPw 600-900, 600-850, 600-800, 650-900, 650-850, 650-800, 700-900, 700-850, or 700-800) can be substituted with a carboxy alkyl group only (e.g., carboxymethyl) (e.g., at DoS of about 0.7-1.1, 0.7-1.0, 0.8-1.1, 0.8-1.0, or 0.85-0.95), or with a carboxy alkyl group (e.g., carboxymethyl) (e.g., 1.6-1.9, 1.6-1.85, 1.6-1.8, 1.65-1.9, 1.65-1.85, 1.65-1.8, 1.7-1.9, 1.7-1.85, or 1.7-1.8) and another organic group such as one comprising an aryl group (e.g., benzyl group) (e.g., at DoS of about 0.1-0.3, 0.15-0.3, 0.1-0.25, 0.15-0.25, 0.1-0.2, 0.15-0.2).

A hard surface that is washed or treated in a washing/treating composition comprising an anti-deposition detergent composition herein can have reduced filming, spotting, haze, or other deposition. A washing/treating composition in some aspects can be a wash liquor (grey water) to which an anti-deposition detergent composition has been added (e.g., the detergent can be provided in a concentrated form and diluted into a washing/treating composition when washing is to be performed). A washing/treating composition herein can be that used in an automatic dishwasher or a laundry machine, for example; features of such a washing/treating composition can be as disclosed herein for dishwashing and fabric care compositions. In some aspects, a washing/treating composition comprises at least one cation, and the glucan derivative or oxidized polysaccharide derivative is bound to the cation; this aspect can have any feature disclosed herein with respect to cation binding.

An anti-deposition detergent composition can be formulated according to any automatic dishwashing or fabric care composition as disclosed herein or in an incorporated reference, for example, and/or contain any disclosed ingredient (e.g., surfactant, enzyme, etc.), and/or be in any form disclosed herein (e.g., powder, flakes, liquid, unit dose, etc.). The amount of a glucan derivative of (i) or oxidized glucan derivative of (ii) can be about, or at least about 4, 5, 6, 7, 8, 9, 10, 11, 12, 4-12, 4-10, 4-8, 5-12, 5-10, 5-8, 6-12, 6-10, or 6-8 wt %, for example. In some aspects, an anti-deposition detergent composition has each of the ingredients listed in Table 2 below; the amount (wt %) of each ingredient in such a composition can be within (plus/minus) 5%, 10%, 15%, 5-10%, or 5-15% of the respective value in Table 2.

Some aspects of the present disclosure concern a method of washing/cleaning or treating a hard surface. Such a washing/cleaning or treating method can comprise:

(a) contacting the hard surface with a washing/treating composition that comprises an anti-deposition detergent composition herein, and (b) removing all of, or a portion of, the washing/treating composition from the hard surface (e.g., by rinsing with water with, or without, a rinse aid and/or added salts); thereby washing/cleaning or treating the hard surface, wherein the washed/cleaned/treated hard surface has reduced filming, spotting, haze, or other deposition. Such a method can include any condition (e.g., temperature, pH, time, salt/buffer, etc.) (e.g., those for automatic dishwashing machine) disclosed herein, for example, that are suitable for washing, treating a material/surface, and/or cation binding.

A hard surface treated by a washing/cleaning method can be any hard surface, such as a hard surface of, or that is associated/interacting with, an aqueous composition or system as disclosed herein. Examples of a hard surface comprise or consist of glass, plastic (e.g., styrene-acrylonitrile, polystyrene, polypropylene, polyethylene, melamine), ceramic, porcelain, metal (e.g., steel, stainless steel, aluminum), or stone (e.g., marble, granite); any of these surfaces can be of a piece of dishware disclosed herein, for example. A hard surface in some aspects can be a surface found within (e.g., body/housing of) an automatic dishwasher, laundry machine, or similar device, and/or an internal component thereof (e.g., piping, sprayer, nozzle, rack, agitator).

In some aspects in which a washing/cleaning method is performed in an automatic dishwasher, a wash cycle can comprise the following sequential periods: (i) optionally at least one pre-wash period during which water (e.g., at ~40-70, 45-70, 50-70, or 60-70° C.) is circulated (e.g., for about 3-15, 3-10, or 3-6 minutes) to loosen food material on dishware; (ii) a main wash period during which an anti-deposition detergent composition herein (e.g., about 10-30 10-25, 10-20, 15-30, 15-25, or 15-20 g, dry weight) is added (e.g., via automatic dispenser) to water (e.g., at ~40-70, 45-70, or 50-70° C.) (e.g., about 1-2.5, 1-2, 1.5-2.5, or 1.5-2 gallons) for circulation (thereby rendering a washing composition) for a suitable amount of time (e.g., about 3-20, 3-15, 3-10, 5-20, 5-15, or 5-10 minutes); (iii) at least one rinse period during which water (e.g., at ~40-70, 45-70, 50-70, or 60-70° C.) is circulated (e.g., for about 3-15, 3-10, or 3-6 minutes); and (iv) optionally a drying period. After each of periods (ii) and (iii) (and optionally after optional period [i]) of a wash cycle, the circulated liquid typically is removed, such as by pumping and/or draining.

A washing/cleaning method herein can be performed to wash dishware (e.g., using an automatic dishwasher, or manual/hand dishwashing). Dishware, for example, can be as disclosed herein or in U.S. Pat. No. 8,575,083 or U.S. Pat. Appl. Publ. No. 2017/0044468, which are incorporated herein by reference. Dishware can include, for example, plates, cups, glasses, bowls, pots, cutlery, spoons, knives, forks, serving utensils, ceramics, plastics, cutting boards, china, chinaware, glassware, tableware, utensilware, and kitchenware.

A hard surface washed by a washing/cleaning method herein has reduced filming, spotting, haze and/or other deposition. In some aspects, such reduction is by about, or at least about 10%, 20%, 30%, 40%, 50%, 60%, 70%, or 80% as compared to what would be observed with a washing/cleaning method using a detergent composition that does not have (i) a glucan derivative substituted with at least one organic group that comprises a carboxylic acid group (carboxylic group) or a sulfonate group, and/or (ii) an oxidized polysaccharide derivative; all other features of the comparative washing/cleaning method can otherwise be the same. Filming, spotting, haze, and related depositions typically contain one or more insoluble salts (e.g., carbonates such as $CaCO_3$ or $MgCO_3$, hydroxides such as $Mg(OH)_2$ or $Ca(OH)_2$, sulfates such a $CaSO_4$) and/or other insoluble compounds (e.g., calcium and/or magnesium salts of fatty acids such as stearate). Filming and/or spotting can optionally also be referred to as deposits of scale and/or scum (e.g., soap scum).

Compositions disclosed herein comprising a polysaccharide derivative or oxidized polysaccharide derivative can be in the form of an oral care composition, for example. Examples of oral care compositions include dentifrices, toothpaste, mouth wash, mouth rinse, chewing gum, and edible strips that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

An oral care composition herein can comprise about 0.01-15.0 wt % (e.g., ~0.1-10 wt % or ~0.1-5.0 wt %, ~0.1-2.0 wt %) of a polysaccharide derivative or oxidized polysaccharide derivative as disclosed herein, for example. A polysaccharide derivative or oxidized polysaccharide derivative comprised in an oral care composition can sometimes be provided therein as a thickening agent and/or dispersion agent, which may be useful to impart a desired consistency and/or mouth feel to the composition. One or more other thickening or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components. Examples of oral care compositions to which polysaccharide derivative or oxidized polysaccharide derivative herein can be added are disclosed in U.S. Patent Appl. Publ. Nos. 2006/0134025, 2002/0022006 and 2008/0057007, which are incorporated herein by reference.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N,N,N'-tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), magnolia extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g.,azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid (EHDP), ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition.

A surfactant suitable for use in an oral care composition herein may be anionic, non-ionic, or amphoteric, for example. Suitable anionic surfactants include, without limitation, water-soluble salts of $C_{8-20}$ alkyl sulfates, sulfonated monoglycerides of $C_{8-20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_{8-20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesquicarbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; eucalyptus oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, eucalyptus oil, eucalyptol, anethole, eugenol, cassia, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

Additional examples of personal care, household care, and other products and ingredients herein can be any as disclosed in U.S. Pat. No. 8,796,196, which is incorporated herein by reference. Examples of personal care, household care, and other products and ingredients herein include perfumes, fragrances, air odor-reducing agents, insect repellents and insecticides, bubble-generating agents such as surfactants, pet deodorizers, pet insecticides, pet shampoos, disinfecting agents, hard surface (e.g., floor, tub/shower, sink, toilet bowl, door handle/panel, glass/window, car/automobile exterior or interior) treatment agents (e.g., cleaning, disinfecting, and/or coating agents), wipes and other non-woven materials, colorants, preservatives, antioxidants, emulsifiers, emollients, oils, medicaments, flavors, and suspending agents.

The present disclosure also concerns a method of treating a material. This method comprises contacting a material with an aqueous composition comprising a polysaccharide derivative or oxidized polysaccharide derivative as disclosed herein.

A material contacted with an aqueous composition in a contacting method herein can comprise a fabric in some aspects. A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelasse, oxford, percale, poplin, plisse, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener). Thus, a treatment method in certain embodiments can be considered a fabric care method or laundry method if employing a fabric care composition therein. A fabric care composition herein is contemplated to effect one or more of the following fabric care benefits (i.e., surface substantive effects): wrinkle removal, wrinkle reduction, wrinkle resistance, fabric wear reduction, fabric wear resistance, fabric pilling reduction, extended fabric life, fabric color maintenance, fabric color fading reduction, reduced dye transfer, fabric color restoration, fabric soiling reduction, fabric soil release, fabric shape retention, fabric smoothness enhancement, anti-redeposition of soil on fabric, anti-greying of laundry, improved fabric hand/handle, and/or fabric shrinkage reduction.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv).

The contacting step in a fabric care method or laundry method can comprise any of washing, soaking, and/or rinsing steps, for example. Contacting a material or fabric in still further embodiments can be performed by any means known in the art, such as dissolving, mixing, shaking, spraying, treating, immersing, flushing, pouring on or in, combining, painting, coating, applying, affixing to, and/or communicating an effective amount of a polysaccharide derivative or oxidized polysaccharide derivative herein with the fabric or material. In still further embodiments, contacting may be used to treat a fabric to provide a surface substantive effect. As used herein, the term "fabric hand" or "handle" refers to a person's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, CA) (American Association of Textile Chemists and Colorists [AATCC test method "202-2012, Relative Hand Value of Textiles: Instrumental Method" ]).

In some aspects of treating a material comprising fabric, polysaccharide derivative or oxidized polysaccharide derivative components of the aqueous composition adsorb to the fabric. This feature is believed to render a polysaccharide derivative or oxidized polysaccharide derivative herein useful as anti-redeposition agents and/or anti-greying agents in fabric care compositions disclosed (in addition to their viscosity-modifying and/or builder effects). An anti-redeposition agent or anti-greying agent herein helps keep soil from redepositing onto clothing in wash water after the soil has been removed. It is further contemplated that adsorption of a polysaccharide derivative or oxidized polysaccharide derivative herein to a fabric enhances mechanical properties of the fabric in some aspects.

Adsorption of a polysaccharide derivative or oxidized polysaccharide derivative to a fabric herein can be measured using a colorimetric technique (e.g., Dubois et al., 1956, *Anal. Chem.* 28:350-356; Zemljič et al., 2006, *Lenzinger Berichte* 85:68-76; both incorporated herein by reference), for example, or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, melamine, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed herein and in U.S. Pat. No. 8,575,083 and U.S. Pat. Appl. Publ. No. 2017/0044468, which are incorporated herein by reference. In some aspects, a tableware article can be contacted with an aqueous composition herein under a suitable set of conditions such as any of those disclosed above with regard to contacting a fabric-comprising material.

Other materials that can be contacted in the above treatment method include oral surfaces such as any soft or hard surface within the oral cavity including surfaces of the tongue, hard and soft palate, buccal mucosa, gums and dental surfaces (e.g., natural tooth or a hard surface of artificial dentition such as a crown, cap, filling, bridge, denture, or dental implant). Thus, a treatment method in certain embodiments can be considered an oral care method or dental care method, for example. Conditions (e.g., time, temperature) for contacting an oral surface with an aqueous composition herein should be suitable for the intended purpose of making such contact. Other surfaces that can be contacted in a treatment method also include a surface of the integumentary system such as skin, hair or nails.

Thus, some aspects of the present disclosure concern material (e.g., fabric, or a fiber-comprising product as disclosed herein) that comprises a polysaccharide derivative or oxidized polysaccharide derivative herein. Such material can be produced following a material treatment method as disclosed herein, for example. A material may comprise a polysaccharide derivative or oxidized polysaccharide derivative in some aspects if the polysaccharide derivative or oxidized polysaccharide derivative is adsorbed to, or otherwise in contact with, the surface of the material.

Some aspects of a method of treating a material herein further comprise a drying step, in which a material is dried after being contacted with the aqueous composition. A drying step can be performed directly after the contacting step, or following one or more additional steps that might follow the contacting step (e.g., drying of fabric or tableware after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein. Examples of aqueous compositions include detergents (e.g., laundry detergent or dish detergent), fabric softeners, and water-containing dentifrices such as toothpaste.

The present disclosure also concerns a method of preparing an aqueous composition having increased builder capacity. This method comprises, for instance, contacting at least one polysaccharide derivative or oxidized polysaccharide derivative as disclosed herein with an aqueous composition, wherein the builder capacity of the aqueous composition is increased by the derivative when compared to the builder capacity of the aqueous composition as it existed before the contacting step. Such a method can optionally be characterized as a water (or any other aqueous composition) softening method.

An aqueous composition in this method can be any aqueous composition as disclosed herein, for example, such as a household care product, personal care product, industrial product, pharmaceutical product, or food product. Examples of suitable household care products include household care or industrial care products such as laundry detergent or fabric softener, and automatic dishwashing detergent. Examples of suitable personal care items include hair care products (e.g. shampoos, conditioners), dentifrice compositions (e.g., toothpaste, mouthwash), and skin care products (e.g., hand or body soap, lotion, cosmetics).

In some aspects, an aqueous composition in this method is a detergent and/or surfactant composition. Such a composition herein can comprise at least one detergent/surfactant ingredient, such as any of the present disclosure, at about 0.01-10 wt % (e.g., about 0.05-5.0 wt % or about 0.1-2.0 wt %), for example. A skilled artisan would recognize all the various products disclosed herein that constitute examples of detergent/surfactant-comprising compositions such as certain household care products (e.g., laundry detergent, dishwashing detergent) and personal care products (e.g., hand/body soap, dentifrices), particularly those used in cleaning applications.

Contacting an aqueous composition with one or more polysaccharide derivatives or oxidized polysaccharide derivatives in some aspects can increase the builder capacity of the aqueous composition. This increase can be by about, or at least about 1%, 5%, 10%, 25%, 50%, 100%, 500%, or 1000% (or any integer between 1% and 1000%), for example, compared to the builder capacity of the aqueous composition before the contacting step.

The degree of increased builder capacity achieved can be measured following any number of methods. For example, increased builder capacity effected by a polysaccharide derivative or oxidized polysaccharide derivative herein can be estimated by determining the extent to which the derivative supplies alkalinity to an aqueous composition, or buffers an aqueous composition to maintain alkalinity. As another example, increased builder capacity effected by a polysaccharide derivative or oxidized polysaccharide derivative herein can be estimated by determining the extent to which the derivative reduces hardness in an aqueous composition (by sequestering or chelating hard water cations) and/or helps to remove soil in suspension (this feature typically applies to fabric care compositions). As other examples, increased builder capacity can be determined following methodology (e.g., calcium dispersing capacity, NTU assay, film reduction assay) disclosed in the below Examples and/or in U.S. Pat. Appl. Publ. No. 2018/0022834, which is incorporated herein.

Contacting a polysaccharide derivative or oxidized polysaccharide with an aqueous composition herein can be done by dissolving, or dispersing, the derivative into the aqueous composition, for example.

Non-limiting examples of compositions and methods disclosed herein include:

1a. A composition comprising an oxidized polysaccharide derivative, wherein the oxidized polysaccharide derivative is produced by contacting a polysaccharide derivative under aqueous conditions with at least one agent that is capable of oxidizing the polysaccharide derivative, and wherein the polysaccharide derivative has a degree of substitution (DoS) up to about 3.0 with at least one organic group.

2a. The composition of embodiment 1a, wherein the polysaccharide derivative is a glucan derivative or a soy polysaccharide derivative.

3a. The composition of embodiment 1a or 2a, wherein the polysaccharide derivative is the glucan derivative, and the glucan derivative is an alpha-glucan derivative.

4a. The composition of embodiment 3a, wherein at least 50% of the glycosidic linkages of the alpha-glucan derivative are alpha-1,3, alpha-1,4, or alpha-1,6 linkages.

5a. The composition of embodiment 1a, 2a, 3a, or 4a, wherein the oxidized polysaccharide derivative has a biodegradability as determined by a carbon dioxide evolution test method of at least 10% after 60 or 90 days.

6a. The composition of embodiment 1a, 2a, 3a, 4a, or 5a, wherein the polysaccharide from which the polysaccharide derivative was derived has a weight-average degree of polymerization (DPw) of at least about 50.

7a. The composition of embodiment 1a, 2a, 3a, 4a, 5a, or 6a, wherein the organic group is in ether linkage to the polysaccharide derivative.

8a. The composition of embodiment 7a, wherein the organic group comprises a carboxyalkyl, alkyl, hydroxyalkyl, or aryl group.

9a. The composition of embodiment 7a, wherein the organic group comprises a carboxymethyl group.

10a. The composition of embodiment 1a, 2a, 3a, 4a, 5a, or 6a, wherein the organic group is in ester linkage, carbamate linkage, or sulfonyl linkage to the polysaccharide derivative.

11a. The composition of embodiment 1a, 2a, 3a, 4a, 5a, 6a, 7a, 8a, 9a, or 10a, wherein the agent comprises an N-oxoammonium salt.

12a. The composition of embodiment 1a, 2a, 3a, 4a, 5a, 6a, 7a, 8a, 9a, 10a, or 11a, wherein the composition is a household care product, personal care product, industrial product, ingestible product (e.g., food product), or pharmaceutical product.

13a. The composition of embodiment 1a, 2a, 3a, 4a, 5a, 6a, 7a, 8a, 9a, 10a, 11a, or 12a, wherein the composition is an aqueous composition.

14a. The composition of embodiment 13a, wherein the aqueous composition further comprises at least one cation, and the oxidized glucan derivative is bound to the cation.

15a. The composition of embodiment 1a, 2a, 3a, 4a, 5a, 6a, 7a, 8a, 9a, 10a, 11a, 12a, 13a, or 14a, wherein the composition is in the form of, or comprised in, a liquid, gel, powder, hydrocolloid, granule, tablet, capsule, bead or pastille, single-compartment sachet, multi-compartment sachet, single-compartment pouch, or multi-compartment pouch.

16a. The composition of embodiment 1a, 2a, 3a, 4a, 5a, 6a, 7a, 8a, 9a, 10a, 11a, 12a, 13a, 14a, or 15a, further comprising at least one surfactant.

17a. The composition of embodiment 1a, 2a, 3a, 4a, 5a, 6a, 7a, 8a, 9a, 10a, 11a, 12a, 13a, 14a, 15a, or 16a, further comprising at least one enzyme.

18a. The composition of embodiment 17a, wherein the enzyme is a cellulase, protease, lipase, amylase, or lipase.

19a. The composition of embodiment 1a, 2a, 3a, 4a, 5a, 6a, 7a, 8a, 9a, 10a, 11a, 12a, 13a, 14a, 15a, 16a, 17a, or 18a, further comprising at least one of a complexing agent, soil release polymer, surfactancy-boosting polymer, bleaching agent, bleach activator, bleaching catalyst, fabric conditioner, clay, foam booster, suds suppressor, anti-corrosion agent, soil-suspending agent, anti-soil re-deposition agent, dye, bactericide, tarnish inhibitor, optical brightener, perfume, saturated or unsaturated fatty acid, dye transfer-inhibiting agent, chelating agent, hueing dye, visual signaling ingredient, anti-foam, structurant, thickener, anti-caking agent, starch, sand, or gelling agent.

20a. A method of producing an oxidized polysaccharide derivative (e.g., as recited in any one of embodiments 1a-11a), the method comprising:

(a) contacting a polysaccharide derivative under aqueous conditions with at least one agent that is capable of oxidizing the polysaccharide derivative, wherein the polysaccharide derivative has a degree of substitution (DoS) up to about 3.0 with at least one organic group, thereby producing an oxidized polysaccharide derivative; and (b) optionally isolating the oxidized polysaccharide derivative.

Non-limiting examples of compositions and methods disclosed herein include:

1b. A composition (e.g., detergent composition) comprising:

(i) a glucan derivative substituted with at least one organic group that comprises a carboxylic acid group or a sulfonate group, wherein the degree of substitution (DoS) of the glucan derivative with the organic group is about 0.1 to about 3.0, wherein the glucan from which the glucan derivative was derived has a weight-average degree of polymerization (DPw) of at least about 50, and wherein optionally at least 50% of the glycosidic linkages of the glucan derivative are alpha-1,3, alpha-1,4, or alpha-1,6 linkages; and/or (ii) an oxidized polysaccharide derivative, wherein the oxidized polysaccharide derivative is produced by contacting a polysaccharide derivative under aqueous conditions with at least one agent that is capable of oxidizing the polysaccharide derivative; wherein a hard surface that is washed or treated in a washing/treating composition comprising the composition has reduced filming, spotting, haze, or other deposition.

2b. The composition of embodiment 1b, comprising the glucan derivative, wherein the glucan derivative is an alpha-glucan derivative, and at least about 50% of the glycosidic linkages of the alpha-glucan derivative are alpha-1,6 linkages.

3b. The composition of embodiment 2b, wherein (a) about 3% to about 25% of the glycosidic linkages of the alpha-glucan derivative are alpha-1,2 and/or alpha-1,3 branch points, (b) the DoS of the alpha-glucan derivative with the organic group is about 0.3 to about 1.0, and/or (c) the alpha-glucan from which the alpha-glucan derivative was derived has a DPw of at least about 100.

4b. The composition of embodiment 1b, comprising the glucan derivative, wherein the glucan derivative is an alpha-glucan derivative, and at least about 50% of the glycosidic linkages of the alpha-glucan derivative are alpha-1,3 linkages.

5b. The composition of embodiment 4b, wherein (a) the DoS of the alpha-glucan derivative with the organic group is about 0.3 to about 1.5, and/or (b) the alpha-glucan from which the alpha-glucan derivative was derived has a DPw of at least about 100.

6b. The composition of embodiment 1b, 2b, 3b, 4b, or 5b, comprising the glucan derivative, wherein the organic group is in ether linkage to the glucan derivative.

7b. The composition of embodiment 6b, wherein the organic group comprises a carboxyalkyl group.

8b. The composition of embodiment 7b, wherein the carboxyalkyl group is a carboxymethyl group.

9b. The composition of embodiment 7b or 8b, wherein the glucan derivative is further substituted with at least one organic group that comprises an aryl group.

10b. The composition of embodiment 9b, wherein the aryl group is a benzyl group.

11b. The composition of embodiment 1b, comprising the oxidized polysaccharide derivative (e.g., as recited in any one of embodiments 1a-11a), optionally wherein the oxidized polysaccharide derivative has a biodegradability as determined by a carbon dioxide evolution test method of at least 10% after 60 or 90 days.

12b. The composition of embodiment 1b, 2b, 3b, 4b, 5b, 6b, 7b, 8b, 9b, 10b, or 11b, wherein the composition is comprised in the washing/treating composition, wherein the washing/treating composition comprises at least one cation, and the glucan derivative or oxidized polysaccharide derivative is bound to the cation.

13b. The composition of embodiment 1b, 2b, 3b, 4b, 5b, 6b, 7b, 8b, 9b, 10b, 11b, or 12b, wherein the composition is in the form of, or comprised in, an aqueous composition, a liquid, gel, powder, hydrocolloid, granule, tablet, capsule, bead or pastille, single-compartment sachet, multi-compartment sachet, single-compartment pouch, or multi-compartment pouch.

14b. The composition of embodiment 1b, 2b, 3b, 4b, 5b, 6b, 7b, 8b, 9b, 10b, 11b, 12b, or 13b, wherein the composition is in the form of, or comprised in, a dishwashing detergent composition.

15b. The composition of embodiment 14b, wherein the dishwashing detergent composition is an automatic dishwashing detergent composition, optionally wherein the automatic dishwashing detergent composition comprises (a) 2-12 wt % of the glucan derivative of (i) or the oxidized polysaccharide derivative of (ii); (b) 3-50 wt % of methylglycinediacetic acid and/or a salt thereof; (c) 15-65 wt % of one or more builders and/or cobuilders; (d) 0.5-10 wt % of one or more nonionic surfactants; (e) 0-30 wt % of one or more of a bleach and bleach activator; (f) 0-8 wt % of one or more enzymes; and (g) 0-50 wt % of one or more additives.

16b. A method of washing/cleaning or treating a hard surface, the method comprising:

(a) contacting the hard surface with a washing/treating composition that comprises the composition of any one of embodiments 1b-15b (or as recited in embodiment 16a), and (b) removing all of, or a portion of, the washing/treating composition from the hard surface; thereby washing/cleaning or treating the hard surface, wherein the washed/cleaned hard surface or treated hard surface has reduced filming, spotting, haze, or other deposition.

17b. The method of embodiment 16b, wherein step (b) comprises rinsing the hard surface.

18b. The method of embodiment 16b or 17b, wherein the hard surface is that of glass, plastic, ceramic, porcelain, metal, or stone.

19b. The method of embodiment 16b, 17b, or 18b, wherein the hard surface is that of dishware.

20b. The method of embodiment 16b, 17b, 18b, or 19b, performed in an automatic dishwasher.

21b. The composition of embodiment 1b, 2b, 3b, 4b, 5b, 6b, 7b, 8b, 9b, 10b, 11b, 12b, 13b, 14b, or 15b, or the method of embodiment 16b, 17b, 18b, 19b, or 20b, or as disclosed herein, wherein the composition does not comprise a surfactant, or has less than 5, 4, 3, 2, 1, 0.5, 0.25, 0.1, 0.05, or 0.025 wt % of the surfactant.

22b. The composition of embodiment 1b, 2b, 3b, 4b, 5b, 6b, 7b, 8b, 9b, 10b, 11b, 12b, 13b, 14b, 15b, or 21b, or the method of embodiment 16b, 17b, 18b, 19b, or 20b, or as disclosed herein, comprising the oxidized polysaccharide derivative of (ii), but with the difference that the polysaccharide was not derivatized prior to being oxidized.

EXAMPLES

The present disclosure is further exemplified in the following Examples. It should be understood that these Examples, while indicating certain aspects herein, are given by way of illustration only. From the above discussion and these Examples, one skilled in the art can ascertain the essential characteristics of the disclosed embodiments, and without departing from the spirit and scope thereof, can make various changes and modifications to adapt the disclosed embodiments to various uses and conditions.

Materials/Methods

Representative Preparation of Alpha-1,3-Glucan

Alpha-1,3-glucan with ~100% alpha-1,3 glycosidic linkages can be synthesized, for example, following the procedures disclosed in U.S. Appl. Publ. No. 2014/0179913 (see Example 12 therein, for example), which is incorporated herein by reference.

As another example, a slurry of alpha-1,3-glucan was prepared from an aqueous solution (0.5 L) containing *Streptococcus salivarius* gtfJ enzyme (100 unit/L) as described in U.S. Patent Appl. Publ. No. 2013/0244288 (incorporated herein by reference), sucrose (100 g/L) obtained from OmniPur Sucrose (EM8550), potassium phosphate buffer (10 mM) obtained from Sigma Aldrich, and FermaSure®, an antimicrobial agent (100 ppm), obtained from DuPont adjusted to pH 5.5. The resulting enzyme reaction was maintained at 20-25° C. for 24 hours. A slurry was formed since the alpha-1,3-glucan synthesized in the reaction was aqueous-insoluble. The alpha-1,3-glucan solids were then collected using a Buchner funnel fitted with a 325-mesh screen over 40-micrometer filter paper, forming a wet cake that contained about 60-80 wt % water.

Representative Preparation of Alpha-1,6-Glucan with Alpha-1,2 Branching

Methods to prepare alpha-1,6-glucan containing various amounts of alpha-1,2 branching are disclosed in U.S. Appl. Publ. No. 2018/0282385, which is incorporated herein by reference. Reaction parameters such as sucrose concentration, temperature, and pH can be adjusted to provide alpha-1,6-glucan having various levels of alpha-1,2-branching and molecular weight. A representative procedure for the preparation of alpha-1,2-branched alpha-1,6-glucan is provided below (containing 19% alpha-1,2-branching and 81% alpha-1,6 linkages). The 1D $^1$H-NMR spectrum was used to quantify glycosidic linkage distribution. Additional samples of alpha-1,6-glucan with alpha-1,2-branching were prepared similarly. For example, one sample contained 32% alpha-1,2-branching and 68% alpha-1,6 linkages, and another contained 10% alpha-1,2-branching and 90% alpha-1,6 linkages.

Soluble alpha-1,6-glucan with about 19% alpha-1,2 branching was prepared using stepwise combination of glucosyltransferase (dextransucrase) GTF8117 and alpha-1,2 branching enzyme GTFJ18T1, according to the following procedure. A reaction mixture (2 L) comprised of sucrose (450 g/L), GTF8117 (9.4 U/mL), and 50 mM sodium acetate was adjusted to pH 5.5 and stirred at 47° C. Aliquots (0.2-1 mL) were withdrawn at predetermined times and quenched by heating at 90° C. for 15 minutes. The resulting heat-treated aliquots were passed through a 0.45-μm filter. The flow-through was analyzed by HPLC to determine the concentration of sucrose, glucose, fructose, leucrose, oligosaccharides and polysaccharides. After 23.5 hours, the reaction mixture was heated to 90° C. for 30 minutes. An aliquot of the heat-treated reaction mixture was passed through a 0.45-μm filter and the flow-through was analyzed for soluble mono/disaccharides, oligosaccharides, and polysaccharides. A major product was linear dextran with a DPw of 93.

A second reaction mixture was prepared by adding 238.2 g of sucrose and 210 mL of alpha-1,2-branching enzyme GTFJ18T1 (5.0 U/mL) to the leftover heat-treated reaction mixture that was obtained from the GTF8117 reaction described immediately above. The mixture was stirred at 30° C. with a volume of ~2.2 L. Aliquots (0.2-1 mL) were withdrawn at predetermined times and quenched by heating at 90° C. for 15 minutes. The resulting heat-treated aliquots were passed through a 0.45-μm filter. The flow-through was analyzed by HPLC to determine the concentration of sucrose, glucose, fructose, leucrose, oligosaccharides and polysaccharides. After 95 hours, the reaction mixture was heated to 90° C. for 30 minutes. An aliquot of the heat-treated reaction mixture was passed through a 0.45-μm filter and the flow-through was analyzed for soluble mono/disaccharides, oligosaccharides, and polysaccharides. Leftover heat-treated mixture was centrifuged using 1-L centrifugation bottles. The supernatant was collected and cleaned more than 200-fold using an ultrafiltration system with 1- or 5-kDa MWCO cassettes and deionized water. The cleaned oligo/polysaccharide product solution was dried. Dry sample was then analyzed by $^1$H-NMR spectroscopy to determine the anomeric linkages of the oligosaccharides and polysaccharides.

Preparation of Carboxymethyl Alpha-1,6-Glucan

A three-neck, 2-L round-bottom flask equipped with an overhead stirrer was charged with 267 g of a 37.5 wt % alpha-1,6-glucan solution (53 kDa, 6.4% alpha-1,2-branching). To the solution was added 50 wt % sodium hydroxide solution via an addition funnel over 15 minutes (199 g) with stirring. To this stirring solution was added chloroacetic acid solution (116 g dissolved in 77 g water) via an addition funnel over 30 minutes. This solution was heated to 55° C. under nitrogen for 5 hours. The resulting amber solution was cooled and neutralized to pH 7 with 18 wt % HCl. The resulting light yellow solution was diluted to 3 L, and purified by diafiltration (3×MWCO 30-kDa PES membrane, –9 L of water was passed through). The solution was concentrated with a rotary evaporator and freeze-dried to yield a white powder. The degree of substitution of the thus prepared carboxymethyl alpha-1,6-glucan product was determined by $^1$H-NMR analysis to be 0.51.

Preparation of Carboxymethyl Alpha-1,3-Glucan (DoS 0.91)

A 4-neck, 2-L round-bottom flask containing a metal/mechanical stir rod, thermocouple, addition funnel and condenser with $N_2$ inlet on top, was charged with alpha-1,3-glucan (DPw 650, 110 g) and water (110 g). The mixture was set at room temperature overnight. Ethanol (220 g, 92 wt %) was added at room temperature. The mixture was stirred at 200 rpm and sodium hydroxide (191.1 g, 50 wt % solution) was added over a 20 minute period (25 to 37° C.). The white slurry was stirred for an additional 10 minutes. A solution containing 112.2 g of chloroacetic acid in 50 g of 92 wt % ethanol was added over a 20 minute period (35 to 55° C.). The white slurry was heated using a heating mantel for 3 hours at 58-60° C. The reaction was cooled to 45° C. and sodium hydroxide (108.6 g, 50 wt % solution) was added over 10 minutes, followed by a solution containing 64.13 g of chloroacetic acid in 35 g of 92 wt % ethanol. The resulting preparation was heated for 2 hours at 58-65° C. A large lump formed in the reaction. The liquid (~500 mL) of the reaction was decanted. Methanol (400 mL) was added and the pH of the mixture was adjusted to about 7 by adding HCl (18.5 wt %, 13.5 g). The liquid was decanted. The resulting solid was washed with 90 wt % methanol (700 mL), twice with 80 wt % methanol (700 mL each wash), and filtered to give a solid, which was dried under full vacuum overnight to give 148.5 g of product (carboxymethyl alpha-1,3-glucan). The degree of substitution of the thus prepared carboxymethyl alpha-1,3-glucan product was determined by $^1$H-NMR analysis to be 0.91.

Preparation of Benzyl Alpha-1,3-Glucan (DoS 0.57)

Alpha-1,3-glucan (180 g of 27.5 wt % solids wet cake [balance was water]) was charged into a 3-neck 1-L reactor. To this was added 110 mL water. This mixture was cooled to 18-21° C. in an ice water bath. To this was added 63 g of a 50 wt % sodium hydroxide solution, and the mixture was stirred for 30 minutes. Water (150 mL) was then added, and the reactor mixture was heated to 48° C. and benzyl chloride (89 g) was added over 40 minutes. The reaction preparation was then heated to 78° C. for 3 hours, after which it was cooled, neutralized to pH 7.0, and filtered. The resulting solids were washed 3× with cold 20% aqueous methanol, and dried in a vacuum oven at 40° C. to yield 53 g of yellow solid. The degree of substitution of the thus prepared benzyl alpha-1,3-glucan product was determined by $^{1}$H-NMR analysis to be 0.57.

Preparation of Carboxymethyl Benzyl Alpha-1,3-Glucan

Benzyl alpha-1,3-glucan as prepared above (DoS 0.57) was used to prepare carboxymethyl benzyl alpha-1,3-glucan. The benzyl alpha-1,3-glucan (53 g) was suspended in 410 mL of 92 wt % aqueous ethanol and stirred at room temperature. The mixture was cooled to 15-19° C. with an ice-water bath. To the cooled, stirred suspension was added 48 g of 50 wt % solution of sodium hydroxide over 20 minutes. The preparation was removed from the ice-water bath and stirred for 25 minutes. The preparation was then cooled in an ice-water bath and 30.9 g of chloroacetic acid (in 30 g of 92 wt % ethanol) was added in two portions: the first two-thirds was added and then stirred at 15° C. for 15 minutes, followed by adding the remaining third. After removing the reaction preparation from the ice-water bath, and the reaction preparation was stirred at room temperature for 15 minutes at 300 rpm. The reaction preparation was then immersed into a 90° C. preheated oil bath. The reaction preparation was then heated for 3 hours at 74° C. (internal temperature). The reaction preparation was then cooled, diluted with 53 g of water, and neutralized to pH 6.7 with 10 wt % HCl. The reaction preparation was filtered, and the solids were washed with 70% aqueous methanol to yield a brown solid. The solid material was dissolved in 200 mL of water, adjusted to pH 8 with 0.1N NaOH, and then added to cold methanol. The resulting suspension was stirred at 10° C. for 1 hour. Liquid was decanted off the suspension, and more cold methanol was added to the residual solids, followed by another decanting. This process was repeated twice. A final fraction was obtained by adding 2-propanol to the residual solids, resulting in an off-white solid (carboxymethyl benzyl alpha-1,3-glucan product) that was isolated by filtration. The solids were combined to yield 40 g. The carboxymethyl degree of substitution of the product was determined by $^{1}$H-NMR to be 0.59.

Preparation of Benzyl Alpha-1,3-Glucan (DoS 0.17)

To a 4-neck, 2-L flask was added with stirring 980 mL of water and alpha-1,3-glucan (DPw ~740, 270 g of wet cake containing 40 wt % glucan and 60 wt % water), portion-wise. Sodium hydroxide (55 g of 50 wt % aqueous solution) was added dropwise over a 10-minute period while the mixture was stirred at 20-25° C., then at room temperature for 2 hours. The preparation was heated to 75° C., and then benzyl chloride (77 g) was added. The reaction was heated to 85° C. and kept at this temperature for 3.5 hours. The reaction was then cooled and filtered. The solids were washed with water (3×700 mL), ethanol (50 wt %, 800 mL), methanol (80 wt %, 800 mL), acetone (800 mL), and hexanes (2×500 mL). The resulting solids were dried on a frit with vacuum and $N_2$ purge for 3 hours to afford a white solid material (benzyl alpha-1,3-glucan product). This product was dried under vacuum at 80° C. overnight with a nitrogen sweep to render 96 g of product. The degree of substitution of the thus prepared benzyl alpha-1,3-glucan product was determined by $^{1}$H-NMR analysis to be 0.17.

Preparation of Carboxymethyl Benzyl Alpha-1,3-Glucan (DoS 1.92)

Benzyl alpha-1,3-glucan as prepared above (DoS 0.17) was used to prepare carboxymethyl benzyl alpha-1,3-glucan. A 4-neck, 250-mL round-bottom flask was equipped with an overhead mechanical stirrer, thermocouple and $N_2$ inlet. Ethanol (92 wt %) and the benzyl alpha-1,3-glucan (20 g) were added into the flask. The mixture was stirred at room temperature for 30 minutes. Sodium hydroxide (40 g of 50 wt % aqueous solution) was added dropwise over a 10 minute period, while stirring. The slurry was stirred at room temperature for 15 minutes. Chloroacetic acid (11.6 g in 5 g of 92 wt % ethanol) was added in 5 minutes. The reaction was stirred at 63-65° C. for 3 hours. After being cooled to 30° C., the pH of the reaction was adjusted to about 7 by adding 18.5 wt % HCl solution. The solids were collected by filtration and re-slurried with warm methanol (90 wt %, 150 mL), then filtered to give a wet cake. The wet cake was washed with methanol (90 wt %, 3×150 mL) by re-slurrying and filtration, then dried under vacuum to give solid material (22.3 g), which was further purified by TFF (nanofiltration: Membrane: PES, 5K MWCO), with ~5 L water exchange, and then further purified using a 10K MWCO membrane. The retentate was concentrated and dried to render carboxymethyl benzyl alpha-1,3-glucan (18.1 g). Its degree of substitution with carboxymethyl was determined by $^{1}$H-NMR to be 1.75. The total DoS of the carboxymethyl benzyl alpha-1,3-glucan was 1.92.

Preparation of Benzyl Alpha-1,3-Glucan (DoS 0.5)

Alpha-1,3-glucan (53 kg of wet cake containing 89 wt % glucan and 11 wt % water) was charged into a 150-gallon reactor, followed by water (2216 kg) addition under nitrogen. To this mixtures was added 10 wt % sodium hydroxide solution (202 kg), and the mixture was stirred at room temperature under nitrogen for 2 hours. The reactor was heated to 65° C., and the benzyl chloride (58.5 kg) was added to the reactor. The reactor temperature was increased to 80-85° C., and the reaction was heated for 3.5 hours. The reactor was cooled to 70° C., and the pH of the reaction was adjusted to pH 3 using 3 M sulfuric acid. The reaction solids (benzyl alpha-1,3-glucan) were washed with methanol/water (5:1), acetone (2×), methanol, and then dried. The degree of substitution of the benzyl alpha-1,3-glucan product was determined by $^{1}$H-NMR to be 0.5.

Preparation of Carboxymethyl Benzyl Alpha-1,3-Glucan

Benzyl alpha-1,3-glucan as prepared above (DoS 0.5) was used to prepare carboxymethyl benzyl alpha-1,3-glucan. A 4-neck, 250-mL round-bottom flask was equipped with overhead mechanical stirrer, thermocouple, and $N_2$ inlet. Ethanol (92 wt %, 120 mL) and the benzyl alpha-1,3-glucan (20 g) were added into the flask. The mixture was stirred at room temperature for 30 minutes. Sodium hydroxide (20 g, 50 wt % aqueous solution) was added dropwise over a 10 minute period, while stirring. The slurry was stirred at room temperature for 15 minutes. Chloroacetic acid (11.6 g in 5 g of 92 wt % ethanol) was added in 5 minutes. The reaction was stirred at 60-62° C. for 4 hours. The solids in the reaction were not completely soluble in water. After being cooled to 35° C., sodium hydroxide (11.5 g, 50 w % aqueous solution) and chloroacetic acid (6.8 g in 3 g of 92 wt % ethanol) was added. The resulting preparation was stirred at 60° C. After 1.5 hours at 60° C., a large lump formed. The heating was turned off. The top layer liquid was decanted, methanol (50 w %, 150 mL) was added, and the pH of the resulting mixture was adjusted to about 7 by adding 18.5 wt % HCl solution. The mixture was slowly stirred at room temperature overnight to form a gel. Methanol (50 mL) was added slowly while the gel was stirred. A soft solid was precipitated. The top layer liquid was decanted. Methanol (90 wt %, 150 mL) was added. The solids were collected by filtration and washed with methanol (90 wt %, 3× 100 mL), then dried on vacuum to give a brown solid product (20.5 g). The product was further purified by ultrafiltration. The product was dissolved in ~1.5 L water. The solution was purified by TFF (nanofiltration, membrane: regenerated cellulose, 10K MWCO) with ~5 L water exchange. The retentate was concentrated and dried to give a carboxymethyl benzyl alpha-1,3-glucan product (16.8 g). Its degree of substitution with carboxymethyl was determined by $^{1}$H-NMR to be 0.95.

Example 1

Synthesis of Oxidized Carboxymethyl Alpha-1,3-Glucan (ADW10)

A 4-neck, 250-mL round-bottom flask equipped with a stir rod, thermocouple, addition funnel and air inlet was charged with an aqueous solution of carboxymethyl alpha-1,3-glucan (10 gram, DPw 800, DoS 0.48; denoted herein as "ADW10-Comparative") in 90 mL of DI-water. 2,2,6,6-tetramethylpiperidine 1-oxyl (TEMPO, 0.1 gram) and NaBr (1 gram) were then added. To this stirring mixture (TEMPO was not fully dissolved at this stage), NaClO (10-15 wt %, 38 mL) was added dropwise within 0.5 hour. NaOH (2 N, 15 mL) was then used to adjust the pH of the preparation to 10.7. The thus prepared oxidation reaction was stirred at room temperature for three hours. The crude material was then diluted in 1 gallon of DI-water, stirred at room temperature for 3 hours, filtered, purified by ultrafiltration (PELLICON MINI with 5 kDa MWCO cassettes), and freeze-dried to render 10.7 g of oxidized product. The total carboxy DoS of the oxidized carboxymethyl alpha-1,3-glucan product (denoted herein as "ADW10") as contributed by individual carboxymethyl groups and individual carboxy groups was determined by $^{13}$C-NMR (nuclear magnetic resonance) analysis to be 0.66. Its Mw was determined by size-exclusion chromatography (SEC) to be 37 kDa. Thus, the ADW10 product was found to be further substituted with carboxy groups, at least, as compared to its parent compound (ADW10-Comparative).

Example 2

Synthesis of Oxidized Carboxymethyl Alpha-1,6-Glucan (ADW18)

A 4-neck, 500-mL round-bottom flask equipped with a stir rod, thermocouple, addition funnel and air inlet was charged with 62.3 g of a 32.1 wt % aqueous solution of alpha-1,6-glucan (200 kDa, 20% alpha-1,2 branching). To this was added sodium hydroxide solution (30 g of 50 wt % NaOH solution). This solution was stirred overnight. The solution was heated in a 50° C. oil bath, and monochloroacetic acid (MCA) solution was added (12 gram of MCA in 8 gram of DI-water) via the addition funnel. The solution was then heated in a 65° C. oil bath for 2 hours. The solution was cooled down to room temperature and neutralized with 18 wt % HCl (20 mL). A 10-mL sample of this reaction was harvested and the carboxymethyl alpha-1,6-glucan product thereof (denoted herein as "ADW18-Comparative") was purified in methanol. The carboxymethyl DoS of this product was determined by $^{13}$C-NMR analysis to be 0.38.

TEMPO (0.15 gram) and NaBr (1.5 gram) were added to the above reaction. NaClO (10-15 wt %, 150 mL) was then added dropwise within 0.5 hour. NaOH (2 N, 50 mL) was used to adjust pH. The final pH was 10.2. The thus prepared oxidation reaction was stirred at room temperature for 2 hours. The crude material was diluted in 1 gallon of DI-water, stirred at room temperature for 1 hour, filtered, purified by ultrafiltration (PELLICON MINI with 5 kDa MWCO cassettes), and freeze-dried to render 22.6 g of oxidized product. The total carboxy DoS of the oxidized carboxymethyl alpha-1,6-glucan product (denoted herein as "ADW18") as contributed by individual carboxymethyl groups and individual carboxy groups was determined by $^{13}$C-NMR analysis to be 0.58. Its Mw was determined by SEC to be 32 kDa. Thus, the ADW18 product was found to be further substituted with carboxy groups, at least, as compared to its parent compound (ADW18-Comparative).

Example 3

Synthesis of Oxidized Carboxymethyl Cellulose (ADW28)

A 4-neck, 250-mL round-bottom flask equipped with a stir rod, thermocouple, addition funnel and air inlet was charged with an aqueous solution of carboxymethyl cellulose (10 gram, Sigma-Aldrich cat. no. CMC419311, ~Mw 250 kDa, DoS 0.7, denoted herein as "ADW28-Comparative") in 110 mL DI-water. TEMPO (0.05 gram) and NaBr (0.5 gram) were then added. To this stirring solution, NaClO (10-15 wt %, 50 mL) was added dropwise within 0.5 hour. NaOH (25 wt %, 2 mL) was then used to adjust pH of the solution to 10.7. The thus prepared oxidation reaction was stirred at room temperature for two hours. The crude material was then precipitated in methanol (500 mL), washed three times with methanol (100 mL/each), and dried under vacuum to render 10 g of oxidized product. The total carboxy DoS of the oxidized carboxymethyl cellulose product (denoted herein as "ADW28") as contributed by individual carboxymethyl groups and individual carboxy groups was determined by $^{13}$C-NMR analysis to be 1.60. Its Mw was determined by SEC to be 21 kDa. The ADW28 product was considered to be further substituted with carboxy groups, at least, as compared to its parent compound (ADW28-Comparative).

Example 4

Synthesis of Oxidized Carboxymethyl Starch (ADW31)

A 4-neck, 500-mL round-bottom flask equipped with a stir rod, thermocouple, addition funnel and air inlet was charged with starch (20 g, Sigma-Aldrich cat. no. S9765, soluble starch). To this was added sodium hydroxide solution (34 g of 50 wt % NaOH solution). This solution was stirred overnight. The solution was heated in a 50° C. oil bath, and monochloroacetic acid (MCA) solution was added (16 gram of MCA in 8 gram of DI-water) via the addition funnel. The solution was then heated in a 65° C. oil bath for 2 hours. The solution was cooled down to room temperature and neutralized with 18 wt % HCl (13 mL). A 10-mL sample of this reaction was harvested and the carboxymethyl starch product thereof (denoted herein as "ADW31-Comparative") was purified in methanol. The carboxymethyl DoS of this product was determined by $^{13}$C-NMR analysis to be 0.62.

TEMPO (0.1 gram) and NaBr (1.0 gram) were added to the above reaction. NaClO (10-15 wt %, 100 mL) was then added dropwise within 0.5 hour. NaOH (2 N, 17 mL) was used to adjust pH. The final pH was 9.9. The thus prepared oxidation reaction was stirred at room temperature for 1.5 hours. The crude material was diluted in 1 gallon of DI-water, stirred at room temperature for 1 hour, filtered, purified by ultrafiltration (PELLICON MINI with 5 kDa MWCO cassettes), and freeze-dried to render 21.2 g of oxidized product. The total carboxy DoS of the oxidized carboxymethyl starch product (denoted herein as "ADW31") as contributed by individual carboxymethyl groups and individual carboxy groups was determined by $^{13}$C-NMR analysis to be 0.67. Its Mw was determined by SEC to be 53 kDa. Thus, the ADW31 product was found to be further substituted with carboxy groups, at least, as compared to its parent compound (ADW31-Comparative).

Example 5

Synthesis of Oxidized Carboxymethyl Dextran (ADW36)

A 4-neck, 500-mL round-bottom flask equipped with a stir rod, thermocouple, addition funnel and air inlet was charged with dextran (20 g) produced using glucosyltransferase (GTF) 0768 as described in U.S. Patent Appl. Publ. No. 2016/0122445 (incorporated herein by reference). To this was added sodium hydroxide solution (34 g of 50 wt % NaOH solution). This solution was stirred overnight. The solution was heated in a 50° C. oil bath, and monochloroacetic acid (MCA) solution was added (16 gram of MCA in 8 gram of DI-water) via the addition funnel. The solution was then heated in a 65° C. oil bath for 2 hours. The solution was cooled down to room temperature and neutralized with 18 wt % HCl (17 mL). A 10-mL sample of this reaction was harvested and the carboxymethyl dextran product thereof (denoted herein as "ADW36-Comparative") was purified in methanol. The carboxymethyl DoS of this product was determined by $^{13}$C-NMR analysis to be 0.46.

TEMPO (0.1 gram) and NaBr (1.0 gram) were added to the above reaction. NaClO (10-15 wt %, 90 mL) was added dropwise within 0.5 hour. NaOH (2 N, 15 mL) was used to adjust pH. The final pH was 9.6. The thus prepared oxidation reaction was stirred at room temperature for 1.5 hours. The crude material was diluted in 1 gallon of DI-water, stirred at room temperature for 1 hour, filtered, purified by ultrafiltration (PELLICON MINI with 5 kDa MWCO cassettes), and freeze-dried to render 17.8 g of oxidized product. The total carboxy DoS of the oxidized carboxymethyl dextran product (denoted herein as "ADW36") as contributed by individual carboxymethyl groups and individual carboxy groups was determined by $^{13}$C-NMR analysis to be 0.51. Its Mw was determined by SEC to be 49 kDa. Thus, the ADW36 product was found to be further substituted with carboxy groups, at least, as compared to its parent compound (ADW36-Comparative).

Example 6

Synthesis of Oxidized Carboxymethyl Dextran (ADW39)

A 4-neck, 500-mL round-bottom flask equipped with a stir rod, thermocouple, addition funnel, and air inlet was charged with dextran (30 g, Sigma-Aldrich cat. no. D5376, *Leuconostoc mesenteroides*, Mw 1.5-2.8 million Da) and DI-water (120 mL). To this was added sodium hydroxide solution (51 g of 50 wt % NaOH solution). This solution was stirred overnight. The solution was heated in a 50° C. oil bath, and monochloroacetic acid (MCA) solution was added (24 gram of MCA in 12 gram of DI-water) via the addition funnel. The solution was then heated in a 65° C. oil bath for 2 hours. The solution was cooled down to room temperature and neutralized with 18 wt % HCl (23 mL). A 10-mL sample of this reaction was harvested and the carboxymethyl dextran product thereof (denoted herein as "ADW39-Comparative") was purified in methanol. The carboxymethyl DoS of this product was determined by $^{13}$C NMR analysis to be 0.58.

TEMPO (0.15 gram) and NaBr (1.5 gram) were added to the above reaction. NaClO (10-15 wt %, 135 mL) was added dropwise within 0.5 hour. NaOH (2 N, 20 mL) was used to adjust pH. The final pH was 9.6. The thus prepared oxidation reaction was stirred at room temperature for 1.5 hrs. The crude material was diluted in 1 gallon of DI-water, stirred at room temperature for 1 hour, filtered, purified by ultrafiltration (PELLICON MINI with 5 KDa MWCO cassettes), and freeze-dried to render 32.5 g of oxidized product. The total carboxy DoS of the oxidized carboxymethyl dextran product (denoted herein as "ADW39") as contributed by individual carboxymethyl groups and individual carboxy groups was determined by $^{13}$C-NMR analysis to be 0.67. Its Mw was determined by SEC to be 27 kDa. Thus, the ADW39 product was found to be further substituted with carboxy groups, at least, as compared to its parent compound (ADW39-Comparative).

Example 7

Synthesis of Oxidized Cyanoethyl Carboxyethyl Alpha-1,3-Glucan (ADW7)

A 4-neck, 1-L round-bottom flask containing a mechanical stir rod, thermocouple and addition funnel was charged with 260 g of alpha-1,3-glucan (DPw 800) wet cake (38.5 wt % glucan) and 550 g of DI-water. The mixture was stirred at room temperature while 64 g of 50 wt % sodium hydroxide solution was added over a 15-minute period. Acrylonitrile (64 g) was then added slowly at 25° C. in 10 minutes. The thus prepared cyanoethylation reaction was stirred at room temperature for 3.5 hrs. HCl (18.5 wt %, 135 g) was then added to bring the pH of the reaction to about 7. The crude product was precipitated and washed in methanol to render 124 gram of cyanoethyl carboxyethyl alpha-1,3-glucan (denoted herein as "ADW7-Comparative"). The DoS of this product with cyanoethyl and carboxyethyl groups was determined by $^{13}$C NMR analysis to be 0.90 and 0.12, respectively. Carboxyethyl groups were formed in the above reaction via hydrolysis of some cyano groups due to the basic aqueous conditions.

A 4-neck, 250-mL round-bottom flask equipped with a stir rod, thermocouple, addition funnel, and air inlet was charged with an aqueous solution of the above-prepared cyanoethyl carboxyethyl alpha-1,3-glucan product (5 g, ADW7-Comparative) in 50 mL DI-water. TEMPO (0.1 gram) and NaBr (1 gram) were then added to the solution. To this stirring solution, NaClO (10-15 wt %, 25 mL) was added dropwise within 0.5 hour. NaOH (2 N, 13 mL) was then used to adjust the pH of the solution to 10.5. The thus prepared oxidation reaction was stirred at room temperature for three hours. The crude material was then diluted in 1 gallon of DI-water, stirred at room temperature for 6 hours, filtered, purified by ultrafiltration (PELLICON MINI with 5 KDa MWCO cassettes), and freeze-dried to render 3.7 g of oxidized product. The DoS of the oxidized product (denoted herein as "ADW7") was determined by $^{13}$C-NMR analysis to be 0.61/0.61 (cyanoethyl/carboxy) (carboxy DoS reported as a contributed by individual carboxyethyl groups and individual carboxy groups). Its Mw was determined by SEC to be 37 kDa.

Example 8

Oxidized Polysaccharide Derivatives can Reduce the Effects of Hard Water Cations in Aqueous Compositions This Example shows that polysaccharides that have been both (i) derivatized with one or more organic groups, and (ii) oxidized, are able to reduce the effects of hard water cations in aqueous compositions. In particular, each of the oxidized polysaccharide derivatives prepared in Examples 1-7 above exhibited an enhanced ability, as compared to its respective non-oxidized counterpart, in reducing turbidity caused by calcium carbonate formation. Thus, oxidized polysaccharide derivatives as presently disclosed can be used to reduce or prevent negative effects brought upon by hard water cations in aqueous compositions.

The oxidized polysaccharide derivatives and their respective non-oxidized counterparts from Examples 1-7 above were individually (20 mg) dissolved in de-ionized (DI)-water (45 mL) overnight. Sodium carbonate aqueous solution (5 mL of 0.6 wt % aqueous solution) was then added to each solution to form a clear preparation. Each preparation (14 mL thereof) was titrated with a calcium chloride solution (2 wt % in DI-water) at 10 μL/second over 160 seconds while stirring (600 rpm). Turbidity was then measured for each sample at 400 seconds using a calibrated turbidimeter (HACH 2100P). This test was repeated three times for each polysaccharide derivative compound and an average turbidity was reported in Nephelometric Turbidity Units (NTU, Table 1). The data provided in Table 1 show that water treatment with each oxidized polysaccharide derivative sample, as compared to its non-oxidized counterpart, resulted in a lower NTU measurement, thereby indicating that the oxidized samples better bind to calcium cations. This binding forms soluble polysaccharide-calcium complexes that can be easily removed (e.g., by rinsing), with concomitant reduction of formation of calcium carbonate (and other insoluble hard water cation salts, when applicable) that could otherwise form undesired deposits. Also, it is believed that the oxidized polysaccharide derivatives can exhibit beneficial effects by interacting with insoluble calcium carbonate, thereby better stabilizing, dispersing, and/or preventing deposition of this salt, this benefit likewise applies to other hard water cation-carbonate salts. Thus, polysaccharide derivatives of the present disclosure can exert beneficial effects by (i) blocking/reducing hard water cation carbonate salt production, and/or (ii) interacting with any hard water cation carbonate salt that forms.

TABLE 1

| | Polysaccharide Derivative | | Average Turbidity at 400 seconds |
|---|---|---|---|
| Ex. | Designation | Description | (NTU) |
| — | none | negative control | >1000 |
| 1 | ADW10 | oxidized carboxymethyl alpha-1,3-glucan | 200 |
| | ADW10-Comparative | carboxymethyl alpha-1,3-glucan | 330 |
| 2 | ADW18 | oxidized carboxymethyl alpha-1,6-glucan | 38 |
| | ADW18-Comparative | carboxymethyl alpha-1,6-glucan | 289 |
| 3 | ADW28 | oxidized carboxymethyl cellulose | 308 |
| | ADW28-Comparative | carboxymethyl cellulose | 320 |
| 4 | ADW31 | oxidized carboxymethyl starch | 83 |
| | ADW31-Comparative | carboxymethyl starch | 287 |
| 5 | ADW36 | oxidized carboxymethyl dextran | 125 |
| | ADW36-Comparative | carboxymethyl dextran | 217 |
| 6 | ADW39 | oxidized carboxymethyl dextran | 71 |
| | ADW39-Comparative | carboxymethyl dextran | 227 |
| 7 | ADW7 | oxidized cyanoethyl carboxyethyl alpha-1,3-glucan | 734 |
| | ADW7-Comparative | cyanoethyl carboxyethyl alpha-1,3-glucan | >1000 |

Example 9

Polysaccharide Derivatives Provide Benefits to Dishwash Formulations

This Example shows that polysaccharide derivatives can provide anti-buildup/film/scale activity to dishwash detergents. In particular, cleaning dishware using an automatic dishwash detergent including either carboxymethyl alpha-1,3-glucan or carboxymethyl benzyl alpha-1,3-glucan resulted in reduction of deposits on the cleaned dishware.

Carboxymethyl alpha-1,3-glucan (DoS 0.91) and carboxymethyl benzyl alpha-1,3-glucan (DoS 1.92) prepared according to the above Materials/Methods were individually tested in the following phosphate-free automatic dishwash detergent formulation (Table 2).

TABLE 2

| Ingredient | Relative amount (wt %) |
|---|---|
| Methylglycinediacetic acid, Na salt | 30 |
| Sodium carbonate | 30 |
| Sodium percarbonate | 14 |
| Tetraacetylethylenediamine | 3 |
| Sodium disilicate | 4 |
| 1-Hydroxyethane 1,1-diphosphonic acid | 2 |
| Sodium sulfate | 3.75 |
| Low-foaming nonionic surfactant | 3 |
| Bismuth citrate | 0.3 |
| Antifoam | 0.2 |
| Protease active protein (EXCELLENZ ® P 1250) | 0.040 |
| Amylase active protein (EXCELLENZ ® S 3300) | 0.0060 |
| Dispersant polymer[a] | 7 |

[a]Table 3 below lists the dispersant polymer used in each formulation.

A comparative experiment was carried out in a dishwasher using the automatic dishwashing detergent composition specified in Table 2 above. The objective of this experiment was to establish the anti-buildup performance, in automatic dishwashing detergent, of functionalized alpha-1,3-glucan derivatives described in the above Materials/Methods versus a petroleum-based sulfonated acrylate copolymer. Examples of commercially available sulfonated acrylate copolymers are ACUSOL 588G (Dow) and SOKALAN CP 50 (BASF).

The following experimental conditions were applied. The automatic dishwashing detergent was placed in a MIELE GSL2 dishwasher for six consecutive cycles. No rinse aid or salt was added to the machine. The dishwasher program of each cycle was operated at 50° C. during the main wash with a holding time of 8 minutes and a rinse temperature at 65° C. The water hardness was set at 36° German hardness (645 ppm, $Ca^{2+}$:$Mg^{2+}$2:1). In the beginning of each cycle, 19 g of detergent composition (Table 2) and 50 g of frozen IKW ballast soil was dosed to the machine. The IKW ballast soil was placed in the upper rack of the dishwasher and its composition is specified in "Recommendations for the Quality Assessment of the Cleaning Performance of Dishwasher Detergents (Part B, Update 2015)" published in SOFW Journal 06/16 (incorporated herein by reference).

Dishware articles were placed in the machine before the first wash and removed after the sixth wash cycle, as follows: (i) in the upper rack, four pieces each of a tumbler (long drink) glass, a MEPAL plastic food container (styrene-acrylonitrile), and a stainless steel knife; (ii) in the lower rack, a food box (polypropylene), a blue plastic plate (melamine), and a black plastic chopping board (polyethylene); (iii) a dummy load consisting of porcelain and glass plates was added to the lower rack, and four porcelain tea cups were placed in upper rack.

The glass tumblers and plastic containers were taken out of the dishwasher after the final wash and, after drying in open air, were rated for filming according to ASTM method D3556-14 (incorporated herein by reference) ranging from 1 (no film) to 5 (heavily filmed). An average value of 1 to 5 for filming was determined as reported in Table 3 below.

TABLE 3

Measuring Buildup (Filming) Left by Dishwash Detergent Composition

| Dispersant polymer | Filming score Glass tumblers | Filming score Plastic containers |
|---|---|---|
| No polymer | 4 | 3 |
| Comparative polymer: ACUSOL 588G | 1 | 4 |
| Carboxymethyl alpha-1,3-glucan, DoS 0.91 | 2.5 | 2 |
| Carboxymethyl benzyl alpha-1,3-glucan, DoS 1.92 | 1 | 2 |

It was concluded that automatic dishwashing detergent compositions, with one or more glucan carboxylate derivatives as a dispersant polymer ingredient, demonstrate improved anti-filming performance. For example, automatic dishwashing detergent with carboxymethyl benzyl alpha-1,3-glucan performed at least equivalently on glass to automatic dishwashing detergent having the petroleum-based dispersant, ACUSOL 588G. Carboxymethyl alpha-1,3-glucan also provided anti-filming activity on glass. On plastic, both carboxymethyl benzyl and carboxymethyl alpha-1,3-glucan performed better than the petroleum-based dispersant in reducing filming. It is contemplated that, based on the results in Table 1, other polysaccharide compounds disclosed herein (e.g., oxidized polysaccharide derivatives, carboxyalkyl glucan derivatives) having substitutions with one or more organic groups having a carboxylic acid group can likewise be used to provide anti-filming activity to automatic dishwashing detergent compositions.

Example 10

Scale Inhibition Performance of Various Glucan Anionic Ether Derivatives

Scale formation presents a serious issue in a variety of industries, ranging from energy and water, to home care and personal care. Scale results from formation of inorganic salt deposits originating from bivalent ions dissolved in the water-phase, which combine to form insoluble salts. These salts can deposit on surfaces present in the system holding the water-phase. In oilfield topside and related facilities, these surfaces can be of inner pipeline walls or the inner workings of pumps, for example. Another issue is the formation of small inorganic salt particles, which can move through the system with the liquid streams (also known as suspended solids) and clog filters or cause plugging issues over time. Another system where scale formation is an issue is in industrial cooling systems. Scale formation is also an issue in home and personal care applications such as automatic dishwashing. For example, deposition of scale can leave an undesirable film on glassware and other tableware. Examples of inorganic salts that can be found in scale include $CaCO_3$, $CaSO_4$, $Fe_2O_3$, FeS, and $FeS_2$.

Scale inhibitors include polymers that hold a significant number of charged groups. Anionic polymers have negatively charged groups (e.g., carboxyl groups), and cationic polymers have positively charged groups (e.g., an amine group). Such polymers can offer a competitive binding site for ions and prevent them from binding with each other to form scale. A scale-inhibiting polymer that has bound scale ions typically remains in solution and thus prevents the formation of deposits. Acrylic-based polymers are the current standard for scale inhibition in several industries (e.g., with acrylamide as the base monomer). In addition to being hydrocarbon-based (i.e., non-renewable) and non-biodegradable, acrylic-based polymers have the issue of environmental toxicity due to their bioaccumulation and release of monomer resulting from nucleophilic attack of the polymer (e.g., by $H_2S$).

Glucan derivatives herein represent an opportunity to replace incumbent anti-scale polymers with biodegradable and renewable alternatives. As shown in this Example, various glucan derivatives have the same, or better, anti-scale functionality as compared to the function of a hydrocarbon-based incumbent acrylic-based anti-scale compound.

Experimental Procedure:

The following system was applied to test for scale inhibition activity of various glucan derivative such as alpha-glucan derivatives. Samples (50 mL) of 0.06% w/w $Na_2CO_3$ aqueous solution were made to which an alpha-glucan carboxymethyl ether derivative, carboxymethyl cellulose, or an incumbent acrylate (ACUSOL 420, Dow, Inc.) was individually dissolved to 400 mg/L (or no compound was added as a control). Table 4 below describes each of these compounds. Each preparation was mixed shortly, after which 14 mL was removed and placed in a transparent 20-mL glass vial and stirred. A 2% w/w $CaCl_2$ solution (4×400 microliters) was then slowly pipetted to each vial of $Na_2CO_3$/compound solution. Formation of insoluble $CaCO_3$ particles was observed and measured using a HACH turbimeter (a spectrophotometer that determines light scattering caused by non-soluble particles [i.e., turbidity]), and the results were measured in FNU (Formazin Nephelometric Units). The FNU level (turbidity) correlates with the amount of scale that would be formed (e.g., a low FNU score means lower scale production activity).

Results:

Table 4 shows the results of the turbidity measurements taken above. All the tested glucan compounds are anionic by virtue of being substituted with carboxymethyl groups.

TABLE 4

Measuring the Effect of Various Compounds on Turbidity Resulting from $CaCO_3$ Formation

| Compound | CM DoS[c] | FNU[a] 1 | FNU[a] 2 | Percent of control FNU |
|---|---|---|---|---|
| No added compound (control) | NA[b] | 1016 | 980 | 100% |
| ACUSOL 420N (Dow Inc.) (industrial incumbent) | NA | 318 | 317 | 32% |
| High DPw Alpha-1,3-Glucan (~100% alpha-1,3 linkages) (RV[d] = 9.8 dL/g, IV[e] = 6.83 dL/g) | 0.5 | 182 | 185 | 18% |
| GT48 (a dextran-alpha-1,3-glucan graft copolymer)[f] | 0.47 | 149 | 151 | 15% |
| GlucanP (a dextran-alpha-1,3-glucan graft copolymer)[g] | 0.4 | 125 | 127 | 13% |
| Cellulose | 0.65-0.9 | 115 | 116 | 12% |

[a]Two separate FNU (Formazin Nephelometric Units) measurements, denoted as 1 and 2, were taken with each sample.

[b]NA, not applicable.

[c]The tested alpha-glucan and cellulose compounds were carboxymethyl (CM) ether derivatives with the listed degree of substitution (DoS).

[d]RV, reduced viscosity as measured for the alpha-glucan prior to ether-derivatization.

[e]IV, intrinsic viscosity as measured for the alpha-glucan prior to ether-derivatization.

[f]GT48, dextran-alpha-1,3-glucan graft copolymer with a dextran backbone content of about 48 wt % and an alpha-1,3-glucan side chains content of about 52 wt %. This graft copolymer was prepared generally following procedures as disclosed in U.S. Patent Appl. Publ. No. 2020/0165360, which is incorporated herein by reference. In general, graft copolymers were prepared by first synthesizing dextran in reactions comprising water, sucrose and a glucosyltransferase enzyme (GTF 0768, disclosed as SEQ ID NOs: 1 and 2 in U.S. Patent No. 10,059,779, which is incorporated herein by reference). Using the dextran as a primer/acceptor, alpha-1,3-glucan was then synthesized in a manner similar to what is described in U.S. Patent Appl. Publ. Nos. 2020/0165360 (above) or 2019/0078063, which is incorporated herein by reference; thus, alpha-1,3-glucan side chains (each of 100% alpha-1,3 linkages) were synthesized off of a dextran backbone to form a dextran-alpha-1,3-glucan graft copolymer.

[g]GlucanP, dextran-alpha-1,3-glucan graft copolymer prepared generally following procedures as disclosed in U.S. Patent Appl. Publ. No. 2019/0185893, which is incorporated herein by reference. Briefly, the GlucanP graft copolymer comprises (A) an alpha-1,6-glucan backbone (100% alpha-1,6-linked before alpha-1,3 branching) that (i) has been branched with about 16% alpha-1,3 linkages (i.e., alpha-1,3,6) (i.e., the backbone in total comprises about 84% alpha-1,6 linkages and about 16% alpha-1,3 linkages) and (ii) has an Mw of about 20.2 kDa, and (B) a few alpha-1,3-glucan side chains (each of 100% alpha-1,3 linkages) that have been extended from some of the alpha-1,3 branches. The GlucanP graft copolymer was water-insoluble prior to carboxymethylation.

The data in Table 4 support the following conclusions, for example:

Each of the tested alpha-glucan CM ether derivatives (high DPw alpha-1,3-glucan, GT48, GlucanP) significantly outperformed the industrial incumbent acrylic-based compound in controlling turbidity formation by reducing $CaCO_3$ formation.

Each of the branched alpha-glucan CM ether derivatives (GlucanP and GT48) exhibited similar turbidity control activity as exhibited by carboxymethyl cellulose, despite the branched alpha-glucan derivatives being less charged (lower CM DoS) compared to the cellulose derivative. Thus, it is expected that the alpha-glucan derivatives can provide good anti-scale activity while providing a better biodegradability profile due to lower DoS. This latter point similarly applies to the high DPw alpha-1,3-glucan CM derivative.

Optimization of the anti-scale activity of GlucanP ethers is likely possible by modifying DoS and/or degree of branching of this type of alpha-glucan compound.

Overall, anionic alpha-glucan ethers represent a new class of anti-scale compounds that can be further developed for this application space.

Example 11

Using Oxidized Alpha-1,3-Glucan to Flocculate Calcium Carbonate

The precipitation of calcium carbonate ($CaCO_3$) and other types of inorganic scale is an issue in several processes. One example is the paper-making industry, in which calcium carbonate needs to be removed from industrial liquid streams. However, inorganic salt such as calcium carbonate precipitates in a colloidal shape, which can present a challenge to its removal from liquid streams. Another industry where scale removal is important is the petroleum industry.

Water resulting from flocculation-based treatment of liquid streams is subsequently used in other parts of the petroleum production process.

Oxidized alpha-1,3-glucan polymers can be made via the functionalization of linear alpha-1,3-glucan. In this Example, it was shown that oxidized alpha-1,3-glucan is able to capture calcium ions, while allowing the calcium to combine with its carbonate counter-ion to render calcium carbonate. This process triggers precipitation of alpha-1,3-glucan/calcium carbonate complexes, oxidized alpha-1,3-glucan therefore can flocculate calcium carbonate. This process represents a new way of removing calcium carbonate from industrial streams where inorganic scale is unwanted.

Synthesis of oxidized alpha-1,3-glucan (Sample 1)

Dried water-insoluble alpha-1,3-glucan (10 g) (~100% alpha-1,3 glycosidic linkages) and 4-acetamide-TEMPO (0.97 g) were suspended in 500 mL of acetate buffer (0.2 M, pH 4.6). To this preparation, 11.2 g sodium chlorite (14.7 mL) was added. The flask was then capped with a stopper. The oxidation reaction was stirred for 24 hours at 40° C. The oxidation reaction was then quenched with excess ethanol addition, followed by addition of 80% aqueous ethanol. The isolated oxidized alpha-1,3-glucan product was dried at 40° C. in a vacuum oven. The degree of oxidation of the product was measured to be 0.39 $DO_{COONa}$. (average occurrence of $COO^-$ per glucose monomer of the glucan).

Synthesis of oxidized alpha-1,3-glucan (Sample 2)

The process used above to prepare Sample 1 was followed, with the exception that 9.44 g sodium chlorite was added, and the oxidation reaction was stirred for 18 hours at 60° C. $DO_{COONa}$ was not measured.

Experimental

Individual solutions (445 ppm) of the oxidized alpha-1,3-glucan products of Samples 1 and 2 were prepared in demineralized water.

Each solution (45 mL) was amended with 5 mL of a 0.6 wt % $Na_2CO_3$ solution to yield solutions having 400 ppm polymer and 600 ppm $Na_2CO_3$. Then, 14 mL of each solution was taken and 1800 μL of a 2 wt % percent $CaCl_2$ solution was slowly added thereto with a pipette. The turbidity of each preparation was determined using a Hach turbimeter upon the addition of $CaCl_2$. Sample 1 had a turbidity of 40.1 FNU (Formazin Nephelometric Units), while Sample 2 had turbidity of 150 FNU. Each preparation was left for 15 minutes to monitor floc formation activity.

The capture of calcium carbonate by the oxidized alpha-1,3-glucan proceeded through phases (FIG. 1):

First, $Ca^{2+}$ was captured by the dissolved oxidized alpha-1,3-glucan.

Then, precipitation slowly began, forming a white opaqueness (haziness) in the preparation.

The precipitation led to floc formation, which settled to the bottom, yielding a clear top phase (clear water).

It was observed with a stereomicroscope (400×, data not shown) that calcium carbonate crystals, in the absence of oxidized alpha-1,3-glucan, mainly form spherical, colloidal insoluble structures. However, in the presence of oxidized alpha-1,3-glucan, the oxidized glucan wrapped itself around the colloidal crystals to provide a flocculent precipitate.

Such material allows for better handling and removal of the combined precipitate.

Example 12

Polysaccharide Derivatives (Carboxymethyl or Oxidized Carboxymethyl) and their Benefits to Dishwash Formulations This Example shows that polysaccharides that have been (i) derivatized with one or more organic groups comprising carboxylic acid groups, or (ii) derivatized with one or more organic groups and then oxidized, are able to reduce the effects of hard water cations and provide benefits to scale inhibition and dishwash formulations.

Various polysaccharide derivatives (listed in Table 5) were produced using the above procedures and individually (20 mg) dissolved in de-ionized (DI)-water (45 mL) overnight. Sodium carbonate aqueous solution (5 mL of 0.6 wt % aqueous solution) was then added to each solution to form a clear preparation. In a tier-1 test, each preparation (14 mL thereof at 400 ppm polysaccharide derivative concentration) was titrated with a calcium chloride solution (2 wt % in DI-water) at 10 μL/second over 160 seconds while stirring (600 rpm). The turbidity was then measured for each sample at 400 seconds using a calibrated turbidimeter (HACH 2100P or HACH 2100P). This test was repeated at least once for each polysaccharide derivative compound and an average turbidity was reported in Nephelometric Turbidity Units (NTU, Table 5). In a tier-2 test, a concentration-dependent test was conducted using preparations with various sample concentrations (250 ppm, 200 ppm, 150 ppm, 100 ppm, 85 ppm, 71 ppm, and 50 ppm). The minimum concentration required to prevent phase separation during the testing period was determined (Table 5).

The data in Table 5 show that including a polysaccharide derivative resulted in a lower NTU measurement in comparison to the negative control (no polysaccharide derivative added), thereby indicating that polysaccharide derivatives bind to calcium cations. This binding forms soluble polysaccharide-calcium complexes that can be easily removed (e.g., by rinsing), with concomitant reduction of formation of calcium carbonate (and other insoluble hard water cation salts, when applicable) that could otherwise form undesired deposits. Also, it is believed that the polysaccharide derivatives can exhibit beneficial effects by interacting with insoluble calcium carbonate (e.g., as observed in Example 11), thereby better stabilizing, dispersing, and/or preventing deposition of this salt, this benefit likewise applies to other hard water cation-carbonate salts. Thus, polysaccharide derivatives of the present disclosure can exert beneficial effects by (i) blocking/reducing hard water cation carbonate salt production, and/or (ii) interacting with any hard water cation carbonate salt that forms. Polysaccharide derivatives also demonstrated superior dispersion capacity of calcium cations by requiring much less material to prevent phase separation in this test.

TABLE 5

| Polysaccharide Derivative | Average Turbidity at 400 ppm (NTU) | Minimum Concentration Required to Prevent Phase Separation (ppm) |
|---|---|---|
| negative control | >1000 | >1000 |
| ACUSOL 588G (Dow Inc.) (industrial incumbent) | 0 | 150 |

TABLE 5-continued

| Polysaccharide Derivative | Average Turbidity at 400 ppm (NTU) | Minimum Concentration Required to Prevent Phase Separation (ppm) |
|---|---|---|
| Carboxymethyl Alpha-1,6-Glucan[a] (6% alpha-1,2-branched; DoS, 0.5; Mw, 50 kDa) | 138 | 71 |
| Carboxymethyl Alpha-1,6-Glucan[a] (20% alpha-1,2-branched, DoS, 0.5; Mw, 200 kDa) | 172 | 71 |
| Carboxymethyl Benzyl Alpha-1,3-Glucan[b] (DoS Bz/CM, 0.2/1.8; DPw, 800) | 145 | 100 |
| Oxidized Carboxymethyl Alpha-1,6-glucan[a] (20% alpha-1,2-branched; DoS, 0.7; Mw, 32 kDa) | 38 | 100 |
| Oxidized Carboxymethyl Alpha-1,6-Glucan[a] (31% alpha-1,2-branched; DoS, 0.5; Mw, 49 kDa) | 136 | 71 |
| Oxidized Carboxymethyl Alpha-1,6-Glucan[c] (DoS, 0.5; Mw, 34 kDa) | 87 | 114 |

[a]Alpha-1,6-glucan contained ~100% alpha-1,6 glycosidic linkages (before being alpha-1,2-branched, etherified and oxidized as applicable).
[b]Alpha-1,3-glucan contained ~100% alpha-1,3 glycosidic linkages (before being etherified with benzyl [Bz] and carboxymethyl [CM] groups).
[c]Alpha-1,6-glucan as produced using GTF 0768 as described in U.S. Patent Appl. Publ. No. 2016/0122445 (incorporated herein by reference).

What is claimed is:

1. A composition comprising an oxidized polysaccharide derivative, wherein the oxidized polysaccharide derivative is produced by contacting an alpha-glucan derivative under aqueous conditions with at least one agent that is capable of oxidizing the alpha-glucan derivative, wherein the alpha-glucan derivative has a degree of substitution (DoS) up to about 3.0 with at least one organic group, and wherein 100% of the glycosidic linkages of the alpha-glucan derivative are alpha-1,3 linkages.

2. The composition of claim 1, wherein the alpha-glucan from which the alpha-glucan derivative was derived has a weight-average degree of polymerization (DPw) of at least about 50.

3. The composition of claim 1, wherein the organic group is ether-linked to the alpha-glucan derivative.

4. The composition of claim 3, wherein the organic group comprises a carboxyalkyl, alkyl, hydroxyalkyl, or aryl group.

5. The composition of claim 3, wherein the organic group comprises a carboxymethyl group.

6. The composition of claim 1, wherein the organic group is ester-linked, carbamate-linked, or sulfonyl-linked to the alpha-glucan derivative.

7. The composition of claim 1, wherein the agent comprises an N-oxoammonium salt.

8. The composition of claim 1, wherein the composition is a household care product, personal care product, industrial product, ingestible product, or pharmaceutical product.

9. The composition of claim 1, wherein the composition is an aqueous composition.

10. The composition of claim 1, wherein the composition is in the form of, or comprised in, a liquid, gel, powder, hydrocolloid, granule, tablet, capsule, bead or pastille, single-compartment sachet, multi-compartment sachet, single-compartment pouch, or multi-compartment pouch.

11. The composition of claim 1, further comprising at least one surfactant.

12. The composition of claim 1, further comprising at least one enzyme.

13. The composition of claim 12, wherein the enzyme is a cellulase, protease, amylase, or lipase.

14. The composition of claim 1, further comprising at least one of a complexing agent, soil release polymer, surfactancy-boosting polymer, bleaching agent, bleach activator, bleaching catalyst, fabric conditioner, clay, foam booster, suds suppressor, anti-corrosion agent, soil-suspending agent, anti-soil re-deposition agent, dye, bactericide, tarnish inhibitor, optical brightener, perfume, saturated or unsaturated fatty acid, dye transfer-inhibiting agent, chelating agent, hueing dye, visual signaling ingredient, anti-foam, structurant, thickener, anti-caking agent, starch, sand, or gelling agent.

15. A method of producing an oxidized polysaccharide derivative, said method comprising:

(a) contacting an alpha-glucan derivative under aqueous conditions with at least one agent that is capable of oxidizing the alpha-glucan derivative, wherein the alpha-glucan derivative has a degree of substitution (DoS) up to about 3.0 with at least one organic group, and wherein 100% of the glycosidic linkages of the alpha-glucan derivative are alpha-1,3 linkages, thereby producing an oxidized polysaccharide derivative; and (b) optionally isolating the oxidized polysaccharide derivative.

16. The composition of claim 1, wherein the composition is in the form of a dishwashing detergent composition.

17. The composition of claim 16, wherein the dishwashing detergent composition is an automatic dishwashing detergent composition.

18. The composition of claim 1, wherein the composition is in the form of a fabric care composition.

19. The composition of claim 1, wherein said DoS is up to about 0.3.

20. The composition of claim 5, wherein said DoS is up to about 0.3.

21. A method of washing or treating a hard surface, the method comprising:

(a) contacting the hard surface with a detergent composition that comprises the composition of claim 1, and (b) removing all of, or a portion of, the detergent composition from the hard surface;

thereby washing or treating the hard surface, wherein the washed hard surface or treated hard surface has reduced filming, spotting, haze, or other deposition.

* * * * *